United States Patent [19]

Chmielewski, Jr. et al.

[11] Patent Number: 5,463,854
[45] Date of Patent: Nov. 7, 1995

[54] AGRICULTURAL HARVESTER WITH CLOSED LOOP GROUND TRACKING CONTROL

[75] Inventors: Thomas A. Chmielewski, Jr., Langhorne; Scott T. Demarest, Washington Crossing; Leonard R. Colavito, Newtown, all of Pa.

[73] Assignee: Control Concepts, Inc., Newtown, Pa.

[21] Appl. No.: 190,344

[22] Filed: Feb. 1, 1994

Related U.S. Application Data

[63] Continuation-in-part of Ser. No. 12,000, Feb. 1, 1993, Pat. No. 5,359,836.

[51] Int. Cl.⁶ .................................................. A01D 75/28
[52] U.S. Cl. ............................................ 56/10.2 E; 56/208
[58] Field of Search ........................... 56/10.2 D, 10.2 E, 56/10.2 F, 208

[56] References Cited

U.S. PATENT DOCUMENTS

| | | | |
|---|---|---|---|
| 3,908,345 | 9/1975 | Oni et al. | 56/208 |
| 3,980,002 | 9/1976 | Jarman et al. | 91/461 |
| 4,126,293 | 11/1978 | Zeuner et al. | 257/30 |
| 4,136,508 | 1/1979 | Coleman et al. | 56/208 |
| 4,204,383 | 5/1980 | Milliken, Jr. | 56/10.2 |
| 4,211,057 | 7/1980 | Dougherty et al. | 56/10.2 |
| 4,227,363 | 10/1980 | Kerber et al. | 56/10.2 |
| 4,332,126 | 6/1982 | Van Auwelaer et al. | 56/10.2 |
| 4,401,009 | 8/1983 | Zeuner et al. | 91/28 |
| 4,541,229 | 9/1985 | Elijah | 56/10.2 |
| 4,573,308 | 3/1986 | Ehrecke et al. | 56/14.4 |
| 4,594,840 | 6/1986 | D'Almeida et al. | 56/11.2 |
| 4,598,718 | 7/1986 | Glaubitz et al. | 56/209 |
| 4,612,757 | 9/1986 | Halls et al. | 56/10.2 |
| 4,622,803 | 11/1986 | Lech | 56/10.2 |
| 4,641,490 | 2/1987 | Wynn et al. | 56/10.2 |
| 4,651,118 | 3/1987 | Zeuner et al. | 335/258 |
| 4,663,921 | 5/1987 | Hagstrom et al. | 56/14.6 |
| 4,736,753 | 4/1988 | Glaubitz et al. | 56/209 |
| 4,776,153 | 10/1988 | DePauw et al. | 56/10.2 |
| 4,942,724 | 7/1990 | Diekhans et al. | 56/10.4 |

FOREIGN PATENT DOCUMENTS

0502411A2 9/1992 Germany.

OTHER PUBLICATIONS

"Robotic engineering: an integrated approach", Richard Klafter, Thomas Chmielewski, Michael Negin, Library of Congress Cataloging-in-Publication Data; 1989; pp. 730–734.

*Primary Examiner*—Terry Lee Melius
*Attorney, Agent, or Firm*—Ratner & Prestia

[57] ABSTRACT

A method and apparatus for controlling an agricultural harvester having a cut crop receiving header coupled to a hydraulic cylinder. The header applies a force against the ground that is adjusted by applying pressure to the cylinder. Proportional raise and lower valves control the pressure in the cylinder. A pressure signal representing cylinder pressure is received. The difference between the measured pressure and the setpoint is used to compute input signals, which are transmitted to the valves. Cylinder pressure is maintained substantially at a setpoint, the setpoint being adjustable in response to varying terrain. The setpoint is set to a first value in falling terrain and a second value in rising terrain. At the top of a hill, the setpoint is reduced below the first value until ground contact is regained, and the pressure is recharged above the second value. Alternatively, header height may be measured and the valves controlled to maintain header position substantially constant relative to the ground or the harvester frame. Header lateral tilt is controlled while controlling either cylinder pressure or header height. A resume function returns the header from a raised position to a cutting position at the beginning of a new row.

12 Claims, 29 Drawing Sheets

AGRICULTURAL HARVESTER WITH CLOSED LOOP GROUND TRACKING CONTROL

Continuation-in-Part of Ser. No. 08/012,000, filed Feb. 1, 1993 now U.S. Pat. No. 5,359,836.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

A microfiche appendix is included in this application containing 1 microfiche. The microfiche, numbered 1 of 1, contains 75 frames plus one test target frame, for a total of 76 frames.

BACKGROUND OF THE INVENTION

1. Field of the Invention

This invention relates to agricultural equipment and in particular to the use of hydraulic control systems for regulating agricultural harvester header position and/or applied force of the header on the ground.

2. Description of the Related Art

In agricultural equipment such as combines and forage harvesters, automatic header position controls have been used for maintaining a desired header position relative to the ground in terrain which may be uneven and sloped. These control methods have been directed at maintaining a desired header height above the ground and swiveling the header in a vertical plane to match uneven ground contours. The header contains the cutting mechanism. Maintaining the header more closely within a narrow position range relative to the ground can potentially increase the yield of the crop harvested.

Typical closed loop hydraulic systems have used simple on-off solenoid valves to control the flow of fluid under pressure to an actuating cylinder for regulating the header height. For example, U.S. Pat. Nos. 4,204,383 to Milliken, Jr. and 4,211,057 to Dougherty disclose automatic height control systems in which the height is controlled by operating respective raise and lower solenoid valves, each solenoid having only two positions (open and closed). When the header reaches a rise in ground level, the raise solenoid will admit fluid into the actuating cylinder until a the header reaches a predetermined distance above the rise in ground level, at which point the solenoid is closed.

The sudden opening and closing of the raise and lower solenoids may produce a sudden change in header acceleration, causing stress on the combine components, and may be further transmitted to the tires, causing undesirable cab oscillations. Improved control systems are desirable to reduce the rate of change of header acceleration (jerk).

U.S. Pat. No. 4,942,150 to Diekhans et al. discusses header control system in which the difference between ground clearance signals at the right and left ends of the header is used for regulating the swiveling, and the mean of the ground clearance signals serves as a component for regulation of the cutting bar height.

Another aspect of agricultural harvesters is the use of a floatation mode. It is often desirable to "ride the header" along the ground. This is also referred to as "header floatation," because the header floats on the ground. A variety of headers, which differ from one another in weight and functionality, may be attached to the feeder house. By allowing the header to follow the contour of the ground, the yield is enhanced for low lying crops such as soybeans. This practice is also used in the harvesting of forage material (such as feed corn). By riding the cutting head of a forage harvester on the ground, more of the stalk is harvested, resulting in an increased yield. This method is the normal practice in Europe for forage harvesting.

Mechanical floatation systems utilize a variety of mechanical counterbalance methods and are highly dependent on the kinematic structure of the agricultural equipment.

To harvest low lying crops, it may be desirable to keep the cutting bar as close to the ground as possible. An exemplary approach to implement the floatation function with the cutting bar on the ground is an open loop hydraulic system including an accumulator, cylinder and relief valve. In this passive floatation system, the header is lowered to touch the ground, and the resulting pressure in the cylinder is adjusted to some desired value. A given pressure in the cylinder is associated with an effective weight of the header on the ground. As the machine moves over the ground, the cylinder extends or retracts matching a rising or falling terrain. Since there is a fixed volume of oil in the system, the oil present in the cylinder is passed into or out of the accumulator. This oil exchange process between the accumulator and cylinder attempts to smooth pressure variations and provides the compliance so that the cylinders can move as the ground height varies. Without the accumulator, the compliance of the cylinder is non existent for rising terrain and the resultant forces on the ground could become extreme. A relief valve is included to prevent the maximum pressure in the closed system from exceeding some preset value.

There is a physical limit to the amount of compliance that such a passive system can provide. This depends on the size of the cylinders, the size of the accumulator, and the precharge used on the accumulator. Thus this approach may require changes to the accumulator precharge for different sized/weight headers.

While the passive system provides compliance for cylinder movement and a smoothing action, it does not provide a constant counterbalance force on the header. It is important to note that the pressure at the cylinder port can vary as the header moves over the terrain. This means that the effective weight of the header on the ground varies. If the harvester encounters a bump that is too high, the header may dig into the ground. The passive system also requires adjustment of the accumulator precharge pressure to accommodate different weight headers.

U.S. Pat. No. 4,622,803 to Lech describes a method of providing a constant float for the header by maintaining a constant level of fluid pressure within the hydraulic cylinders which support the header. The basic objective of a header floatation system is to allow the header to follow the terrain without plowing or skipping. This objective is not necessarily consistent with maintaining a constant pressure in the header cylinders.

Constant cylinder pressure does not guarantee that the header tracks the ground as it rises and falls. For example, assume the desired cylinder pressure is a value, $P_d$. The header reaction time is related to cylinder velocity, which is proportional to the flow rate into or out of the cylinder. The flow rate is determined by orifice sizes and is a function of the square root of the pressure differential defined by the actual cylinder pressure and that supplied from the source, typically $P_d$. Thus, the maximum pressure differential in turn limits the flow rate or speed of the cylinders. The same is true for lowering the header, in which the increased cylinder pressure is reduced to $P_d$.

For rolling terrain with gradual height changes a constant pressure system may achieve ground tracking. However for terrains that have steep slopes or abrupt changes, a constant pressure system either digs into or skips across the ground because the cylinder is not able to move quickly enough.

Another aspect of agricultural harvesters is the way in which the header height is controlled above, but near to, the ground. In conventional combine designs, an accumulator is included as part of the header cylinder circuit. The operator sets the header height using a raise/lower valve. If the header encounters reactive forces, as the harvester moves over the ground, the accumulator can source or sink hydraulic fluid to minimize pressure spikes in the header circuit. However this sourcing and sinking of oil also results in vertical motion of the header or cutting bar.

A further aspect of agricultural harvesters is the practice of raising the header at the end of a row so that the harvester may be rapidly moved to the start of the next row. When the harvester reaches the start of the next row, it is necessary to return the header to its operating height in order to continue cutting crops. This has been performed under manual operator control and has added to the delays in preparing the harvester for the next row.

SUMMARY OF THE INVENTION

The present invention is a method and apparatus for causing the cut crop receiving header of an agricultural harvester to track the ground.

The header is positioned on the ground as the harvester moves with respect to the ground. Fluid pressure is applied to the cylinder at an electrically controlled setpoint value to counterbalance a portion of the weight of the header. Pressure in the cylinder is detected as a measure of the force the header applies against the ground. A feedback signal is produced from the pressure for adjusting the electrical signals that control fluid pressure.

Signals are provided to electrically adjust the setpoint to a value representing a first pressure value The pressure is maintained at the first value while the header moves over increasingly lower ground.

Signals are also provided to electrically increase the setpoint to a value representing a second pressure value, and the pressure is maintained at the second value while the header moves over increasingly higher ground. By this technique, the increased fluid pressure overcomes mechanical deadband in the cylinder and the linkage while the header tracks the ground.

OVERVIEW

Figure 1A:
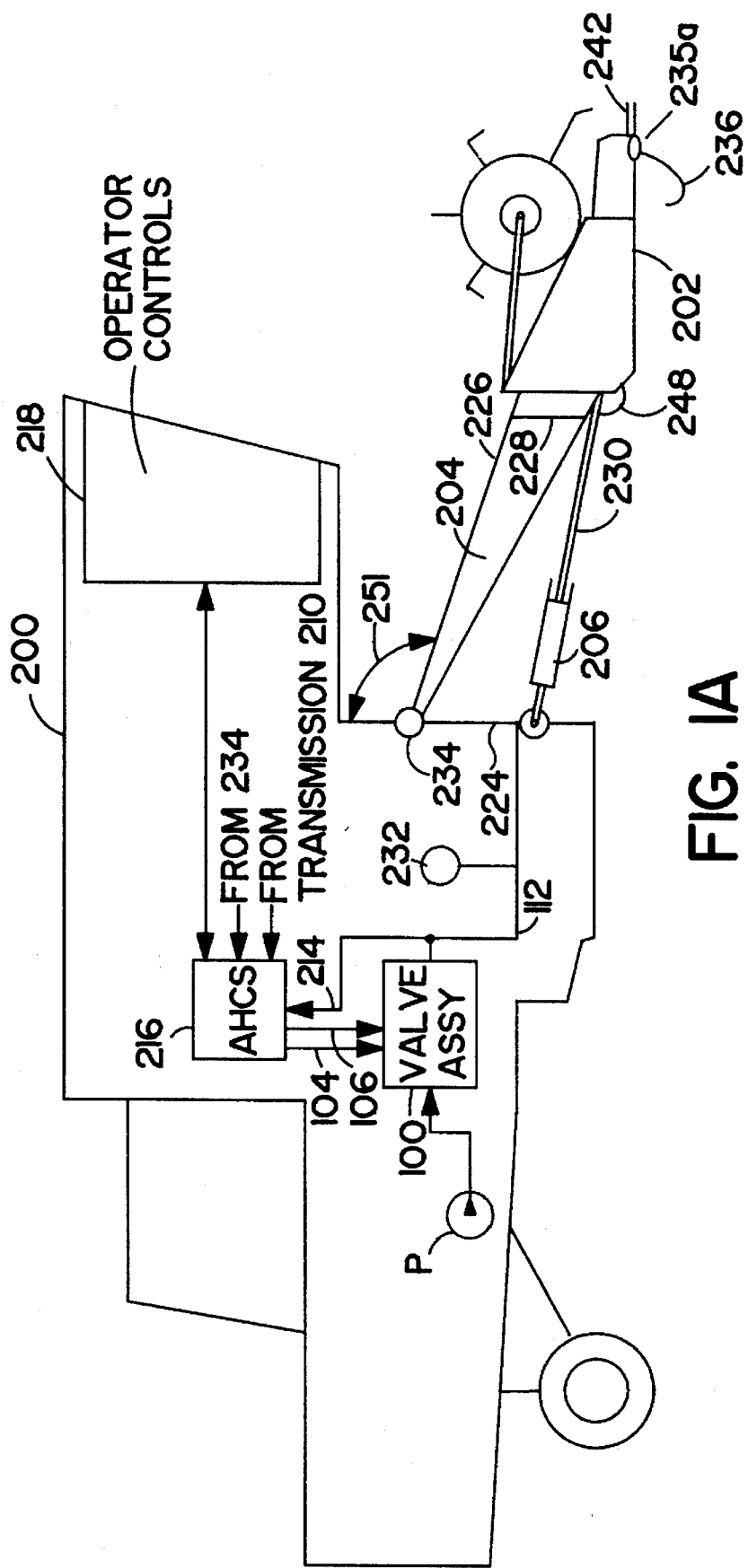
FIGS. 1A and 1B are schematic diagrams of an exemplary embodiment of the invention.
Figure 1B:
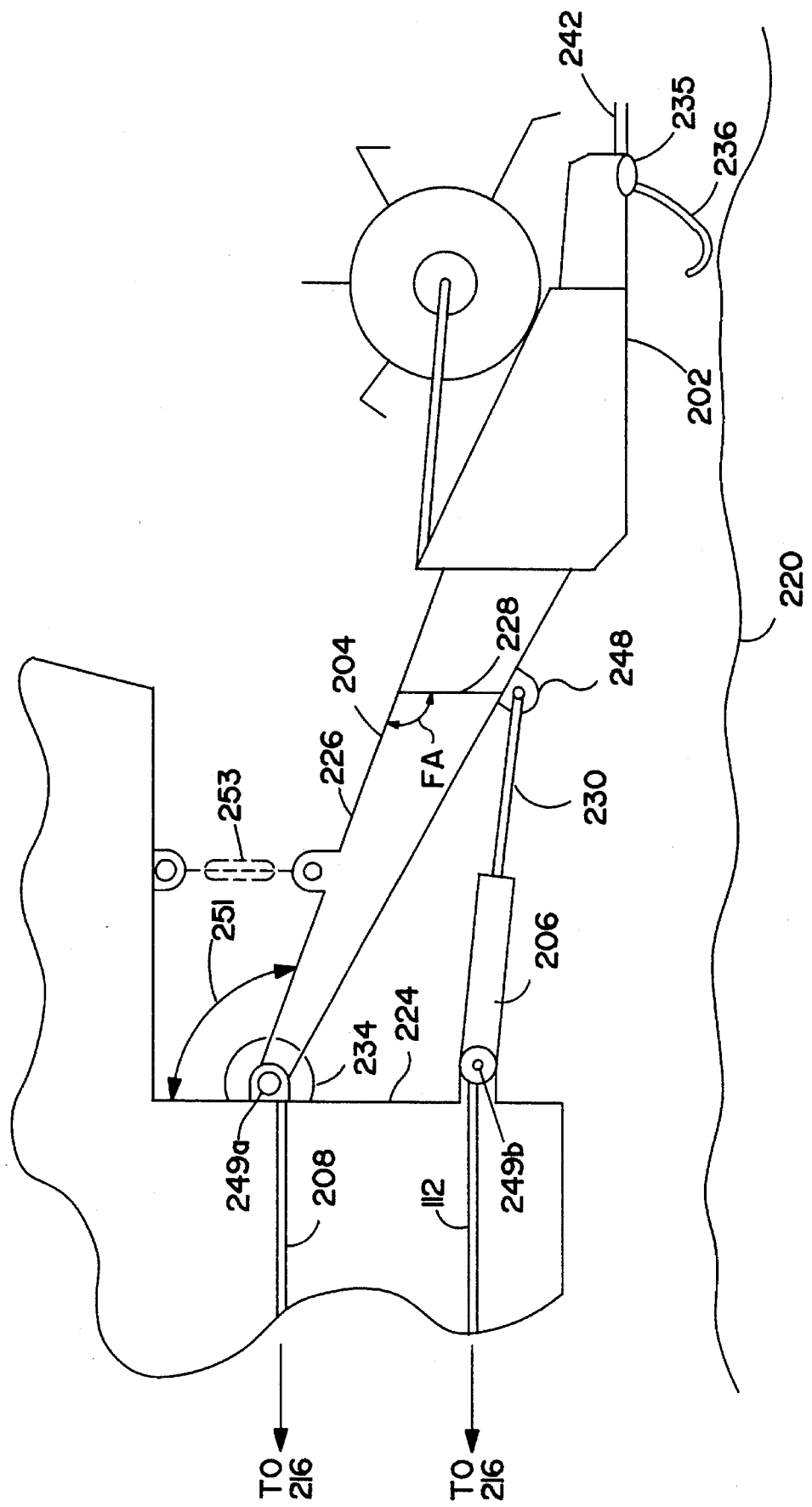
Figure 2A:
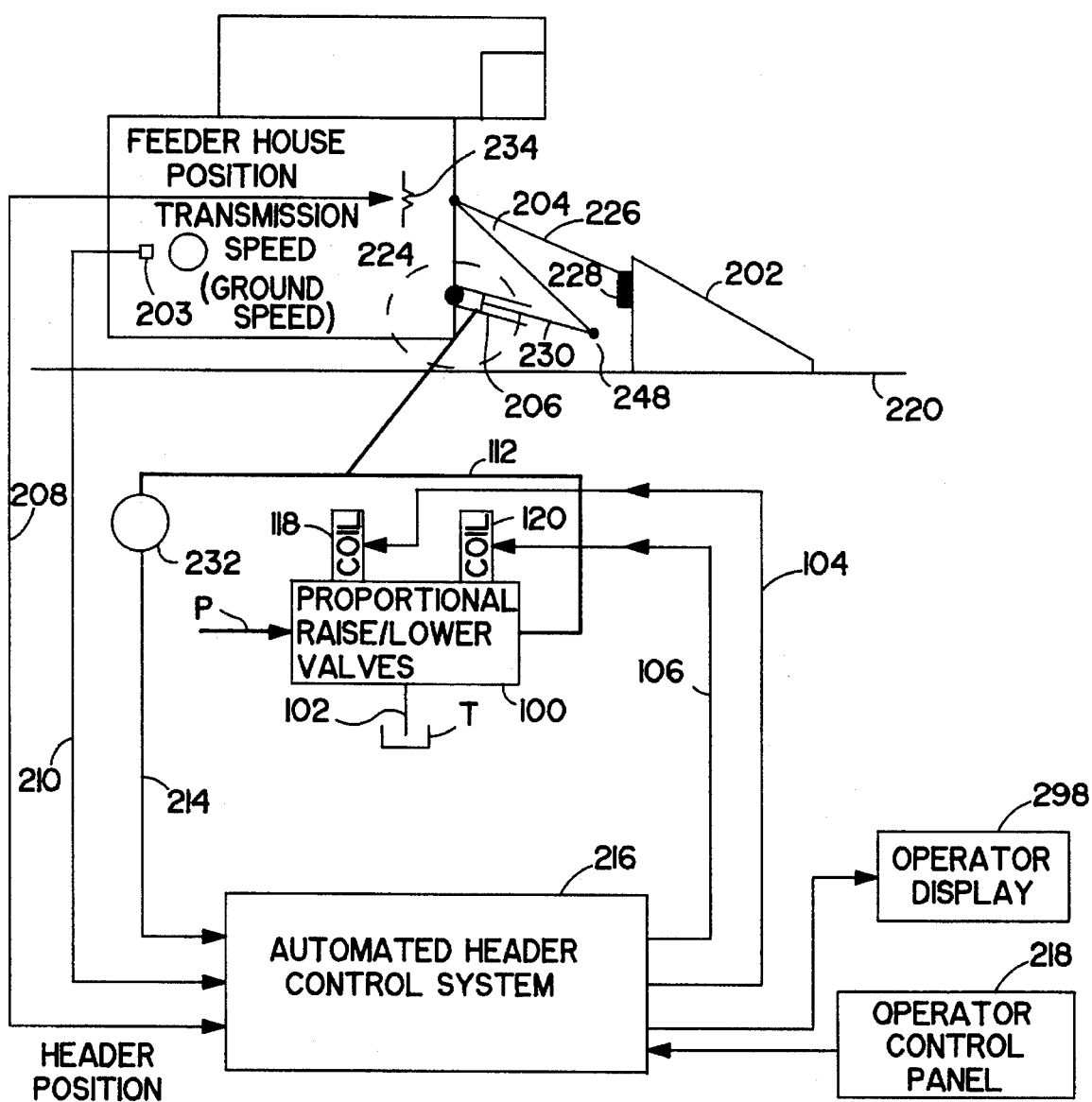
FIG. 2A is a block diagram of the system shown in FIGS. 1A and 1B.

FIGS. 1A, 1B and 2A show an exemplary embodiment of the invention. An agricultural harvester 200 is shown, which may be a combine, having a cut crop receiving header 202. The crop is transferred from the header to a feeder house 204. A four bar linkage (shown in FIG. 1B) includes three fixed length members 224, 226 and 228 and a fourth member having a variable length 230. Member 224 is formed by a portion of the frame of harvester 200. Members 226 and 228 are formed by the top and the front of the feeder house, respectively. A hydraulic cylinder 206 forms a part of member 230. Extension and retraction of cylinder 206 results in a change in the length of member 230. The four bar linkage forms a quadrilateral with 1 fixed angle FA and 3 angles that vary when cylinder 206 extends or retracts.

An identical second actuating cylinder (not shown) is located on the opposite side of harvester 200 from cylinder 206. Cylinder 206 and the second actuating cylinder are symmetrically located and hydraulically coupled to provide equal force and torque for raising or lowering feeder house 204 without pivoting header 202.

The header 202 height and feeder house 204 height relative to the frame 224 of harvester 200 are directly related to the displacement of cylinder 206 (and the length of member 230). In addition to raising and lowering header 202, application of pressure to cylinder 206 may be used to counterbalance the combined weight of header 202, feeder house 204 and the crop present in header 202 and feeder house 204. when the header is making contact with the ground 220. An automated header control system (AHCS) 216 may be operated in several modes, as described below, to control the height and orientation of the header.

According to one aspect of the present invention, an active, closed loop AHCS 216 causes header 202 to track the ground 220 by applying a counterbalancing force to header 202 through cylinder 206. The counterbalancing force reduces the effective weight force that header 202 applies to the ground 220, so that the weight force has a reduced value. This method of control is referred to herein as "Ground Tracking/Floatation". Ground Tracking/Floatation control in accordance with the present invention differs from prior passive floatation systems, in that the header actually rests on the ground and the pressure in the actuating cylinder is maintained substantially at a setpoint value, wherein the setpoint is varied as header 202 moves over changes in ground inclination. As a result, header 202 exerts a force against the ground substantially less than the weight of header 202. With header 202 in actual contact with the ground, the header tilt is controlled passively, allowing header 202 to swivel as the contours of the ground push against it.

A Ground Tracking/Floatation facility 249 (hereafter "Ground Tracking 249") is provided to provide ground tracking with header 202 on ground 220, even when the elevation changes abruptly. Because of friction (e.g., cylinder seals), there is deadband in active floatation systems. The minimum cylinder pressure required to raise header 202 (hereafter, the "raise-header pressure" or RHP) is greater than the maximum cylinder pressure below which the header lowers (hereafter, the "lower-header pressure", or LHP). In rapidly changing terrain, maintaining constant cylinder pressure results in inability of header 202 to closely track the ground. In particular, header 202 hovers above ground 220 immediately after vehicle 200 reaches the top of a hill and starts to descend.

Ground Tracking 249 in AHCS 216 senses whether ground 220 is rising or falling rapidly, based on the rate of change of pressure in cylinder 206. Ground Tracking 249 adjusts the set point according to the type of terrain, and provides the adjusted set point to a closed loop pressure control function 250, which maintains the pressure at the new set point. In slowly falling terrain ("Lower Mode" 910), pressure is maintained at a first value slightly below LHP. In rising terrain ("Raise Mode" 912), cylinder pressure is maintained at a second value slightly below RHP. In rapidly falling terrain ("Fast-Lower Mode" 914), two steps occur: (1) cylinder pressure is quickly reduced to a (low) third value so header 202 falls; and (2) when the cylinder pressure crosses below a threshold value (representing contact between header 202 and ground 220), increasing pressure to a fourth value slightly above value. Ground Tracking 249 then returns to Lower Mode 910.

Figure 9:
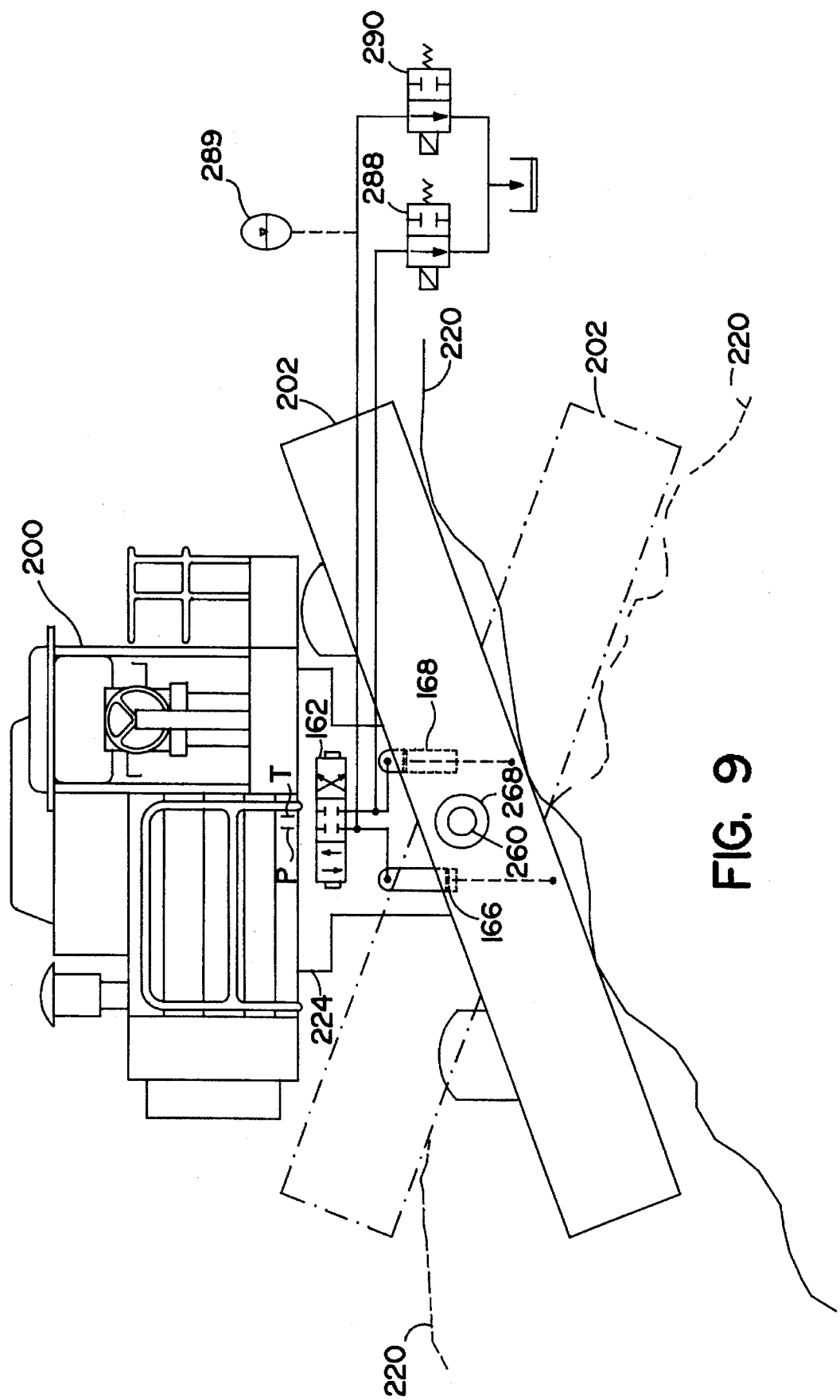
FIG. 9 is a front elevation view of the harvester shown in FIG. 2A, with floatation and lateral tilt functions operating.

Referring to FIG. 9, the valve 162 that controls the header tilt may be set in a "hydraulic float" position for passive lateral tilt. This allows the two cylinders 166 and 168 that control the header tilt to exchange oil either between themselves or between themselves and tank. For passive lateral tilt, valve 162 is placed in the center position and the two electrically operated on/off pilot valves 288 and 290 are energized so that fluid may be exchanged between cylinders 166 and 168 if torques produced by contact with the ground cause the header to rotate. Alternatively, a different three position valve (not shown) may be used in place of valve 162 and valves 288 and 290 eliminated; the three position valve having a "float position" that couples the two cylinders to one another. Such a valve could not, however, be used for both active and passive tilt control.

Referring again to FIGS. 1A, 1B and 2A, AHCS 216 receives a pressure feedback signal 214 (from a pressure transducer 232) identifying the pressure in cylinder 206. AHCS 216 receives a speed signal 210 representing the ground speed of harvester 200. The speed signal 210 may be provided by a sensor in the vehicle's transmission (not shown), which translates to a maximum force. The harvester operator inputs a desired pressure (between header 202 and ground 220) using operator controls 218, such as a potentiometer. Ground Tracking 249 generates a setpoint value for each ground tracking mode based on the value entered by the operator. The cylinder pressure is compared to the setpoint value. Valve assembly 100 increases or decreases the pressure applied to cylinder 206 to maintain the pressure at the setpoint value. For example, if the ground 220 under header 204 rises, the cylinder pressure and counterbalancing force decrease, requiring the AHCS 216 to increase the pressure in cylinder 206. If the ground 220 falls off gradually beneath header 202, the pressure and counterbalancing force increase, requiring AHCS 216 to decrease the pressure in cylinder 206.

Valve assembly 100 includes a proportional raise control valve 118 (shown in FIG. 2A) and a proportional lower control valve 120 (also shown in FIG. 2A), both fluidly coupled to cylinder 206 to apply pressure corrections when the measured pressure 214 in cylinder 206 deviates from the setpoint value. AHCS 216 computes an input signal (for driving raise valve 118) and a further input signal (for driving lower valve 120) from the difference between the pressure signal and the setpoint value.

The present invention includes proportional control valves 118 and 120. A proportional integral derivative (PID) control algorithm is used to determine the rate at which the proportional valves 118 and 120 are opened and closed to keep the pressure in the cylinder 206 substantially constant, without imparting a jerk force to the apparatus. AHCS 216 generates proportional, integral and derivative signal components that are proportional, respectively to the difference, the integral of the difference and the derivative of the difference with respect to time. The proportional, integral and derivative components are combined to form the input signal 104 to raise valve 118 and the further input signal 106 to lower valve 120. Cylinder 206 compliance is achieved, because any pressure change in cylinder 206 (for example, a pressure decrease which occurs when header 202 goes over rising ground) is immediately sensed by transducer 232. As soon as the pressure change is detected, oil is either applied to the cylinder 206 or released from cylinder 206 at a controlled rate, allowing header 202 to follow the contours of the ground 220. An exemplary pressure transducer suitable for use in a system embodying the invention is the pressure transducer model No. SA-3000, manufactured by Data Instruments, Inc., of Acton, Mass.

The PID control smooths the opening and closing of valves 118 and 120 so as to minimize jerk force due to changes in the acceleration of the header. In addition, the coefficients used in the PID algorithm are varied as the speed of harvester 200 (identified by speed signal 210) changes, effectively changing the response time (bandwidth) of the system. If header 202 is too responsive at slow speeds, then valves 118 and 120 (shown in FIG. 2A) are constantly opening and closing, wasting energy. If the response time is too great in a rapidly moving vehicle, the system lags and header 202 does not track the ground properly.

According to another aspect of the invention, AHCS includes means for applying respective first, second and third gains to modify the respective first (proportional), second (integral) and third (derivative) signal components before combining them. The modified proportional, integral and derivative signal components are then combined and the combined signal is used to generate the input signal 104 and further input signal 106. AHCS includes means for varying the first, second and third gains when a driving condition of the agricultural harvester, such as the harvester speed, changes.

According to another aspect of the invention, AHCS 216 receives a position signal 208 representing the position of feeder house 204 and header 202 relative to frame 224 of harvester 200, or a position signal 236, 237 representing the position of header 202 relative to ground 220. Header height may be maintained at a desired value relative to the ground 220 or frame 224 for crop cutting. Position signal 208 may be provided by a variety of different types of sensors. The position signal may represent the position of the header relative to the ground, as measured by devices such as contact sensors 236, 237. Alternatively, the position signal may measure the angle of the feeder house with respect to the frame 224 of the harvester, as measured by devices such as potentiometer 234. The latter measurement is used for "stubble height" control of the header position, as explained below. The input signal 104 to raise valve 118 and the second input signal 106 to lower valve 120 may be controlled in order to maintain the header at a desired setpoint height.

In accordance with the present invention, two different methods may be used to sense the height of header 202 and feeder house 204 relative to the ground. If header 202 is within a few centimeters of the ground, then conventional sensors attached to bottom of the header can contact the ground and measure the actual header height. This type of header position control is referred to herein as "header height" control, because the actual header height is measured directly. Header height control is advantageous if the ground height changes rapidly; the ground below frame 224 may have a different ground height than the ground below header 202.

If header 202 is held at a height well above the ground, the contact type sensors lose contact with the ground and cannot measure the height. This may occur, for example, when cutting the top of a tall crop such as corn or wheat. According to the present invention, a position sensor which measures the position of header 202 and/or feeder house 204 relative to frame 224 of the harvester 200 is used for cutting the top of a tall crop. This type of control is referred to herein as "stubble height" control. Stubble height control maintains a fixed position of header 202 or the cutter bar (not shown) relative to frame 224.

In the exemplary embodiment, stubble height control maintains a fixed angle 251 between feeder house 204 and frame 224 of harvester 200. Any increase in the length of member 230 causes a decrease in angle 251 and an associated increase in the height of header 202. There is a one-to-one correspondence between angle 251 and the height of header 202 relative to frame 224. Stubble height control provides a wide range of height control, because the sensor 234 is rotary in nature (e.g., a potentiometer, or an incremental optical encoder with a reference pulse) and can measure the angle 251 throughout the full operating range of header positions. Alternatively, angle 251 may be measured indirectly by a sensor 253 which may be a linear potentiometer or linear variable displacement transformer (LVDT), as shown in FIG. 1B. Each position of LVDT 253 represents a respective feeder house angle 251 that may be computed from trigonometric relationships and stored in a look-up table in memory 140. Although stubble height may be used throughout the range of header heights, it may be advantageous to use stubble height control at large header heights and use header height control relative to the ground 220 (using position sensors) at lower header heights.

According to another aspect of the invention, header height may be combined with active control of the tilt of the header (and the cutter bar) relative to the frame 224 of harvester 200. Tilt control uses multiple position sensors on the bottom of header 202 to determine the angle of the ground below the header, relative to frame 224. Both the header height and the tilt are controlled using PID control. Depending on the ground conditions, either header height or tilt control may be given precedence. This is accomplished by applying corrections in response to feedback and adjusting the PID gains more often for the control mode (header height or tilt) having precedence.

According to another aspect of the invention, the control system includes an automatic resume function, for switching from manual height control to automated stubble height control. In a typical application, the operator maintains header 202 near the usable portion of the crop while driving the combine across a crop row. At the end of the row, a memory retains the height of header 202, as measured by angle 251. Then the operator raises header 202 high above the ground under operator control, so that he or she can rapidly move harvester 200 to the beginning of the next row. In response to the operator action, AHCS interrupts transmission of the input signal 104 and the second input signal 106 to the first (raise) and second (lower) control valves 118 and 120, respectively. AHCS 216 generates and transmits a raise signal to cause valve 118 to apply sufficient fluid to cylinder 206 to raise header 202 to a predetermined raised position.

After the vehicle reaches the next row, in response to a further operator command (or action), the resume function repositions header 202 at the desired crop cutting height. The angle 251, and therefore the position of header 202, are measured even at the highest header height. It is thus possible to automatically lower header 202 back down to cutting height under PID control. Above a predetermined transition position (i.e., while high above the ground), header 202 moves according to a predetermined velocity profile, which may be rapid. After the transition position, the normal operation, including generation of the input signal 104 and second input signal 106 to maintain the header at the desired position. Thus AHCS 216 gradually reduces the height as header 202 nears the desired cutting height retained in memory, without any jerk.

A variety of velocity profiles may be used for the initial lowering of the header by the resume function, above the transition point at which control returns to the control mode (stubble height, header height or floatation) that was being used before raising the header at the end of the previous row. Respectively different sequences of events may occur when the resume function is used to return to respectively different (stubble height, header height or floatation) control modes. For example, if the header position retained in the memory is a low position, it may be desirable to move the header at the maximum speed until it is close to the setpoint, and then to reduce the speed.

According to another aspect of the invention, an automated calibration capability is provided by the header control system. This allows the operator to calibrate the sensors without leaving the cab of harvester 200. Routine calibration is extremely important due to variations between different headers that may be placed on a combine, and due to variations in the combine, header and sensors that occur during and after each use in the field. The calibration capability correlates the header position and cylinder pressure signals returned by the sensors as the header is moved through its range of motion and the cylinder pressure is varied. Through this calibration process, the transition points between control modes, the limits of feeder house 204 motion, and deadband are determined.

According to another aspect of the exemplary embodiment of the invention, a single electrohydraulic valve assembly 100 may be used to control the header height in the floatation, stubble height, header height, resume and calibrate modes.

DETAILED DESCRIPTION

Referring to FIGS. 1A and 2A, the method used for raising and lowering the header includes a four-bar linkage. The four-bar linkage consists of three fixed length links 224, 226 and 228 and one variable length link 230 formed by the header cylinder 206. One of the four angles associated with the four-bar linkage is fixed with the remaining three free to vary. Typically, two cylinders 206 are used, one on each side of the machine; however they are connected to the same pressure source. For the discussion herein, reference is only made to a single cylinder 206. The feeder house 204 is raised as the header cylinder extends, and the feeder house is lowered when the cylinder retracts.

Typical headers weigh in the order of 2000 lb., therefore it is desirable to counterbalance the actual header weight in order to minimize the effective weight or force on the ground. This allows the header to be placed right at ground level, instead of above the ground. By reducing the effective force on the ground, the agricultural harvester 200 does not destroy the field by unnecessarily plowing it up, nor does dirt enter the sensitive separator mechanism of a combine. Additionally, forces produced by the ground on header 202 are minimized thus reducing the required power to drive harvester 200.

As shown in FIG. 1A, the system includes two sensors. The pressure transducer 232 is used to measure the pressure in the actuating cylinder 206 to control the cylinder pressure. The feeder house position sensor 234 is used to measure the position of the feeder house when the header height is too great for contact sensors 236 to reach the ground.

The proportional valves 118 and 120 may be implemented as either pressure/flow control valves or as flow control valves. In the exemplary embodiment, the valves 118 and 120 are pressure/flow control valves, as described below in greater detail.

The operator controls 218 include electrical switches (not shown) to control the raise and lower functions. These switches are designed to operate independently of the AHCS 216 to provide a manual operation mode. The control system includes a multifunction display that shows the setpoint pressure, the actual pressure on the cylinder, or the computed effective weight of the header on the ground. Means are provided for adjusting the setpoint, such as a potentiometer, or arrow keys. A further switch initiates calibration procedures.

The AHCS 216 allows the operator to manually control the raise and lower functions of header 202 during the automatic sequence or during the calibration process. Manual control is typically used to allow the operator to raise header 202 at the end of a row. Once the operator touches the manual controls, the AHCS 216 enters a standby mode. The operator subsequently issues a resume command to continue automatic operation. Once manual control is invoked by the operator both raise and lower functions operate. If invoked during calibration, the resume function is not operational and the calibration sequence is reinstated.

The AHCS 216 allows the operator to depress a single control to resume automatic operation of the automatic function after the control system has been placed in standby mode. This process utilizes a mode switching technique to ensure a smooth transition from the raised header height to a first predetermined height prescribed by the automatic control. The resume function causes header 202 to lower at a predetermined rate until initial ground contact is attained (the transition point). Once this transition point is detected, Ground Tracking/Floatation state machine 249 (hereafter, "Ground Tracking 249") and closed loop pressure control function 250 (hereafter, pressure control 250) take over and adjust the cylinder 206 pressure to ensure that the proper counterbalance force is applied.

As previously described, header 202 floatation is achieved by actively counterbalancing the weight of header 202 on the ground 220 by the application of pressure to the header cylinders 206. This results in an effective weight of header 202 and feeder house 204 on the ground 220 which is less than the actual weight of header 202 and feeder house 204.

The counterbalancing process only applies when header 202 is contacting the ground 220. If header 202 is raised and is stationary, the pressure in the raise cylinder 206 exactly balances the weight of header 202 and feeder house 204.

Because a four-bar linkage 224, 226, 228 and 230 is utilized to raise header 202, the actual pressure that is applied to the cylinder 206 to balance header 202 and feeder house 204 varies as a function of the height of header 202 above its reference. This relationship is due to the mechanical advantage of the mechanism and also the non-linear relationship between cylinder 206 stroke and header 202 height.

Friction is present on the joints and in the cylinder 206. The static component of the friction tends to introduce a deadband. The deadband may also vary with position and contributes to the actual pressure needed to keep header 202 stationary.

The concept for floatation is based on regulating the pressure in cylinder 206 to remain at a first setpoint in level or falling terrain, and at a second setpoint in rising terrain. A special pressure adjustment is made when the terrain suddenly changes from rising terrain to falling terrain at the top of a hill. The first and second set points are set by Ground Tracking 249, described below with reference to FIGS. 23–25.

The cylinder pressure—header height relationship is generally flat, assuming that the pressure in cylinder 206 is the only force balancing the weight of header 202 and feeder house 204. The curve is not perfectly flat due to the mechanical advantage of the four-bar linkage 224–230. Increasing or decreasing pressure in cylinder 206 results in linear velocity of cylinder 206 and ultimately header 202 rises or falls. Depending on the magnitude of the pressure change, the system may reach a new equilibrium point or continue to move.

Once header 202 contacts ground 220, further pressure reduction in cylinder 206 does not change the height of header 202. As the cylinder 206 pressure decreases, more of the header 202 weight is applied to ground 220. Active counterbalancing is possible. If the pressure in cylinder 206 is increased above the point where ground contact is made, cylinder velocity results.

If the header 202 height is adjusted to a given level with respect to a reference point on the frame 224, there is an associated cylinder pressure and an associated cylinder extension. If header 202 is lowered, it eventually contacts the ground 220. A force balance occurs when header 202 just contacts the ground 220. This corresponds to a effective force on the ground 220 of zero (because the cylinder is producing all the balance force). As the cylinder pressure continues to decrease, the header does not lower, but the force applied to the header is decreased, thereby increasing the effective force on the ground. This continues until the entire weight of header 202 is applied to the ground. The effective force on the ground is the actual weight of the header minus the force applied by the header cylinder.

Because cylinder pressure is nearly constant at different header heights (while header 202 is stationary), the effective force on the ground is essentially the same for a given cylinder pressure regardless of header heights with respect to some reference. With cylinder 206 at a force balancing pressure, if the ground falls (and consequently causes header 202 to fall), cylinder 206 retracts due to the motion of the header and the cylinder pressure increases. When the ground rises, causing header 202 to rise, cylinder 206 extends and cylinder pressure decreases. For a fixed cylinder pressure, the effective force on the ground varies, because the nominal operating point is modified by the increase or decrease in the cylinder pressure caused by header motion due to terrain changes. Thus there is the potential for wide fluctuations in the effective force on the ground as the header traverses the field.

Variations in the counterbalance operating point (or effective force on the ground) are minimized by maintaining the cylinder 206 pressure at a setpoint level over a wide range of terrain. (As explained below with reference to FIG. 24, a first nominal pressure value is used when the terrain is rising in front of header 202; a second nominal pressure value is used when the terrain is falling in front of header 202). With the nominal cylinder pressure substantially constant, actual effective weight on the ground still varies slightly, but the variation is significantly less than that due cylinder movement. On the average, the effective ground force remains near the respective set points for rising or falling terrain, respectively. The system increases crop yield for low lying crops and minimizes disturbances to the ground in the field.

Figure 2B:
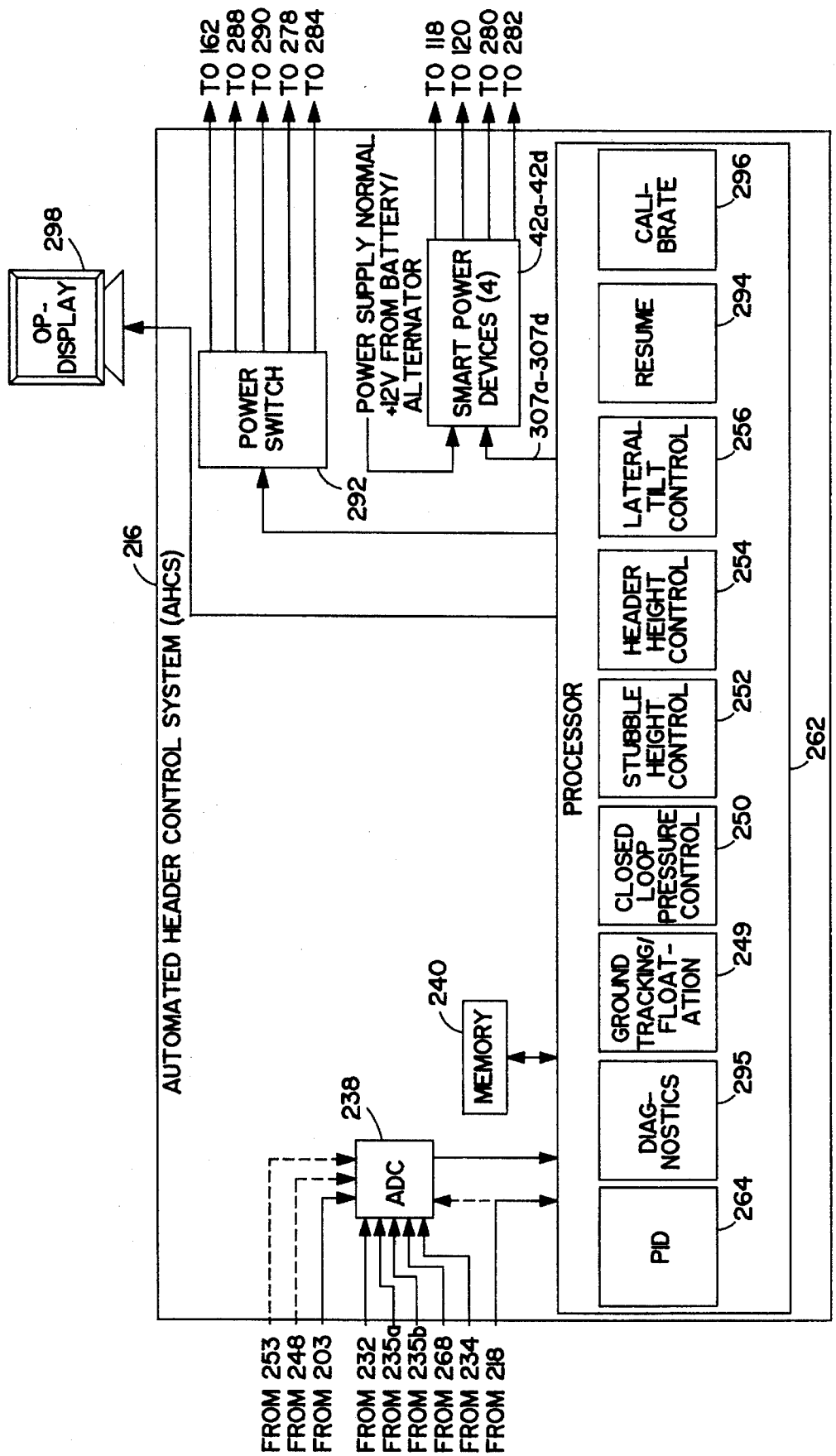
FIG. 2B is a block diagram of the automated header control system (AHCS) shown in FIG. 2A.

FIG. 2B is a block diagram of AHCS 216, shown in FIG. 2A. AHCS 216 receives input signals from sensors and commands from the operator. AHCS processes the signals and commands and controls the hydraulic system to maintain a desired header position.

Sensors provide analog input signals to AHCS 216. The sensors include vehicle speed sensor 203, load pressure sensor 232, header pivot angle sensor 268, feeder house angle sensor 234, and the potentiometers 235a and 235b of left and right ground contact sensors 236 and 237. An optional draft pin 248 (shown in FIG. 1B) may be used to resolve and measure the effective weight of header 202 on the ground 220, instead of deriving the effective weight from the load pressure sensed by transducer 232 in line 112. Also, an optional linear potentiometer 253 or LVDT (shown in phantom in FIG. 1B) may be used to measure the feeder house angle instead of rotary potentiometer 234.

The analog sensor input signals are provided to an analog/digital (A/D) converter 238, which converts the signals to digital form and provides the digital signals to a processor 262. An exemplary processor suitable for use in the AHCS is the Motorola 68HC11 processor. The 68HC11 processor includes an internal multiplexed A/D converter, so that a separate converter 238 is not required with the 68HC11. The operator input signals may be provided in a digital form directly to processor 218. Alternatively, the operator may use analog input devices to input commands to processor 262 by way of A/D converter 238.

The processor 262 executes several control functions. Ground Tracking 249 sets and adjusts the pressure set point for cylinder 206, to accommodate varying terrains (e.g., falling terrain, rising terrain, or the top of a hill). Pressure control 250 commands the control valves to maintain a substantially constant header weight on the ground, using the pressure set point determined by Ground Tracking 249. Lateral tilt control 256 may operate in a passive mode to allow header 202 to pivot freely while the floatation function is operating. Stubble height control function 252 maintains the angle 251 between feeder house 204 and frame 224 at a substantially constant value. Header height control function 254 maintains a substantially constant distance between header 202 and the ground. Lateral tilt control function 256 may operate in an active mode while header height 254 is active, to maintain the header pivot angle substantially parallel to the average ground angle.

Additional functions executed by processor 262 are used in conjunction with all of the above functions. The PID function 264 determines the input signal to control valves 118, 120 that provides smooth header movement, based on operator supplied setpoints and sensor data. The PID algorithm is used for both the pressure control function 250 and position control functions 252 and 254. The diagnostics function 295 periodically checks the state of health of several subsystems to detect malfunctions and deviations from normal performance. The resume function 294 may be activated at the beginning of a row to automatically return header 202 from a raised position to the position it was in immediately prior to raising header 202 (typically, the position at the end of the most recent previous row). Resume function 294 may be used to return AHCS to floatation, stubble height or header height operating mode. The calibration function 296 may be executed to automatically command the hydraulics to position the header as necessary to calibrate the feeder house potentiometer 234, the header contact sensors 236 and 237. The data are automatically stored in memory 240.

The output signals from AHCS 216 drive the hydraulic system and the operator display 298. The invention includes both on/off valves 288, 290, 278 and proportional valves 118, 120, 280 and 282. To drive the on/off valves, processor 262 provides on and off signals to a power switch 292, which closes an appropriate switch to actuate one of the respective valves 288, 290 or 278.

In the exemplary embodiment, processor 262 provides digital pulse width modulated signals to smart power devices 42a and 42b (one per proportional valve). The average voltage supplied to drive respective valves 118 and 120 depends on the voltage supplied to the smart power device and the on-time of the PWM signal. This approach is described in detail with reference to FIGS. 25 and 26. In an alternate approach (not shown), to drive the proportional valves, processor 262 provides digital signals to a digital/analog converter (DAC), which provides analog output signals for each respective proportional valve that is actuated. The analog signals are amplified by an amplifier and transmitted to the respective valves 118, 120, 280 and 282.

GROUND TRACKING/FLOATATION CONTROL

Figure 3:
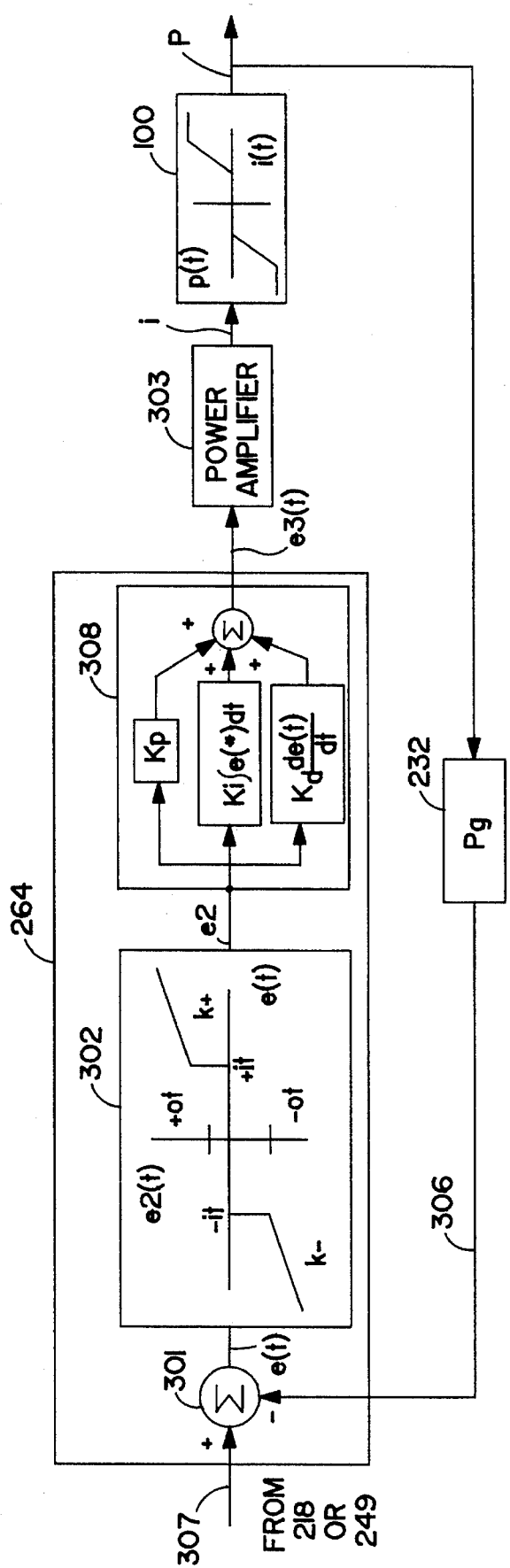
FIG. 3 is a block diagram of an exemplary embodiment of the floatation control function shown in FIG. 2A.
Figure 4:
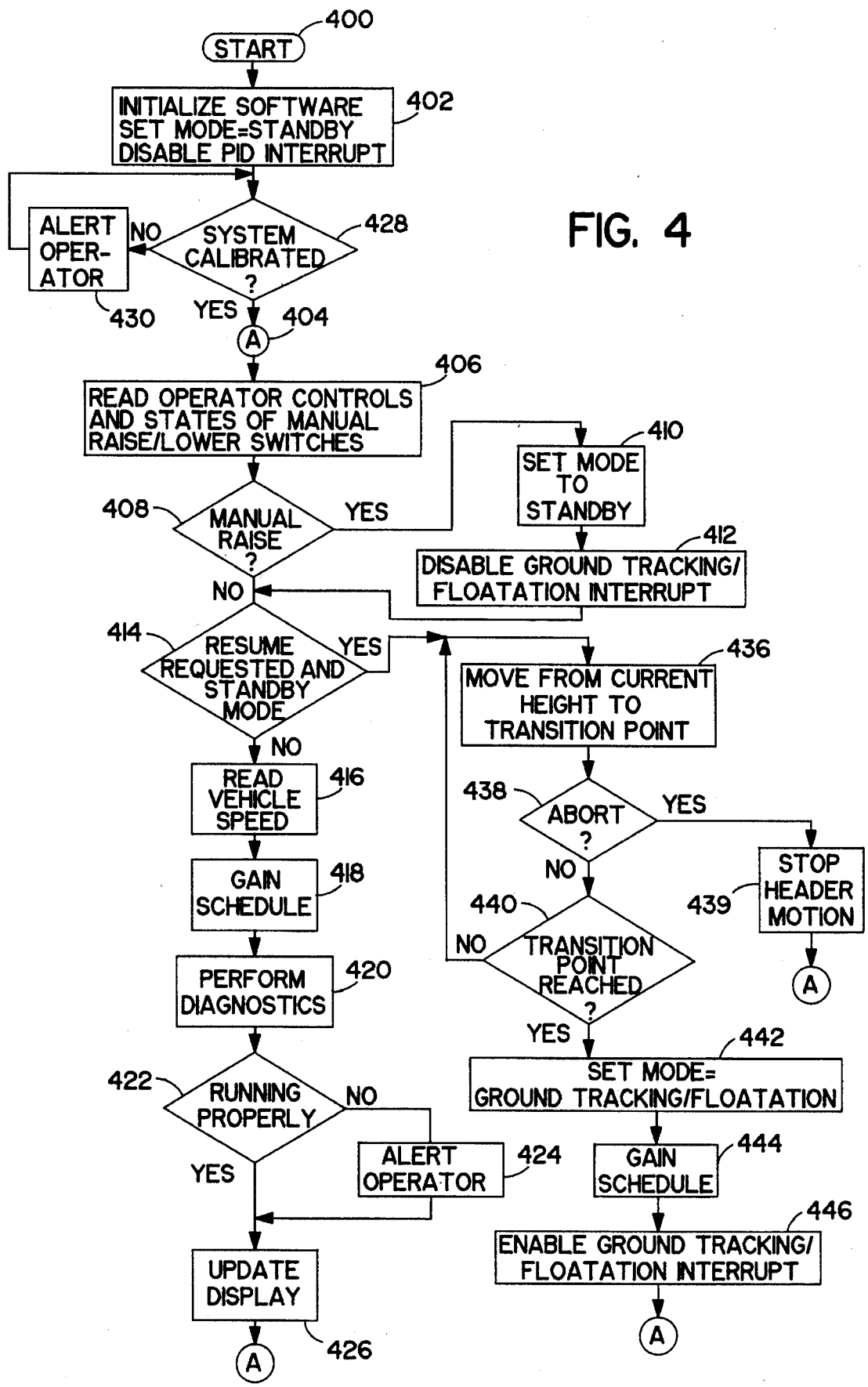
FIG. 4 is a flow diagram showing the functions performed by system when the Ground Tracking/Floatation function shown in FIG. 2B is active.
Figure 5:
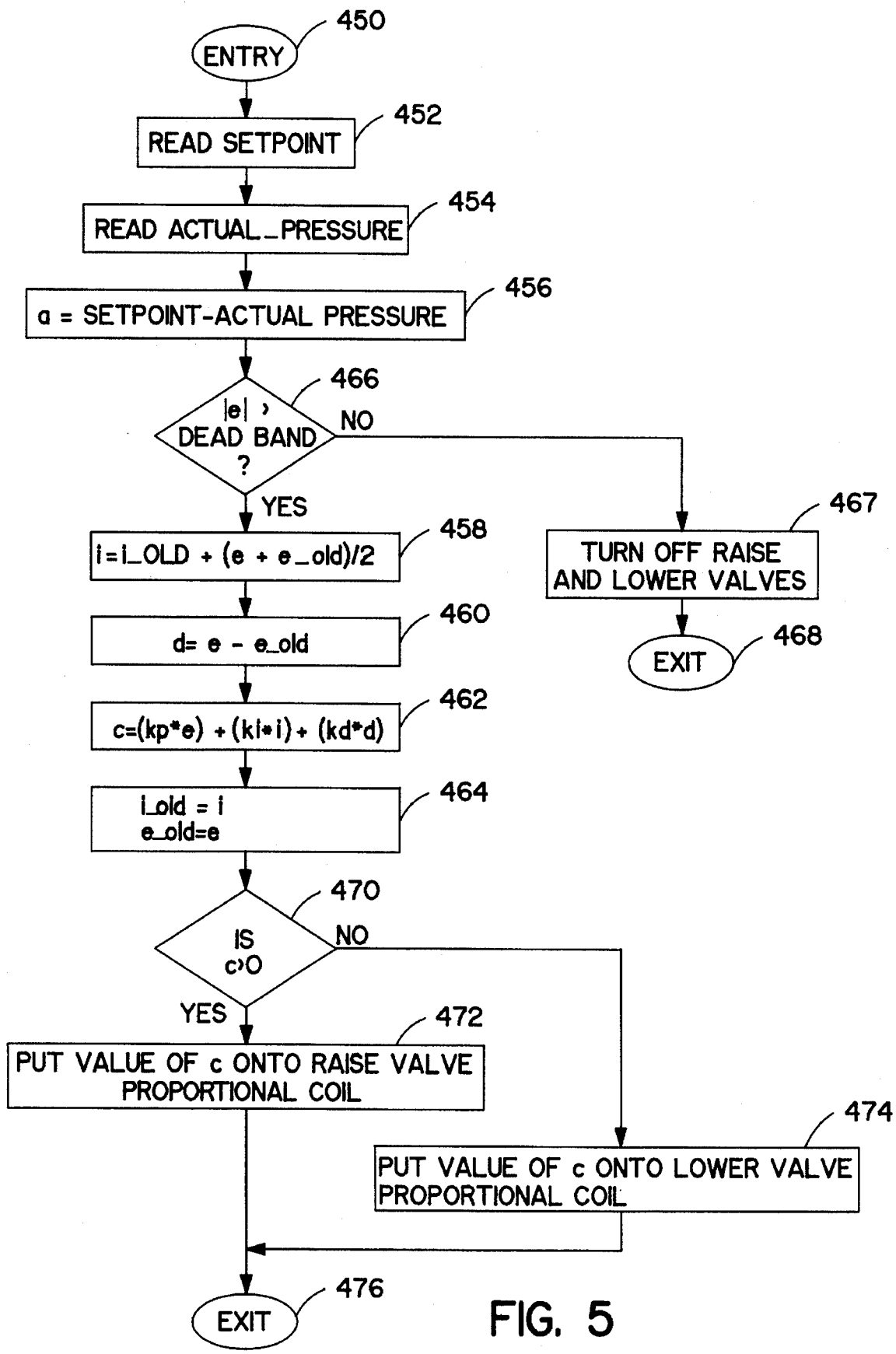
FIG. 5 is a flow diagram of the PID control function of the control system shown in FIG. 3.
Figure 24:
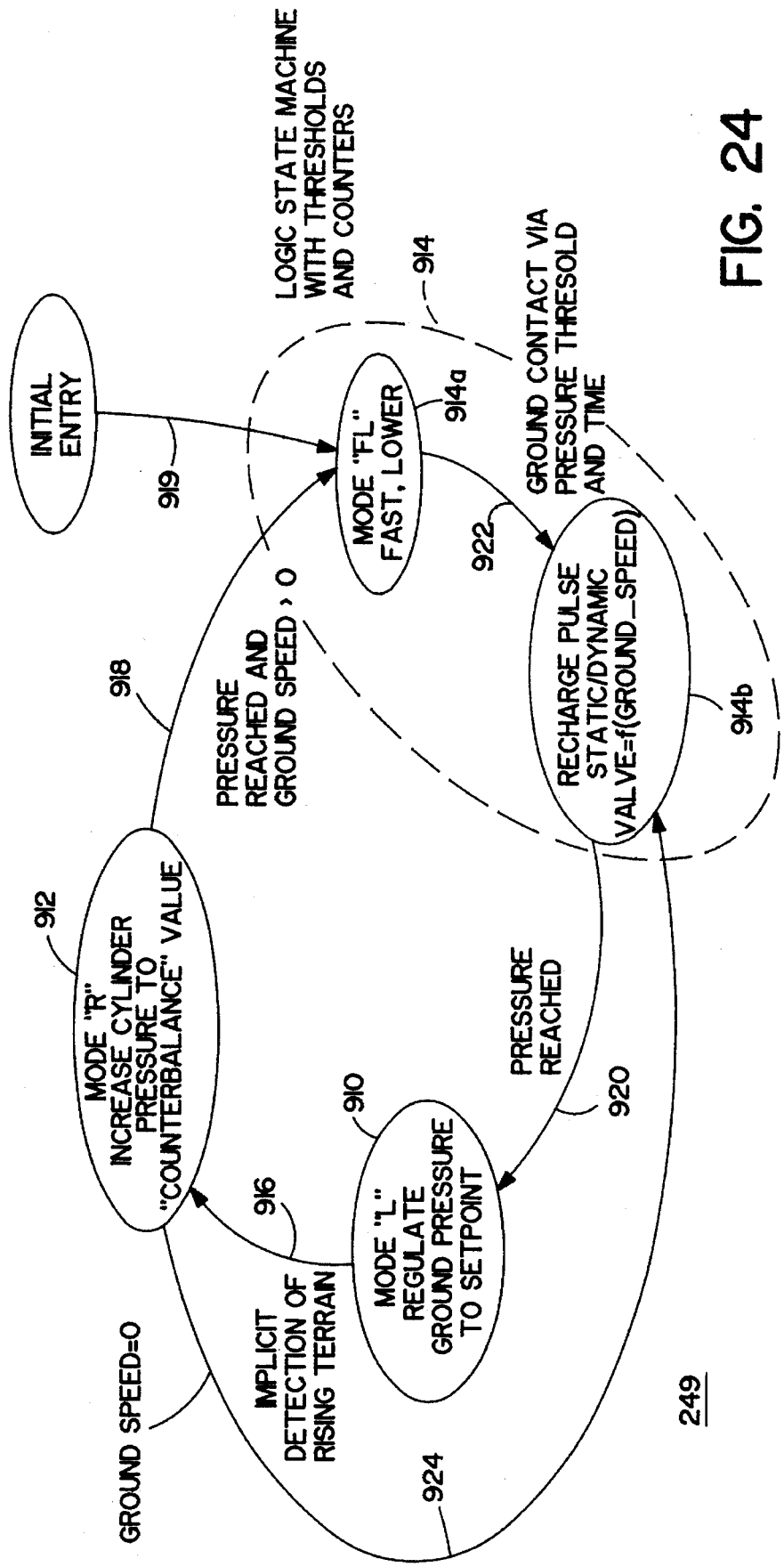
FIG. 24 is a state diagram of the Ground Tracking state machine shown in FIG. 23.

System operation with Ground Tracking 249 and Pressure Control 250 operating is shown in detail in FIGS. 4 and 24. FIG. 4 shows the overall system control while in Ground Tracking/Floatation mode. FIG. 24 shows the details of Ground Tracking state machine 249 that operates each interrupt cycle; and FIGS. 3 and 5 show the pressure PID control loop that operates when commanded by the Ground Tracking 249.

Reference is now made to FIG. 4, a flow chart of the floatation control function steps which update the operator display, sample the operator controls, sample vehicle speed and modify the PID parameters based on a gain scheduling technique. The flow chart also shows how calibration mode may be entered, mode switching occurs and diagnostics are executed. In the exemplary embodiment, the steps are implemented in software and executed in a microprocessor 262. These steps may also be implemented in dedicated hardware or firmware.

At step 400, the system is started. At step 402, the control loop is activated. The mode is set to standby and the Ground Tracking/Floatation control interrupt is reset. At step 428, a check is made to determine if calibration has been performed. If not, the operator is informed and Ground Tracking/Floatation control is discontinued until calibration is performed. Once calibration is successfully completed, control passes to step 406. At step 406, the settings of the operator controls and manual switch 218 settings are read. At step 408, if the operator initiates a manual header raising operation, than control is switched to standby mode at step 410, and at step 412, the Ground Tracking/Floatation loop interrupt is disabled, if previously enabled. This disables Ground Tracking 249.

At step 414, if the operator initiates the resume function to return from standby mode to active Ground Tracking/Floatation control, step 436 is performed.

At step 436, the system begins to lower header 202 from its current position to the transition point, approximately 1–2 inches (2.5 to 5 cm) above nominal ground contact, as defined below in the description of calibration. After a short predetermined interval, a further check is performed to determine whether the operator has aborted the operation, at step 438. If the operator has aborted the operation, then at step 439, movement of header 202 is stopped, and control passes to step 404. If there is not abort, the height of header 202 is compared to the transition point value at step 440. At step 440, if the transition point has not been reached, then steps 436 through 440 are repeated until the transition point is reached.

At step 442, once the transition point is achieved, the control mode is switched to Ground Tracking/Floatation. While in the Ground Tracking/Floatation mode, the pressure in cylinder 206 is controlled so that header 202 follows the ground 220. FIG. 24 shows the state machine that senses changing ground inclination and regulates pressure in cylinder 206 accordingly. Some of the states shown in FIG. 24 use pressure control 250, as discussed with reference to FIG. 5. The details of the PID control in this mode are discussed below with reference to FIG. 5.

Figure 21:
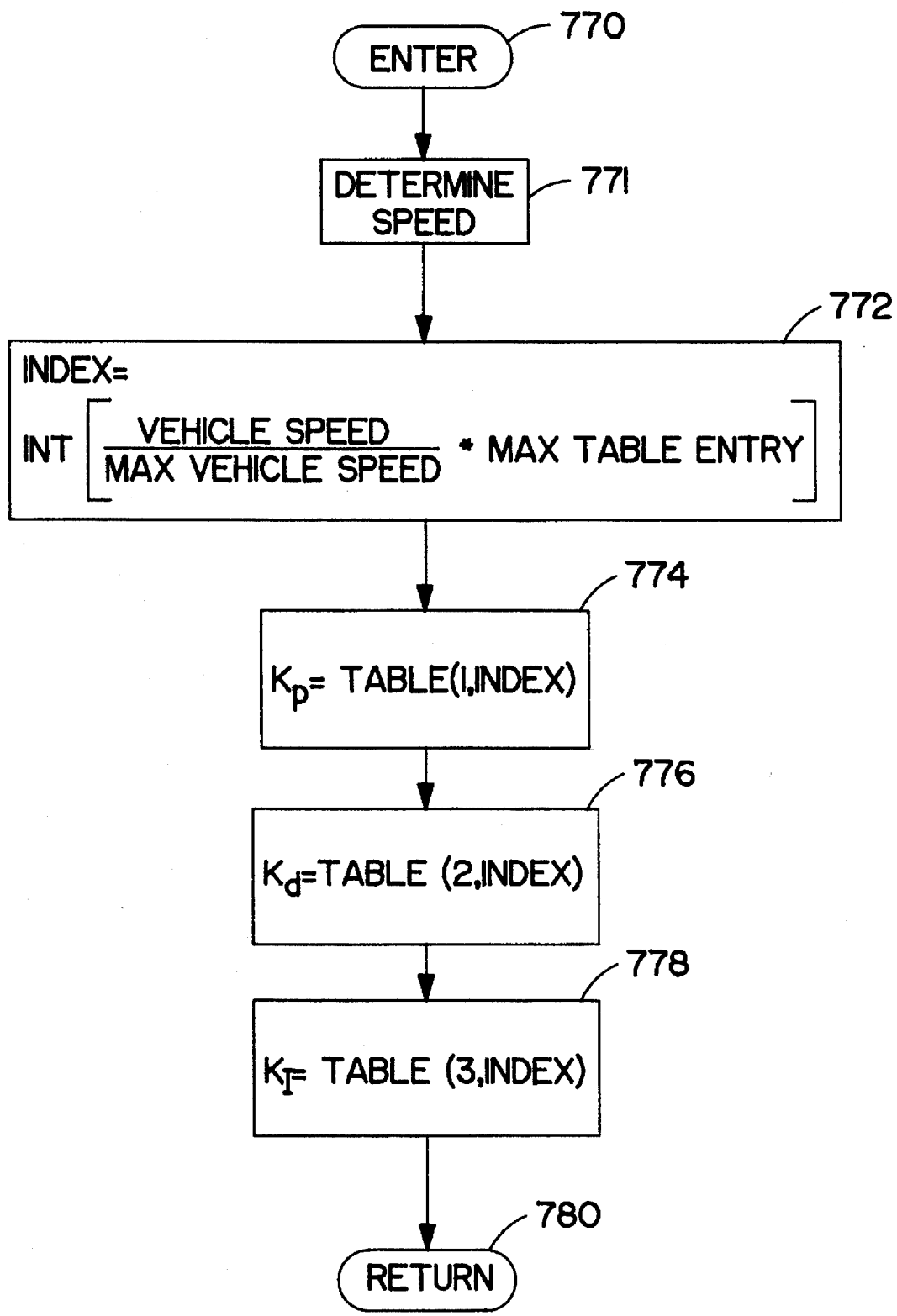
FIG. 21 is a flow diagram showing computation of PID coefficients as a function of vehicle speed.

Referring again to FIG. 4, at step 444, a gain schedule operation is performed. The gain schedule operation adjusts the gains used in the PID control, i.e., the constants Kp, Ki, and Kd by which the respective proportional, integral and derivative components of the pressure corrections are multiplied. These constants are changed when the speed of the harvester changes. The details of the gain schedule operation are shown in FIG. 21. In the exemplary embodiment of step 444, a table of values for Kp, Ki and Kd is maintained in a memory. When the gain schedule operation is performed, at step 771, the harvester 200 speed is determined from the speed signal 210 from the harvester's transmission (not shown). A set of values for Kp, Ki and Kd is associated with each harvester speed range. At step 772, an index value is computed, representing the speed of the vehicle, as a fraction of the maximum vehicle speed, and multiplied by the number of speed ranges. The table includes three constants, Kp, Ki and Kd for each value of the index. At step 774, Kp is read from the table. At step 776, Kd is read. At step 778, Ki is read. It is understood by those skilled in the art that other gain scheduling algorithms may be used in accordance with the invention, to best match the response time of the system to the current operating conditions.

Referring again to FIG. 4, at step 446, the Ground Tracking/Floatation interrupt is enabled. In the exemplary embodiment, a timed interrupt causes execution of the code implementing Ground Tracking 249 (described below with reference to FIGS. 23 and 24) and pressure control 250. The timed interrupt may occur every 25 ms. At each interrupt, the transition criteria (described with reference to FIG. 24) for exit from the current state are checked and if asserted TRUE, the state change is made. Additionally, if necessary, the closed loop pressure control loop shown in FIG. 5 is also executed. the steps beginning with step 450 through 476 are executed. After step 446, step 406 and the subsequent steps are executed (or repeated, if previously executed) in a loop fashion with the interrupt operation in the background.

At step 414 of FIG. 4, if the system is already under Ground Tracking/Floatation control, then steps 416 through 430 are executed. At step 416, the harvester speed is determined. At step 418, the PID constants Kp, Ki and Kd are adjusted, as in step 444. At step 420, hardware status is checked. At step 422, if an irregular condition is detected, the operator is alerted at step 424, and the system shuts down in the event of a catastrophic failure such as the loss of a sensor. At step 426, the display is updated. Similarly, at step 428, if a calibration is required, the operator is notified at step 430.

Figure 23:
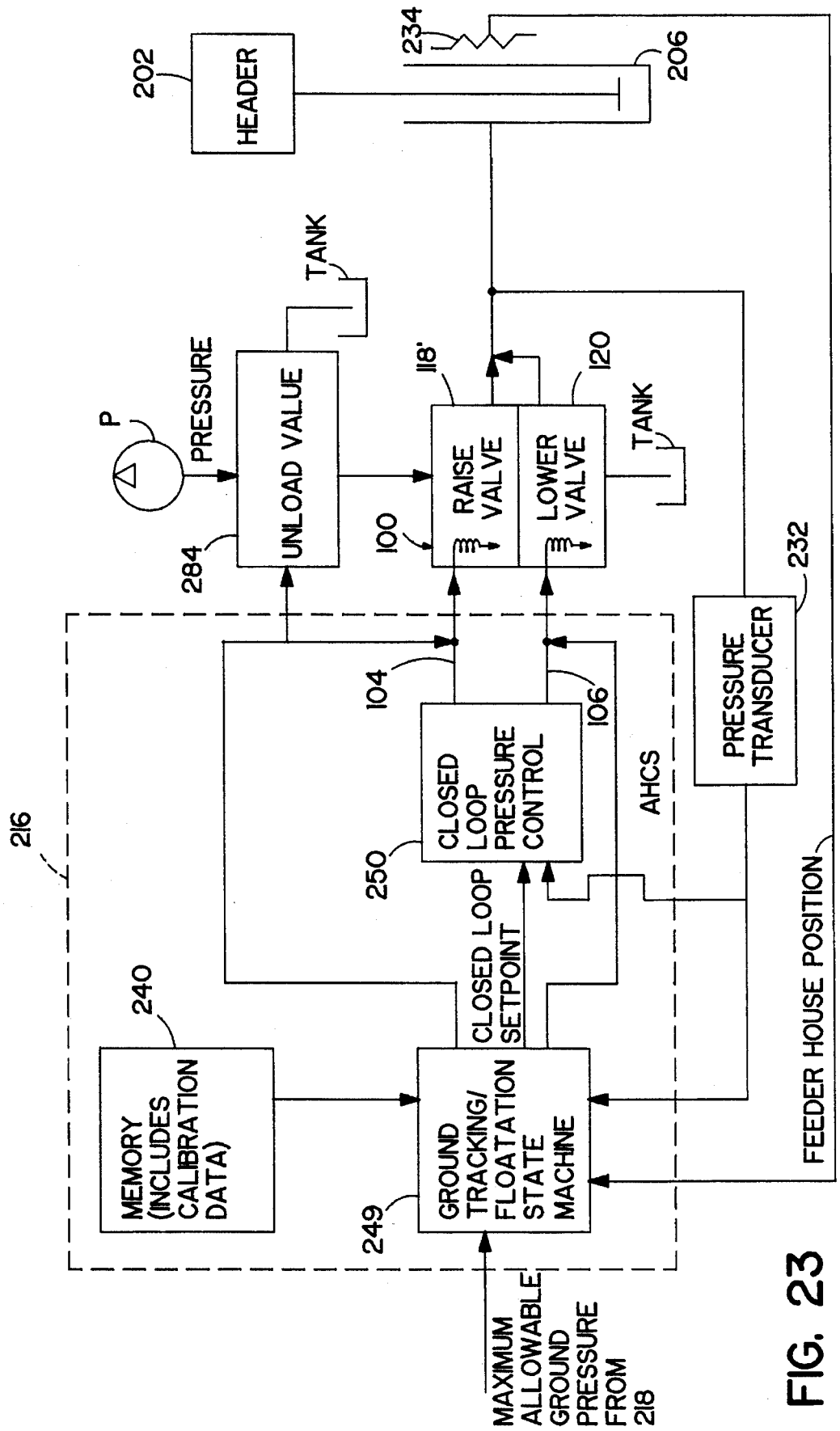
FIG. 23 is a block diagram of the exemplary system shown in FIG. 2A, showing the Ground Tracking/Floatation system interfaces in greater detail.

FIG. 23 is a block diagram of a system including Ground Tracking 249. Although FIG. 23 only shows Ground Tracking 249 and pressure control 250 within AHCS 216, it is understood that the other elements of AHCS 216 shown in FIG. 2B are also present. Ground Tracking 249 provides high level floatation control. Ground Tracking 249 senses the terrain and determines the correct control strategy for controlling valves 118, 120. In the exemplary embodiment, Ground Tracking 249 selects the pressure set point and uses pressure control 250 to operate raise and lower valves 118 and 120. Entry to Ground Tracking 249 occurs when step 442 of FIG. 4 is executed, as described above.

Referring again to FIG. 23, in exemplary Ground Tracking state machine 249, the position of header 202 is controlled to maintain constant contact with the surface of ground 220. Ground Tracking 249 provides fluid to cylinder 206 to maximize ground contact while maintaining the force header 202 exerts on the ground below a predefined level. Ground Tracking 249 is distinguished from pressure control 250, which maintains constant pressure between header 202 and ground 220. Ground Tracking 249 uses state information and measured cylinder pressure changes to set (or modify) the cylinder pressure set point so that AHCS 216 responds to all types of terrain without digging in or skipping across ground 220. Once Ground Tracking 249 establishes the set point, pressure control 250 maintains the desired cylinder pressure.

Raise-Header Pressure (RHP) is the minimum pressure in cylinder 206 that allows header 202 to slowly rise. Lower-Header Pressure (LHP) is the maximum pressure in the cylinder 206 that allows header 202 to slowly fall. These values depend on the actual weight of header 202 and the position of the four bar linkage 224, 226, 228, 230 (FIG. 1*b*), which is related to the extension of cylinder 206. Generally, to raise header 202, the pressure in cylinder 206 must be greater than RHP; to lower header 202, the pressure in cylinder 206 must be lower than LHP. Thus, the setpoints for raise and lower cylinder pressures are related to RHP and LHP, respectively. Typical values for RHP and LHP using a John Deere 9600 combine with a 215 Header are 1200 psi and 670 psi, respectively.

The difference between RHP and LHP indicates the friction of the system (cylinder seals, joints etc. and the mechanical advantage at a given position).

A calibration is performed to obtain the RHP, LHP, lower header limit and upper header limit. These values are dependent on the feeder house 204 design and the size and type of header 202. Header 202 is manually lowered to the ground. Then calibration starts. An initial starting value (dependent on the characteristics of valve assembly 100) is applied to the Pulse Width Modulation (PWM) control register (not shown) of raise coil 118. The raise valve control register (not shown) is incremented and feeder house sensor 234 (FIG. 1*b*) is checked to determine when header 202 has started moving. Once motion is detected, the pressure in cylinder 206 is recorded as RHP. The raise valve 118 is then incremented to allow header 202 to move to its upper limit more quickly. During this transition, feeder house sensor 234 is monitored until its output signal is constant (i.e., vertical motion is stopped).

Once vertical motion stops, raise valve 118 is opened fully and header 202 is allowed to stabilize at its full upper limit. The output of feeder house sensor 234 is recorded as the upper header limit. The raise valve 118 is turned off. The PWM value of lower valve 120 is set to an initial starting value and then incremented at a fixed rate. After each increment, feeder house sensor 234 is checked to determine if header 202 has started moving. Once motion is detected, the pressure in cylinder 206 is recorded as LHP. Lower valve 120 is then opened further letting header 202 fall more quickly. Feeder house sensor 234 is monitored until it indicates feeder house 204 has moved down halfway. Then the PWM value of lower valve 120 is reduced to decrease the speed of its decent and prevent header 202 from slamming into ground 220.

Feeder house sensor 234 is monitored until its output is constant, indicating no change in height. At this point the lower valve 220 is opened fully to discharge all pressure in cylinder 206, and header 202 is allowed to stabilize. The output of feeder house sensor 234 is then recorded as the lower header limit. The lower valve 120 is turned off and calibration is completed.

To achieve ground tracking the system senses when header 202 contacts the ground 220 and when the terrain changes. A terrain sensing mechanism is used. The exemplary Ground Tracking 249 senses ground contact indirectly via pressure and empirical header position information.

FIG. 24 is a state diagram showing the three modes of operation used by Ground Tracking 249, and the criteria for transition between modes. Referring now to FIG. 24, the modes are Lower 910, Raise 912 and Fast Lower 914. The following paragraphs describe the three operating modes, their philosophy of operation and details the criterion that switches from one mode to the next.

Only three transitions are used between respective modes: Lower to Raise 916, Raise to Fast Lower 918, and Fast Lower to Lower 920. Thus the modes Lower 910, Raise 912 and Fast Lower 914 are entered in sequence. Each of the three modes 910, 912, 914 enhances performance for a respectively different type of terrain. Each mode uses a respectively different method to indirectly sense ground contact.

Mode switching occurs in response to an indirect ground sensing mechanism based on pressure in cylinder 206. Empirical data on each mode 910, 912, 914 are used to define a respectively different cylinder pressure set point for each mode. The exemplary system cycles through the Raise 912 and Fast Lower 914 Modes, and returns to Lower Mode 910 whenever possible.

The modes 910–914 use different pressure set points based on the values or RHP and LHP determined during calibration. These values are used to generate an error signal (set point—actual cylinder pressure) which is used to indirectly detect changes in the terrain.

In Lower Mode 910, rising terrain is detected when pressure in cylinder 206 is less than the set point pressure plus deadband. This occurs because rising terrain supports more of the weight of header 202 and the resulting ground force tends to extend cylinder 206. In Lower Mode 910, falling terrain is detected when pressure in cylinder 206 is greater than the set point pressure plus deadband. This occurs because falling terrain causes cylinder 206 to support more of the weight of header 202.

In Raise Mode 912, rising terrain is detected when pressure in cylinder 206 is less than RHP because ground 220 is still pushing header 202 upward and increasing the volume of cylinder 206, preventing pressurization of cylinder 206. In Raise Mode 912, falling terrain is detected when pressure in cylinder 206 is greater than RHP.

In Fast Lower Mode 914, ground contact is detected indirectly. The exemplary method used to detect ground contact is to monitor pressure in cylinder 206 during downward travel. Initially, in mode 914*a*, the pressure remains substantially constant (for a given valve opening) until ground contact occurs. At the point of ground contact 922, pressure in cylinder 206 starts to decrease rapidly from its previously constant value. This rapid pressure drop indicates ground contact. Eventually, after ground contact, the pressure in cylinder 206 drops to zero.

In the exemplary system, in mode 914a, the lower valve 120 is set to a predetermined Lower Pulse Width Modulation (LPWM) value, and then turned off. This cycle then repeats until ground contact is sensed at point 922. The on/off pulsing minimizes friction and improves mechanical system response time. This approach allows use of larger pressure values, thus allowing more fluid to flow than if a constant pressure input signal is supplied to the cylinder via lower valve 120. The pressure in cylinder 206 is checked after each off cycle. This operation is terminated when the pressure in cylinder 206 is less than a predefined threshold. The threshold is found empirically by plotting the pressure in cylinder 206 as a function of time for a given LPWM (on/off cycle pulsing) and noting an intermediate value between the average pressure during downward travel and the pressure just at ground contact. This method allows the system to determine point 922, when header 202 contacts the ground 220. At point 922, mode 914b is entered, to recharge cylinder 206, as explained below in detail.

Referring again to FIG. 24, Lower Mode 910 is used on substantially level and slowly falling terrains. On level terrain, valves 118, 120 are de-energized as long as the pressure stays within deadband limits (most of the time). If valves 118, 120 do not include a relief function, no fluid flow is possible and cylinder 206 does not move while valves 118, 120 are not energized.

If pressure in cylinder 206 increases due to falling terrain, the system reduces cylinder pressure. A servo loop regulates the cylinder pressure to an operator selected level. The set point is defined as LHP minus an operator defined value. The ground 220 provides a force to balance header 202. If pressure in cylinder 206 remains within a deadband tolerance of the operator selected level, the system is inactive. If the pressure in cylinder 206 falls below the prescribed level for a threshold period of time (LR-time), shown at state transition 916, the mode transitions to Raise Mode 912.

The detection of pressure below the set point for a period of time may be caused by one of two external events: a rise in terrain or leakage of oil in cylinder 206. A rise in terrain causes an upward force on header 202, causing cylinder 206 to extend and its pressure to fall. Leakage of cylinder oil is typically due to the non perfect closure of the poppets in the second stage of valves 118, 120. This change in cylinder volume is very small. Pressure changes (small) due to volume leakage are usually detectable right after operation of the valve 118, 120. Within seconds, the valve seals and the pressure and volume remain constant. However, because small pressure changes are used to detect rising terrain, pressure changes due to volumetric leakage are sometimes detected and may be mistaken for terrain changes. This only becomes a problem when the vehicle is sitting still. The solution is to refrain from transitioning between Lower Mode 910 and Raise Mode 912 while the ground speed is zero.

Raise Mode 912 accommodates rising terrain. It uses a pressure servo loop to regulate the cylinder pressure to RHP minus a setback factor. This pressure set point is just below the pressure that causes header 202 to raise. At this set point, the weight of header 202 is almost counterbalanced by the cylinder pressure and the mechanical gain of the linkages at the nominal ground position. Thus, the force to raise the header provided by ground 220 is relatively small due to the counterbalancing pressure in cylinder 206.

To reduce the effects of friction and increase response speed, a dither type signal is imposed on the control signal while increasing pressure. This is accomplished by adding an off cycle (or skip) based on a modulo 4 counter. Pulsing the raise valve 118 allows a larger volume of hydraulic fluid to enter cylinder 206 than could be attained by simply biasing valve 118 on at a constant proportional level. This raises header 202 with less ground force than would otherwise be required.

When in Raise Mode 912, the detection of pressure above the set point for a predetermined period causes the next state change 918 to occur. State change 918 occurs when the ground falls, which implies that part of the weight of header 202 is no longer balanced by ground 220. Thus pressure in cylinder 206 increases. Note that pressure in cylinder 206 does not reach the set point while the ground is still rising, because contact with the ground causes extension of cylinder 206 and a corresponding reduction in pressure below the setpoint. With the detection of pressure above the setpoint for the defined duration, the operating mode transitions to Fast Lower Mode 914.

Fast Lower Mode 914 is used in the quickly falling terrain just after the end of rising terrain. If pressure in cylinder 206 is constant in all types of terrain, header 202 does not follow falling ground just after rising ground (i.e., at the top of a hill). If the flow rate from cylinder 206 is too slow, header 206 hovers above ground 220 for a period, making contact at a later time, referred to as skipping. Operation in Fast Lower Mode 914 comprises two processes: (1) process 914a, comprising quickly reducing the pressure in cylinder 206 to a very low value; and (2) process 914b, comprising rapidly charging cylinder 206 to a pressure slightly greater than the minimum cylinder pressure that the operator can set in Lower Mode 910. Once the two processes 914a, 914b are complete, the state transitions to Lower Mode 910 and the cycle repeats.

In process 914a, to quickly reduce pressure in cylinder 206 (so that header 202 falls), lower valve 120 is cycled on and off with a Pulse Width Modulation (PWM) value at a rate of 8 milliseconds. Initially, the PWM value is set to a value which quickly reduces pressure in cylinder 206. After a number of cycles, the PWM value is reduced to a lower setting. Several cycles are completed before the system starts checking the pressure of cylinder 206. These cycles allow header 202 to fall at a faster rate without prematurely transitioning to Lower Mode 910.

Once moving, header 202 continues to fall at this rate until ground contact is made. When ground contact is made the pressure in cylinder 206 falls below the ground contact pressure threshold, causing the input signal to lower valve 120 to be shut off. This process terminates when the pressure in cylinder 206 crosses a lower trigger point (LTP) and a fixed number of cycles are executed. The number of cycles depends on the distance header 202 moves while in Raise Mode 912. At this point, transition 922 from process 914a to process 914b occurs.

Process 914b recharges the pressure in cylinder 206 by ramping to a constant value on the raise valve until the cylinder pressure exceeds the prescribed limit. That event signals the end of Fast Lower Mode 914 and immediate transition into Lower Mode 910.

In the exemplary embodiment, Fast Lower Mode 914 allows header 202 to track ground 220 on terrains having steep slopes or abrupt changes (in inclination or height). Consider operation of the system having proportional control, but without a Fast Lower Mode 914, i.e., a system that only includes Raise and Lower Modes. When switching from Raise Mode 912 to Lower Mode 910, the difference between the cylinder pressure and the set point pressure is large. This produces a large error allowing the header to initially fall at an appropriate rate. However, as the cylinder pressure approaches the set point, the error decreases, causing the header to slow down. Because the harvester is traveling horizontally (at approximately 5 kilometers per hour) a large distance may be traversed before header 202 again touches the ground. As a result, a large amount of crop is missed when header 202 falls more than approximately 6 inches (15 cm).

One possible approach to solve the above problem is lowering the pressure set point for cylinder 206 in Lower Mode 910. But this approach would cause Ground Tracking 249 to switch to Raise Mode 912 as soon as the pressure in cylinder 206 drops below the set point; this would occur before header 202 contacts ground 220. The resulting motion would be a "ratcheting" effect as the header falls and the system switches between Raise and Lower modes 912 and 910, respectively.

Instead, in the exemplary embodiment, Fast Lower Mode 914 comprises a process 914a of lowering the header quickly until ground contact is attained and then a process 914b of recharging the cylinder pressure to a value slightly above the set point for Lower Mode 910. Because Ground Tracking 249 immediately transitions to Lower Mode 910 when process. 914b is complete, the cylinder pressure is slightly high and is then regulated to the set point. Ground Tracking 249 then determines if it should remain in Lower Mode 910 or transition to Raise Mode 912.

Both ground speed and the extent of motion of feeder house 204 are used to modify the performance of the operating modes 910–914.

It is important for the system to operate both when the harvester 200 is moving and when it is at rest. Because of volumetric valve leakage, a false detection of rising terrain may occur. This causes Ground Tracking 249 to cycle through its states and may cause perceptible reaction forces in the cab of vehicle 200. To alleviate this problem, Ground Tracking 249 detects a zero ground speed condition. Upon entering Raise Mode 912 with zero ground speed, exit conditions are immediately deemed satisfied by Ground Tracking 249, and transition 924 to Fast Lower Mode 914 occurs. Process 914a (for reducing cylinder pressure) is bypassed, but the recharge process 914b is executed. When process 914b is entered via state transition 924, the pressure used to recharge cylinder 206 is lower than the pressure used when process 914b follows process 914a. After process 914b, Ground Tracking 249 returns to Lower Mode 910.

As noted above, the number of cycles used during Fast Lower Mode 914 depends on the distance header 202 moves while in Raise Mode 912. Upon transition to Raise Mode 912, the position of feeder house 204 is stored, and upon exit from Raise Mode 912 (i.e. transition to Fast Lower Mode 914) the position of feeder house 204 is stored. The difference between the exit and entry positions is used to determine a threshold for deciding whether motions of header 202 during Raise Mode 912 are considered short or long. Long motions use a set of variables that allow header 202 to fall far enough to contact ground 220 before the ground contact test criterion is applied. If the variables for short motions are used, Ground Tracking 249 may falsely identify ground contact during a pressure spike prior to actual physical contact.

For simple PID control, the performance characteristics of the control valves 118, 120 are used. In the exemplary embodiment, using the characteristics of valves 118, 120 allows application of large correction for large errors and small corrections for small errors.

Other embodiments of the invention are contemplated in which the performance characteristics of control valves 118, 120 and related mechanical systems may not be precisely known and may vary with operating conditions. Ground Tracking 249 accommodates these cases. First, for large errors large input signals are applied to control valves 118, 120. These settings may not be proportional to the error signal but they do produce a large response. Second, for small errors the performance of control valves 118, 120 and AHCS 216 is assumed to be linear, and control is performed proportionally.

Although exemplary Ground Tracking state machine 249 is implemented in software, it is understood that the functions performed therein may also be implemented with dedicated circuit components.

As described herein, pressure control 250 operates valves 118, 120, to maintain the set points determined by Ground Tracking 249. Other embodiments are also contemplated in which Ground Tracking 249 directly controls valves 118 and 120 while cylinder pressure is being changed (e.g., for the Fast Lower Mode 914, shown in FIG. 24, including pressure reduction process 914a and Pressure Recharge process 914b).

CLOSED LOOP PRESSURE CONTROL FOR FLOATATION

FIG. 3 is a block diagram of the closed loop pressure control function 250. A summing junction 301 receives a setpoint value 307 from Ground Tracking 249, and a feedback signal 306 from pressure transducer 232. Summing junction 301 generates an error signal e(t) by subtracting the measured cylinder pressure 306 from the setpoint 307 (or desired cylinder pressure). The error signal e(t) is applied to a PID control function 308 preceded by deadband 302. The deadband function 302 provides an output signal if e(t) is greater than a positive input threshold, (+it) or less than a negative input threshold, (−it). Thus certain values of e(t) do not cause any action in the control loop. The output signal of deadband function 302 is essentially described by the following equations:

$$\text{if } e(t) > +it \qquad (1)$$
$$e2(t) = K+ * [e(t) - (+it)] + (+ot)$$

$$\text{if } e(t) < -it \qquad (2)$$
$$e2(t) = K- * [e(t) - (-it)] + (-ot)$$

$$\text{if } -it < e(t) < +it \qquad (3)$$
$$e2(t) = 0$$

where:

$e2(t)$=error signal with deadband $K+$, $K-$=constants $+it$, $-it$=input thresholds $+ot$, $-ot$=output thresholds This relationship defines an error band of pressure between the pressure in cylinder 206 and the setpoint which does not cause the system to respond, but also guarantees that the proportional pressure control valve assembly 100 receives the proper control current in the event that the deadband is exceeded. A power amplifier 303 converts error signal e3(t) into a current to operate the proportional hydraulic pressure valves in valve assembly 100. Pressure transducer 232 has a gain, Pg, that transforms the actual cylinder pressure controlled by the valve into the correct units for comparison with the set point.

The deadband function 302 includes six adjustable parameters. The parameters K+, K−, positive input threshold +it, positive output threshold +ot, negative input threshold −it, and negative output threshold −ot, that define the relationship between e2(t) and the input error signal e(t). These parameters influence the stability, response time, rise time and other control system parameters of the pressure loop (the electrohydraulic control system). The relationship between deadband function 302, amplifier 303 and valve assembly 100 allows the user to select from a variety of error to pressure relationships.

Those skilled in the art will understand that the system may be implemented in a variety of ways. Analog hardware, dedicated digital hardware or a computer or micro controller may be used to "close the loop" with the appropriate interfaces to control the valve coils, and input the set point 307 and feedback pressure 306 signals. Power amplifier 303 may be implemented as a voltage to current converter using commercially available power operational amplifiers or may be implemented as a closed loop control utilizing pulse width modulation techniques to implicitly convert a voltage into a current in the coils of the valves in valve assembly 100. Additionally, a dither signal may be introduced as part of the power amplifier 303 to minimize friction in the valves in assembly 100.

Typical operation of an agricultural harvester 200 (such as a combine) requires raising header 202 at the end of a row of crops so that harvester 200 may be positioned for operation at the next row. Raising of header 202 is accomplished by the operator depressing the manual raise switch. The control system senses this switch closure and immediately goes into a standby mode in which the functions associated with Ground Tracking/Floatation 249 is deactivated. Once harvester 200 is positioned properly at the next row, the operator actuates the resume switch (not shown) included in operator controls 218 (shown in FIGS. 1A and 2A) to signal the control system that the header should be automatically lowered and Ground Tracking 249 is reactivated.

The transition from active Ground Tracking/Floatation to standby as soon as the header is manually raised (using the manual controls 10a or 10b shown in FIG. 18) is easily accomplished. Based on the manual override capability of the control system, the automatic drive electronics 40 senses the operator's action by means of the voltage sense line 46 or 48 and, turns off the control loop. All automatic signals to the valves through the coil drivers 303 are removed. Thus valve control is only performed by direct wired manual switches 218 (operator controls). Transitioning smoothly back into Ground Tracking/Floatation from the raised header height requires a more sophisticated process and is discussed in subsequent paragraphs.

The nominal value of the feeder house potentiometer 234 corresponding to ground contact is known. While this nominal value differs from the actual value depending on ground contact at the instant the resume switch (not shown) is actuated, the nominal value does provide a bounding range.

The feeder house feedback potentiometer measures one of the angles of the links 224, 226, 228 and 230 comprising the four bar linkage. It has a nonlinear but monotonic relationship to the actual header height. Due to the small variations in ground height, it is possible to define a linear input-to-output relationship for the potentiometer about the nominal operating point (defined during calibration). An upper bound of contact is defined approximately 1–2 inches above the nominal value determined during calibration of the particular header 202. This upper bound is then used to define the transition from header lower to the Ground Tracking/Floatation mode.

Mode transition into active floatation is described below. Once the operator actuates the resume switch (not shown), controller 294 in AHCS 216 lowers header 202 at a predetermined rate until the transition point is reached at which point Ground Tracking 249 is enabled. FIG. 24 shows that initial entry into Ground Tracking/Floatation mode is by transition 919, which immediately causes the system to enter Fast Lower mode process 914a. This ensures that header 202 makes ground contact. Control passes from process 914a to 914b, and then to Lower mode 910 as shown in FIG. 24.

While header 202 is lowering, AHCS 216 constantly monitors the signal from feeder house potentiometer 234. Once the transition point is sensed, the signal to lower valve 120 is discontinued and Ground Tracking 249 is activated.

Multiple solutions exist for the controlled lowering of header 202. One method incorporates a fixed orifice into the design of valve assembly 100 to control the flow rate and the speed. In proportional valves (such as used in the exemplary embodiment of the invention), the flow rate may be controlled by varying the current to the pilot valve 120. Alternatively, a closed loop flow control may be included and the actual speed of lowering controlled by applying a desired velocity profile as the command signal. Another alternative is to use an open loop scheme.

In the event that the current to the proportional pilot 120 is used to control the lowering, more than one transition point may be used. In this alternative, the flow may start at a large level (corresponding to a fast rate of height reduction), transition to a medium level, and ultimately be reduced to a small level at a position just above the transition point. The distance from the actual height of header 202 in the raised position (when changing rows) to the predetermined transition point may be divided into regions. The regions correspond to a set of desired speeds and different values of current applied to the lower valve 120 as header 202 moves through these regions. This also allows variations in the actual height to which header 202 is raised, and reduces the time to perform the resume function.

The gains used to accomplish resume function 294 (according to a desired profile) may be gain scheduled into the PID algorithm based on the fact that resume is in progress. Thus the values of Kp, Kd, and Ki used to position header 202 prior to ground contact may be tuned for smooth header repositioning and may be significantly different from those used while combine 200 is moving over the field.

An exemplary method for providing the gain values is to store them in a table, so that at each position or range of positions in the profile, there is a set of gain values Kp, Ki and Kd that are used while header 202 is between that position and the next position. For each entry in the table, the three gain values Kp, Ki and Kd are stored along with a velocity profile data pair, including a position coordinate and a time coordinate. These five data identify the desired position and control state that is desired in each region or range between the raised position and the transition position. A velocity verses time profile is implicit in the specification of the position coordinates. A separate table may include the gain values Kp, Ki and Kd that are used during normal harvesting operations. Each entry in this table includes a vehicle speed and the associated values of Kp, Ki and Kd are used for PID control of the valves at that speed. It is understood that under some conditions (e.g., at certain velocities), either $K_i$ or $K_d$ may be equal to zero.

FIG. 5 is a flow chart of the pressure control loop that is repeated when the Ground Tracking/Floatation state machine 249 requires pressure control. Entry occurs at step 450, each time the algorithm is executed, the program obtains the set point value from a memory 240, at step 452. This digital register may be a memory location or a memory mapped register connected to an A/D converter 238 and a potentiometer. A variety of methods may be used to input the set point to the program. In the exemplary embodiment, the setpoint is defined by Ground Tracking 249.

At step 454, the program reads the actual pressure at the port of cylinder 206. This may be a memory mapped register 240 connected to an A/D converter 238 and an analog pressure transducer 232. Alternatively, signal processing may be performed on the data from the register. Those skilled in the art will understand that more than one reading may be taken to ensure that a register is not changing at the exact instant that the data are sampled. Additionally, a digital filter (not shown) or averaging technique may also be utilized. Furthermore, the filtering may utilize processed data from a previous execution of the code.

At step 456, the error signal, e, is computed as the difference between the set point and the actual pressure. At step 466, the system verifies that the magnitude of the error signal is greater than some predefined deadband. If so, the control signal, c, is computed as defined below at steps 458–462. Otherwise, no control is applied to valves 118 and 120, and both valves are shut off at step 467 and control is passed out of the routine at step 468. It is understood by one skilled in the art that the deadband value should be small enough so that the header counterbalance force does not vary widely, but large enough so that the hydraulic valves are not continuously open.

At step 458, the error signal is integrated utilizing a trapezoidal integration method. Other integration approximations could also be used, but the trapezoidal scheme provides the same stability and instability mapping between the s-domain and z-domain and makes analysis of the system easier. At step 460, the derivative of the error signal is computed. At step 462, the control signal, c, is computed from the error, the integral i and the derivative d.

As previously indicated, the constants Kp, Ki and Kd may be updated at steps 418 and 444 shown in FIG. 4, to match the control loop responsiveness to the vehicle speed. At step 464, the values of the integral component and the error component are stored for use when the PID algorithm is again processed.

At step 470, the sign of the control signal is determined and control passes to step 472 or step 474. At step 470, in the case of a positive error, an input signal representing the value of c is provided to the raise valve 118 (shown in FIG. 2A), and the raise valve is opened to admit fluid under pressure into cylinder 206. Otherwise, at step 474, a second input signal representing the value of the correction signal is placed on the lower valve's coil, to release fluid to tank. To produce the input signal and second input signal from the value of c, the value may be directly placed into a memory mapped register which is coupled to a D/A converter. The output signal of the D/A converter is provided to a power amplifier. Alternatively, the value of c may be converted into a pulse duration and then fed into a timer/counter register in order to generate a voltage Pulse Width Modulated signal that drives the coils.

As noted above, embodiments of the invention are contemplated in which the coefficient of either the integral or derivative correction component is set to zero, resulting in PD or PI control, respectively. Also, conventional phase lag and phase lead controllers may be used.

The use of other control techniques for operating the proportional valves 118 and 120 are contemplated. For example, feed-forward control may reduce tracking errors and reduce settling time.

State variable feedback may be used, i.e., system state variables may be multiplied by respective gain values and combined to form the feedback signal. State variable feedback with integral control provides many of the same advantageous results of PID control, and also allows arbitrary placement of system poles. An observer may be used to recreate the state vector from the feedback signals (pressure, position, speed).

Linear Quadratic Gaussian control techniques may be used to generate the control signal based on constraint data (such as minimizing energy, time, etc.). Adaptive control techniques may be used, such as the Model reference adaptive control, in which control parameters are adjusted so that the system behaves as closely as possible to a predetermined model. Fuzzy logic techniques may be used to combine setpoint data and feedback data to control valves 118 and 120. Finally, neural network based control is also contemplated.

As described above, the exemplary embodiment of Ground Tracking/Floatation 249 includes a closed loop system in which the pressure in cylinder 206 is regulated to a setpoint value. A pressure transducer 232 connected to the cylinder port is used as the feedback device. There is an inverse relationship between the pressure applied to cylinder 206 and the effective weight of header 202 on the ground 220. As the pressure is increased, the effective weight of the header on the ground is reduced until the header begins to raise and ground contact is lost.

An alternative sensor 248 (shown in phantom in FIGS. 1A and 1B) which directly measures the effective weight of header 202 may alternatively be used. Sensor 248 measures the effective weight of header 202 directly. Sensor 248 may be a commercially available "Draft Pin" at one of the pivot points associated with the four-bar linkage, between members 228 and 230. Draft pin 248 comprises a stiff rod (not shown) and an arrangement of strain gauges (not shown). The strain gauges are arranged so that a force applied to the draft pin is resolved in a particular direction.

Draft pin 248 is arranged so that it resolves forces in the vertical direction, corresponding to the position of the linkage at which header 202 makes ground contact. With draft pin 248 aligned to the vertical, its output signal indicates the combined weight of header 202, feeder house 204 and any crop in these mechanisms with respect to the frame 224 of harvester 200, which is mechanical ground. Thus the output signal of draft pin 248 provides the effective weight of header 202 and feeder house 204 on the ground 220. An exemplary draft pin suitable for use in the invention is the Bosch 830- 304-03 draft pin. Other draft pins may also be used.

Because motion of the four-bar linkage 224, 226, 228 and 230 causes the forward pivot point to arc, the alignment of draft pin 248 with respect to the absolute vertical may change as cylinder 206 extends or retracts. However, over the operating range of floatation (i.e., header making ground contact), this alignment error is small. The resulting force resolution error is also small and provides the desired weight measure within acceptable error bounds.

In the exemplary embodiment, the four bar linkage includes four members 224, 226, 228, and 230 on the right side and four additional similar members (not shown) on the left side. Due to the actual implementation of the combine's four-bar linkage, it a second draft pin (not shown) are used on the left side of feeder house 204. Because the header may not be perfectly balanced, a combination of the signals from the draft pins (such as by averaging) may be used to determine the effective weight applied to the ground.

It is possible to more accurately control the effective force of header 202 on the ground 220 by using sensor fusion techniques. Sensor fusion of both the pressure transducer 232 and the combined draft pin 248 may be accomplished in a variety of ways.

In the simplest method, the effective weight on the ground is determined from the pressure transducer signal and empirical data relating to the value of the pressure at the point of perfect counterbalance, according to equation (4).

Effective Wt=(Pressure at Counterbalance Point− Actual Cylinder Pressure)*cylinder area (4)

This value of "Effective Header Weight" is then averaged with the effective weight value obtained from the draft pin sensor(s) 248. This averaged signal is then used to regulate the pressure control loop.

More sophisticated combination techniques based on the variances of the two transducers may also be used. Those familiar with these techniques will understand that the optimal combination ($\hat{y}s$) of two independent estimates ($\hat{y}1$ and $\hat{y}2$) with corresponding error covariances (P1 and P2) is given by equations (5) and (6).

$$\hat{y}_s = P_s * [P1^{-1} * \hat{y}_1 + P2^{-1} * \hat{y}_2] \quad (5)$$

$$P_s = [P1^{-1} + P2^{-1}]^{-1} \quad (6)$$

It is also possible to consider a variety of multiple input control strategies as a form of sensor fusion. One possibility is to use the pressure transducer 232 for feedback to close an inner loop and to form an outer loop closed by the feedback signal from draft pins 248.

FLOATATION WITH LATERAL TILT

In some conditions, the ground beneath the header may be laterally tilted relative to the frame of the harvester, as shown in FIG. 9. While it is conceptually possible to use an active lateral tilt control function in combination with floatation control, such a system presents major control problems. This is due to the fact that with floatation control the header is always in contact with the ground. Thus, active rotation of the header could produce reactive forces on the harvester 200 and the ground which are detrimental to the harvesting process and/or operation of the harvester 200. Additionally conventional field tracker sensors would be of limited utility, and more expensive position sensors would be needed.

A unique and novel solution to include lateral tilt with floatation is based on using a passive control method for the rotation of the header when the floatation control is activated.

As described above, floatation provides a counterbalancing force on header 202 so that the effective weight applied to the ground 220 is controlled. Since header 202 does not contact the ground over its entire length, certain "high spots" are the points of contact. In fact, if the ground is sloped with respect to the header then it is possible that only one side may make contact. While floatation controls the force applied to the ground by sensing the pressure in cylinder 206, the distribution of force on the ground is controlled by the area of contact. It is desirable to maximize the area of contact by positioning the header to be as parallel to the contour of the ground as possible, thereby covering the largest possible area.

FIG. 9 shows additional apparatus for controlling the lateral tilt of header 202 with respect to frame 224. Lateral tilt control 256 provides an extra degree of freedom to header 202 in that instead of header 202 being rigidly fixed to the feeder house 204, header 202 is attached with a rotary joint 260 so that it can rotate/pivot in the transverse (perpendicular to direction of travel) direction. A three position control valve 162 controls the flow of fluid to neither or either one of two cylinders 166 and 168. Two cylinders 166 and 168 may be used, one cylinder on each side of the header pivot joint 260, as shown in FIG. 9. In an alternative configuration (not shown), a control valve may control the flow of fluid to both sides and of a double actuating cylinder.

As shown in FIG. 9, the displacement of each cylinder 166 and 168 determines the tilt angle of header 202 with respect to frame 224. In one position of valve 162, cylinder side 166 is coupled to pressure and cylinder side 168 coupled to tank, tilting header 202 clockwise, as seen by the operator. In a second position of valve 162, cylinder side 166 is coupled to tank and cylinder side 168 is coupled to pressure, tilting header 202 counter-clockwise.

When lateral tilt 256 is activated in conjunction with pressure control 250, Lateral tilt signals power switch 292 (shown in FIG. 2A) to actuate valves 288 and 290 to their open positions, while valve 162 is moved to the neutral position. When valve 162 is in the neutral position and valves 288 and 290 are open, the valve 162 associated with rotating the header is said to be in the hydraulic float mode. An optional small accumulator 289 may be included in the circuit.

If valve 162 is in the middle position and the pilot valves 288 and 290 are activated, the header is free to pivot. Both cylinders 166 and 168 are coupled to tank, and header 202 self levels as the harvester 200 moves over the field with floatation activated. This occurs because the forces exerted by the ground provide torques about the header rotation point 260, which will in turn cause rotation and the self alignment of header 202 with the ground. The degree of self alignment depends on the friction associated with the pivot 260. Preferably, bearings which minimize friction are used.

Operation of floatation with passive lateral tilt uses additional logic for changing to standby mode and the resume function. At the end of the row, when the raise switch (not shown) is actuated, the cylinders controlling lateral tilt should be locked to prevent rotation of the header as it is raised. Locking is accomplished by closing pilot valves 288 and 290, and keeping valve 162 in the neutral (center) position. An additional control loop may then be used to level header 202 relative to the machine frame 224. Valve 162 is activated to apply fluid to either cylinder 166 or 168, until header 202 is level. Valve 162 is then returned to its neutral, or locked, position. This ensures that header 202 is in a known position for transport and also provides a good starting point for returning to lateral tilt. When the resume function is activated, header 202 lowers as previously described. As soon as the header contacts the ground, both cylinders 166 and 168 are once again placed in the hydraulic float mode thereby enabling the passive lateral tilt function.

If floatation control and lateral tilt control are used, header 202 rotates with respect to feeder house 204. In the alternative embodiment in which a draft pin 248 is used to measure effective header weight, lateral tilt will require the use of two draft pins, as well as a signal defining the rotation of the header with respect to the frame of the machine. By utilizing geometric and force relationships of a simplified model, the effective weight of the header on the ground may be determined.

STUBBLE HEIGHT CONTROL

Stubble Height Control maintains a fixed angle of the feeder house 204 with respect to the frame 224 of the machine 200. This control action maintains a fixed cutter bar 242 height relative to the frame 224 of harvester 200. It also maintains a fixed header height relative to the frame 224.

Referring again to FIGS. 1A and 2A, the closed loop position control system 252 in conjunction with the header's proportional raise/lower valves 118 and 120 maintains the angle 251 of feeder house 204 to the frame 224 constant. The resulting kinematics of the four bar linkage arrangement 224, 226, 228 and 230 define the vertical position of header 204 or cutting bar 242 with respect to the machine frame 224. FIG. 1 shows the position of the transducer 234 that measures the angle 251. The stubble height control function 252 of AHCS 216 provides stubble height control using the same hydraulic system to raise and lower header 202 as is used with Ground Tracking/Floatation control function 249, and described below.

Stubble height control 252 provides a wide range of height control because the sensor 234 attached to the pivot is rotary in nature and can measure the full operating range of the pivot. The cutting bar 242 is positionable both at relatively high and low levels with respect to the frame 224.

According to an aspect of the invention, stubble height control 252 regulates the linkage angle with respect to the machine. In a typical application, the operator raises header 202 at the end of a row, before moving harvester 200 to the beginning of the next row. If it is desirable to maintain the cutting bar 242 above the ground level or near the usable portion of the crop (such as when the ground or stalks are wet) it is important for the operator to quickly return the header to the cutting position once the harvester 200 is aligned to cut the next row. Stubble height control 252 provides a "memory function". When the operator actuates a resume switch (not shown) the control system repositions the header.

A secondary advantage of stubble height control 252 is that the closed loop nature of the system minimizes height variations due to inertial loading as harvester 200 moves over rough terrain. As compared to the conventional implementation, stubble height control 252 immediately detects and compensates for variations in header height relative to frame 224 due to reactive forces encountered as the combine moves across the field. In the present invention, an optional accumulator 207 (shown in FIG. 16) still provides the spike suppressing function, but the naturally resulting motion of the header that occurred in prior art systems is suppressed in the present invention.

Figure 6:
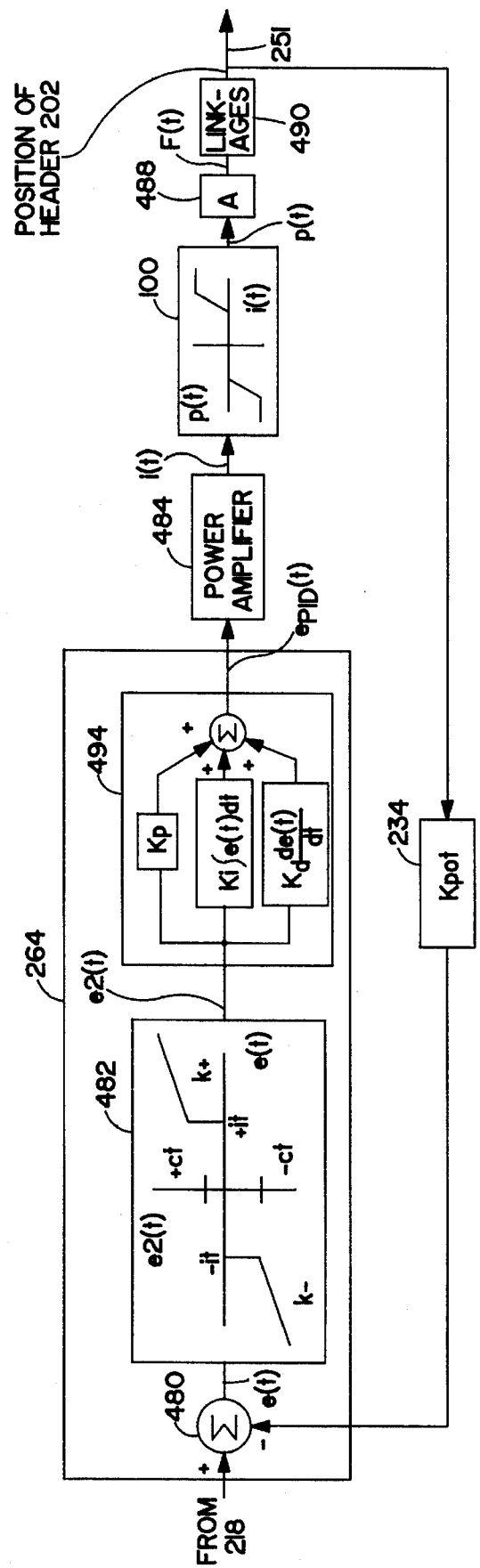
FIG. 6 is a block diagram of the stubble height control function shown in FIG. 2A.

FIG. 6 shows a closed loop position control for regulation of stubble height. Preferably, function 100 is a pressure control valve assembly. This allows the same control valve assembly 100 to be used with both floatation control and stubble height control. It is understood by those skilled in the art that the regulation of stubble height is not limited to the use of a pressure control valve and may use any type of proportional valve such as a proportional flow control valve. If a proportional flow valve is used, the input signal to valve assembly 100 (e.g., a current signal) controls the flow through the valves. This flow in turn produces a velocity in cylinder 206 which causes movement of header 202. For flow valve applications, the amplifier function 488 and coupling linkages 490 are modified appropriately.

The system includes a summing junction 480 which receives the position signal from transducer 234 and generates a position error signal e(t) by subtracting the measured position of feeder house 204 from the setpoint (or desired stubble height). The position error signal is applied to a deadband nonlinearity 482 and the to a PID compensator 494. The deadband function 482 produces an output signal if e(t) is greater than the positive input threshold, (+it) or less than the negative input threshold, (−it). Thus certain values of e(t) do not cause any action by the control loop. The output of the deadband function 482 is described by equations (1), (2) and (3), set forth above. The constants and gains used for stubble height control are different from those used when controlling cylinder pressure for floatation control function.

Equations (1) through (3) define an error band of position between $\theta(t)$ and the position of stubble height setpoint 480 that does not cause the system to respond, but also ensures that the proportional pressure control valve 100 receives the proper control current in the event that the deadband is exceeded.

The use of the PID compensator 494 allows more control over stability, transient response and increases the system type due to the inclusion of an integrator. The PID compensator 494 is of the analog variety. Its operation and tuning are well known to those skilled in the art. The output signal $e_{PID}(t)$ from the PID compensator is input to a deadband function 482. Power amplifier 484 converts $e_{PID}(t)$ into the correct current to operate the proportional hydraulic valves. Gain function 488 is associated with the physical dimensions of the header cylinder, and converts cylinder pressure, controlled by the valve 100, into a force, F(t). Force F(t) is applied to the load dynamics and coupling linkages 490 (i.e., the four bar linkage, feeder house, bearings and header components). A feedback transducer 234 senses the actual position of the feeder house angle 251 and converts the angle into the appropriate units for use with the summing junction.

The stability and response of a control loop is influenced by the parameters of the plant. In this case the plant consists of the linkages 490, and the dynamics associated with the feeder house 204 and header 202. Conventional methods of stabilization include but are not limited to the use of PID, Phase-Lead, Phase-Lag or velocity compensation techniques. A velocity signal may be obtained from a velocity sensor attached at the position monitoring point or by other appropriate means.

As is the case for the system shown in FIG. 3, the control loop shown in FIG. 6 may be implemented in a variety of ways. Typically, analog hardware, dedicated digital hardware or a computer or micro controller can be used to 'close the loop' with the appropriate interfaces to control the valve coils, and input the set point and feedback pressure signals. In the exemplary embodiment, the stubble height control logic is implemented in software and executed in a processor 262. The power amplifier 484 could be implemented as a voltage to current converter using commercially available power operational amplifiers or could itself be implemented as a closed loop control utilizing pulse width modulation techniques to implicitly convert a voltage into a current in the coils of the valve assembly 100. Additionally, a dither signal may be introduced as part of amplifier 484 to minimize friction in the valves.

Figure 7A:
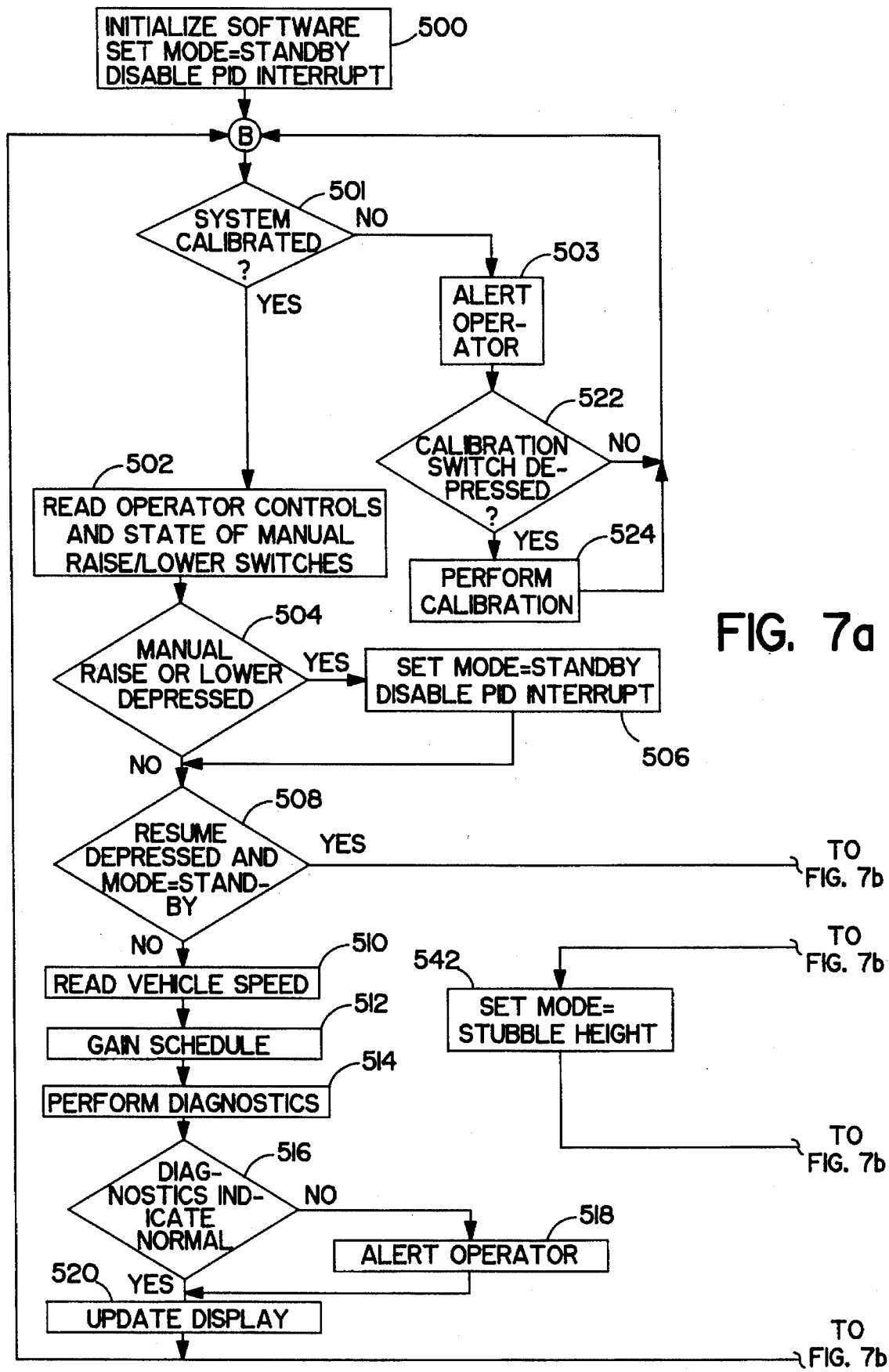
FIG. 7 is a flow diagram showing the functions performed by the system when stubble height control shown in FIG. 2B is active.
Figure 7B:
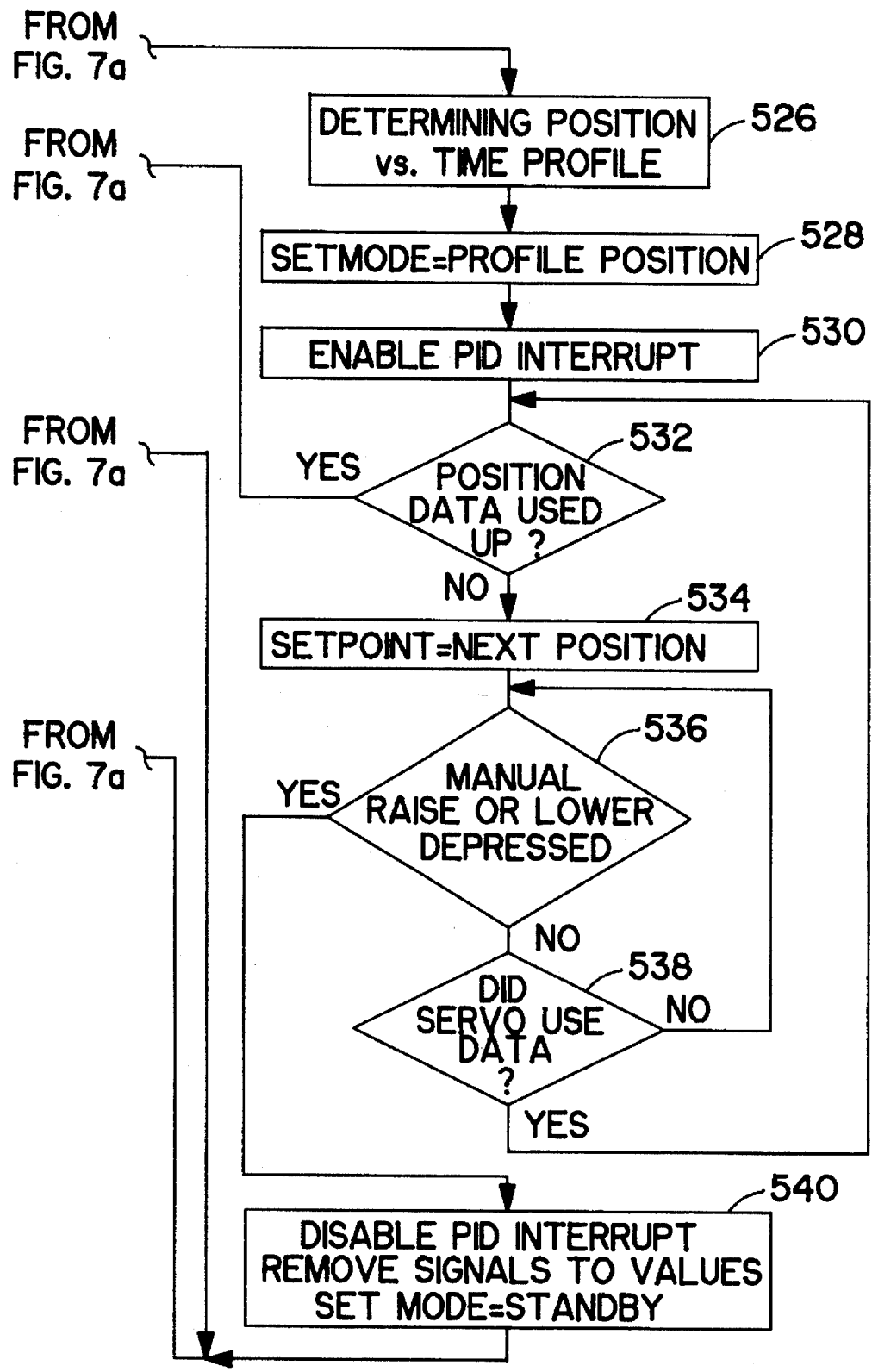

System operation in the stubble height mode is shown in FIG. 7. FIG. 7 is a flow chart showing an exemplary embodiment of a main loop which updates the operator display, samples the operator controls, samples vehicle speed and modifies the PID parameters based on a gain scheduling technique. The flow chart also shows how a calibration mode may be entered, how mode switching occurs and diagnostics are executed.

Stubble height control 252 has three modes of operation. Standby mode occurs when the servo loop is disabled and only manual controls are operational. Stubble height mode defines when the position servo loop uses the operator defined stubble height as its set point. This is the mode which is operational as the harvester 200 moves over the ground 220. The profile position mode is a transition mode that is entered by actuating the resume switch (not shown). In this mode the control system 216 transmits position versus time profile points as set points to the servo loop and controls the lowering (or raising) of header 202 to the last stubble height setpoint. Once the setpoint is achieved, the mode is automatically returned to the stubble height mode. If the operator aborts the profile position mode by actuating the manual raise or lower switch, the standby mode is entered.

Referring to FIG. 7, the main polling loop of stubble height control 252 includes the major steps 502, 504, 508, 510, 512, 514, 516, and 520. At step 500, the system is started up and standby mode is entered. At step 501, a test is performed to determine if the system is calibrated. If the system is calibrated, control passes to step 502. Otherwise, at step 503, the operator is alerted and at step 522, the operator is provided a choice whether to perform the calibration at step 524. If the operator does not select calibration, steps 501, 503 and 522 are repeated until calibration is performed. At step 502, the operator control values are determined. At step 504, if a manual raise or lower operation has been commanded, then at step 506, the mode is set to standby and the PID servo-control is discontinued. At step 508 the system determines whether to initiate the resume function from the standby mode. If not, then at step 510, the harvester speed is determined. At step 512, the PID gains are adjusted. At steps 516 diagnostics are run. At step 520, the operator display is updated to reflect the diagnostic results.

Step 518 is executed if a diagnostic failure occurs. In this event the system notifies the operator, and shuts down the system in the case of a catastrophic failure such as the loss of a sensor. The loop consisting of steps 526, 528, 530, 532, 534 and 536 (the resume function) performs the switch from standby mode, to profile position mode to stubble height mode. When the resume switch (not shown) is actuated, the algorithm of function 526 determines a set of position versus time data which implicitly include information relating to the jerk, acceleration and velocity that the feeder house will experience. These position versus time data are fed as a stream of set points to the PID servo control loop.

At step 528, the mode is set to profile position mode. In this mode, the position verses time p(t) data are used as the "setpoint" values. Each time the PID interrupt loop (steps 532, 534, 536 and 538) is executed, the "setpoint" changes. A test is made at step 532 to exit the automatic lowering of the header and return to Stubble Height mode. At step 532, the system determines whether there are further position data. If not, the mode returns to stubble height control at step 542. If there are further position data, at step 534 the next datum is used. At step 536, if the operator has not aborted the operation by starting an manual operation, the height is checked to determine whether header 202 has reached the current position data "setpoint" yet. When the current position data setpoint is reached, then step 532 is repeated. Step 538 is used to synchronize the position data stream with the servo update rate so that data arrive at the correct time (i.e., at each interrupt).

A continuous polling of the manual raise/lower switch at step 536 is required for safety considerations, in the event that the operator uses the manual raise or lower switch the system falls back into standby mode and the header is stationary. This is accomplished at step 540.

Figure 8:
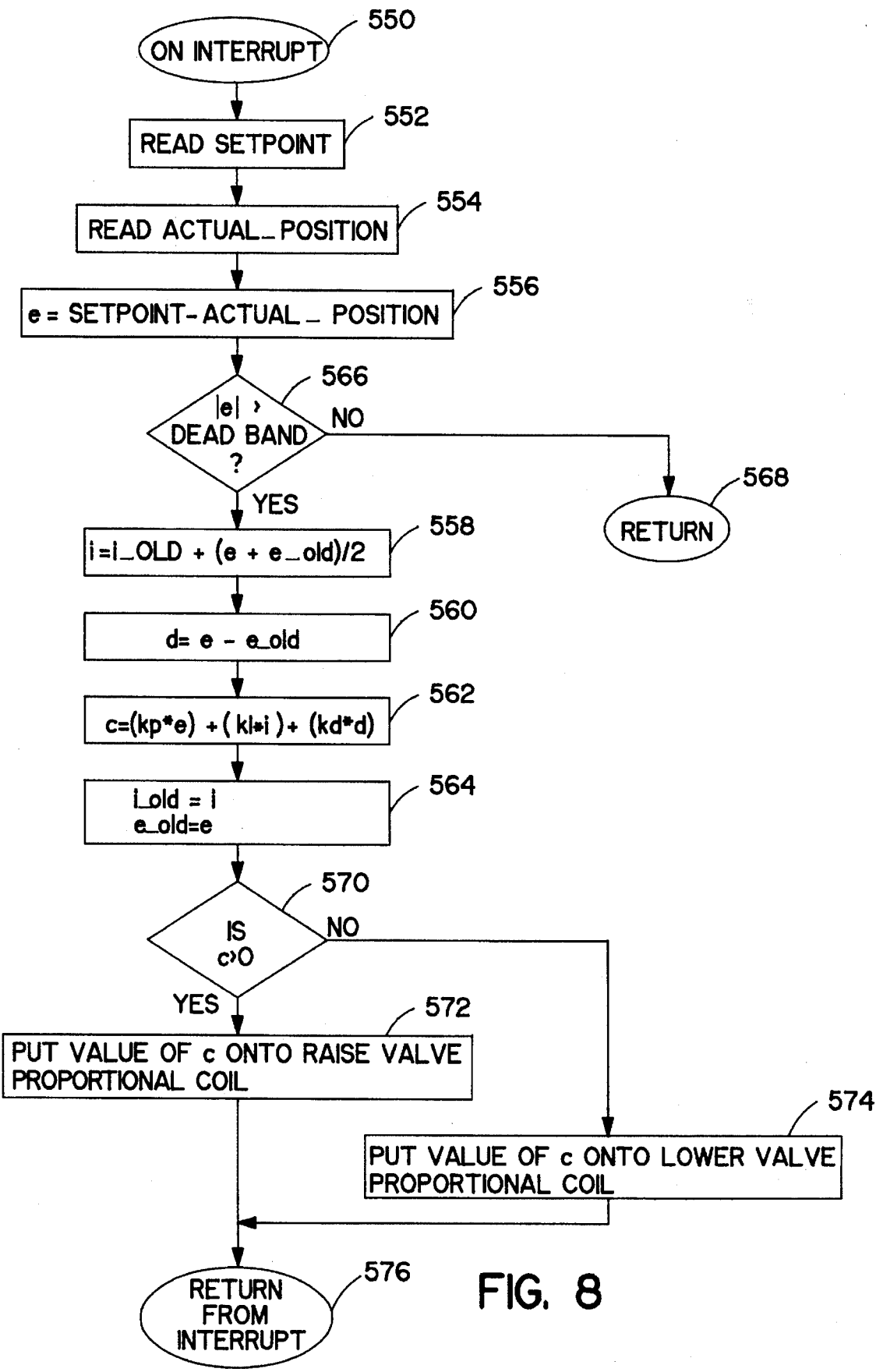
FIG. 8 is a flow diagram of the control system shown in FIG. 6.

FIG. 8 is a flow chart of the position control loop that is repeated when the PID interrupt is executed. The control method for stubble height control is nearly the same as the PID method shown in FIG. 5. The only differences are: in step 552, the program reads a position setpoint from the operator panel 218; at step 554, the actual feeder house position is read via the feedback transducer 234 (a potentiometer), instead of the cylinder pressure, as shown in step 454 in FIG. 5; and at step 556, the error is calculated as the difference between the setpoint and the feeder house position. The rest of the description of FIG. 5 applies to FIG. 7 as well.

A resume function is provided between a raised header position and active stubble control. This function is similar to the resume function used with floatation control, as discussed above with reference to FIG. 4. Specific differences exist between the floatation resume function and the stubble height resume function. These differences relate to the actual height of the transition point and use of a position control loop to profile the header position from the raised position to active stubble height control.

As previously discussed, typical operation of an agricultural machine (such as a combine) includes raising the header at the end of a row of crops so that the machine can be positioned for operation at the next row. Raising of the header is accomplished by the operator depressing the manual raise switch. The overall control system senses this switch closure and immediately goes into a standby mode in which the position control loop associated with stubble height control is deactivated. Once the machine is positioned properly at the next row, the operator actuates the resume switch (not shown) to signal the control system that the header should be automatically lowered to the correct height and the stubble height control 252 is reactivated.

The transition from stubble height control to standby as soon as the header is manually raised is accomplished using the manual override capability of the control system (see step 506 of FIG. 7). The automatic drive electronics 40 in AHCS 216 senses the operator's action by means of the voltage sense line and, deactivates the stubble height control loop 252. All automatic signals to the valves 118 and 120 through the coil drivers are deactivated. Thus valve 118 and 120 control is only performed by direct wired manual switches 218.

Transitioning smoothly back into stubble height control from the raised header height is discussed in the following section. The feeder house feedback potentiometer 234 measures one of the angles 251 of the links comprising the four bar linkage 224, 226, 228 and 230. There is a nonlinear but monotonic relationship between angle 251 and the actual header height. A linear function is formed to relate the potentiometer output signal to its input signal near the nominal operating point (i.e., the desired stubble height). A position, approximately 4–6 inches (10–15 centimeters) above the nominal stubble height operating point is defined as the transition point from header lower to stubble height control. For stubble height control, the exact location of the transition point is not critical as long as it is above the desired setpoint, so a value of 1 inch above the desired setpoint works equally well.

Once the operator actuates the resume switch (not shown), the controller 264 in AHCS 216 lowers header 202 at a predetermined rate until the a position slightly above the desired stubble height is reached, at which point the stubble height control function 252 is enabled. The closed loop position system 252 then controls header 202, regulating the linkage angle 251 with respect to frame 224.

A variety of solutions exist for the controlled lowering of the header. In proportional valves (such as valves 118 and 120 in the exemplary embodiment), the flow rate is controlled by varying the current to the pilot 120. If desired, the stubble height control 252 may be used to control the position of feeder house 204 with respect to time. The actual speed of lowering is controlled by applying a desired set of position versus time commands to the position loop 252. This implicitly defines a velocity profile and controls the descent of the header.

The position data may be stored in the memory 140 in the form of a look-up table having respective pairs of position coordinates and time coordinates. In this case, time is measured relative the when the operator activates the resume function; and position is measured relative to the height of the header when the resume function is activated (as opposed to the maximum header height).

An alternative method is to compute the position by performing numerical integration digitally in real time. For example, if the jerk function J is to be controlled so that there are no impulses in the jerk function, then the acceleration, velocity and position at any discrete time N are approximated by equations (7) through (9).

$$ACC(N)=ACC(N-1)+J(N) \quad (7)$$

$$VEL(N)=VEL(N-1)+ACC(N) \quad (8)$$

$$POS(N)=POS(N-1)+VEL(N) \quad (9)$$

where:
J=Jerk
ACC=Acceleration
VEL=Velocity and
POS=Position.

Figure 22:
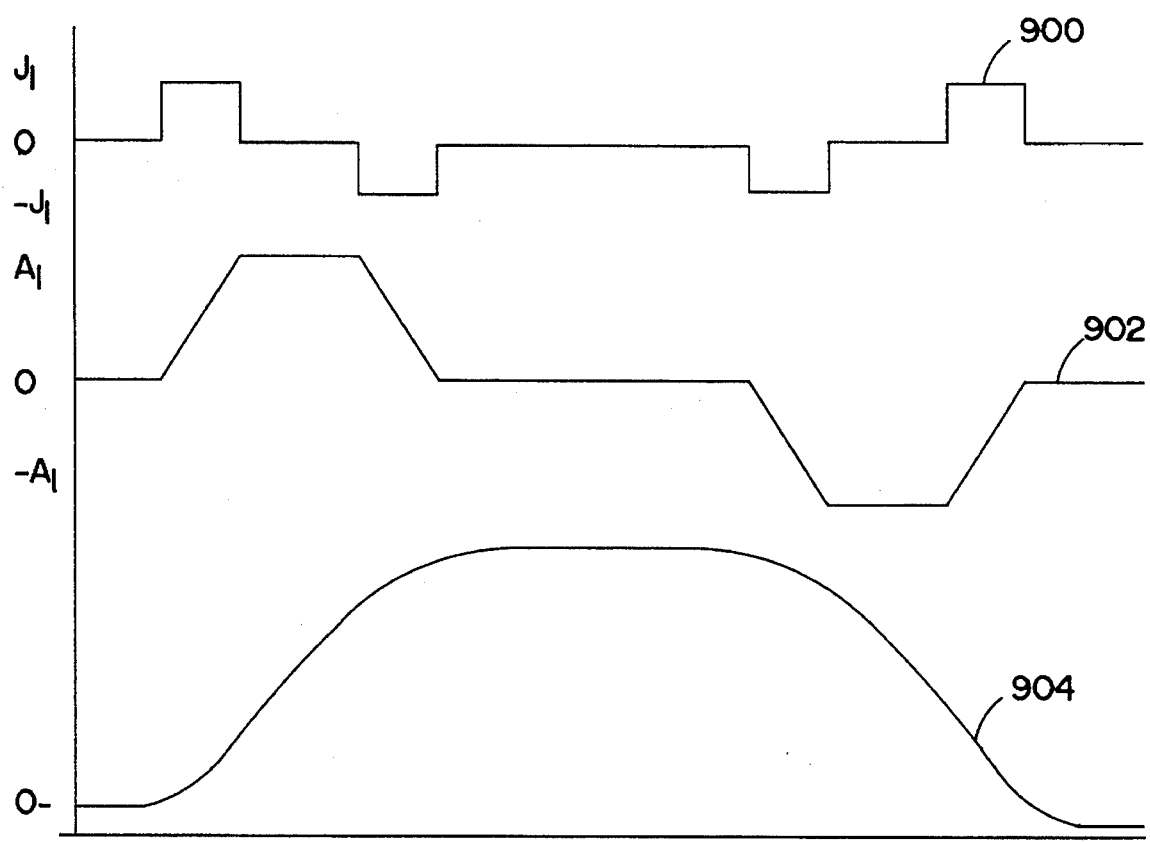
FIG. 22 is a timing diagram showing velocity, acceleration and jerk profiles over time.

An exemplary set of profiles for velocity, acceleration and jerk is shown in FIG. 22. Curve 902 shows the acceleration. The acceleration curve is continuous, with no step changes. This avoids any impulses in the jerk function. The resulting jerk curve 900 is finite at all times. By limiting the changes in the jerk function 900 to finite step changes (no impulses), smooth operation is assured. The velocity profile 904 is also shown.

If equations (7) through (9) are used, equation (7) is exact, while equations (8) and (9) have errors due to the omission of higher order polynomial terms. These errors are small if the integration rate is fast. Alternatively, the error terms may be included, at the expense of requiring more time to complete the integration for each point in the profile.

The position profile can implicitly limit the jerk function and therefore guarantee smooth velocity and acceleration of header 202. This approach can also drive header 202 from its actual position at the raised height to the desired height corresponding to the nominal operating point, without use of a transition point (i.e., without changing to stubble height control before the setpoint is reached). Using these actual end points also reduces the time to perform the resume function because variations in the header velocity are automatically taken into account by the position profile.

One alternative method incorporates a fixed orifice (not shown) into the design of the lower valve (not shown) to control the flow rate and the speed. Alternatively an open loop scheme may also be suitable.

While header 202 is lowering, controller 264 in processor 262 constantly monitors the feeder house potentiometer signal 208. Once the transition point is sensed, the signal that keeps lower valve 120 open is deactivated and the stubble height control loop 252 is activated. Once the nominal control point is reached, the appropriate values of the control parameters Kp, Kd and Ki are then scheduled as a function of the speed of harvester 200.

The gains used to accomplish this transition smoothly may be gain scheduled into the PID algorithm, based on the fact that mode switching is in process. Thus the values of Kp, Kd, and Ki used to move from the raised position to the nominal stubble height setpoint position can be tuned for smooth operation and may be significantly different that those used for stubble height control while the combine is moving over the field.

SYSTEM CALIBRATION FOR STUBBLE HEIGHT

Calibration of the Stubble Height system is performed after the initial transducer 234 installation process. The calibration procedure includes determining the span or range of the sensor 234 with respect to its extreme values as defined by the particular header 202 installed on the harvester 200. Additionally ground contact at the counterbalance point is also defined. The calibration information for stubble height is also used for other AHCS 216 functions such as when returning header 202 from a raised position to active control using Ground Tracking/Floatation 249, described above, or header height control 254 described below.

As previously indicated, the feeder house 204 pivot point is connected to a rotary position transducer 234. Transducer 234 may be a potentiometer, incremental optical encoder with reference pulse (index pulse), absolute optical encoder, rotary LVDT or any other of the many available rotary encoding units. Alternatively a linear potentiometer 253, as shown in FIG. 1B (or other type of transducer) may be connected to frame 224 of harvester 200 and used to measure the distance that feeder house 204 moves with respect to frame 224. The feeder house angle 251, and thus the header height relative to the frame 224 of harvester 200, is calculated based on the feedback signal from transducer 253. The remaining discussion refers to transducer 234 as an absolute rotary position transducer, such as a potentiometer.

Transducer 234 is mounted on frame 224 of harvester 200 and its measuring shaft connected to feeder house 204 using a minimum backlash gear arrangement (not shown). For the initial transducer installation and calibration, header 202 is removed. This allows the angle 251 of feeder house 204 to move across its maximum range. The sensor shaft (not shown) is positioned so that the absolute movement of feeder house angle 251 with respect to the harvester frame is always within the absolute angle defined by the position transducer 234. That is, the feeder house range of motion is always within the transducer range. The sensor is connected so that an increasing voltage defines upward motion of the feeder house.

The values corresponding to feeder house fully lowered and feeder house fully raised positions are saved by the control system. These are bounding values and are used to define limit checks in automatic calibration procedures and may also be used define error conditions in diagnostic testing.

The objective of the calibration process is to define the range of transducer output corresponding to the particular header 202 that is installed on harvester 200. Each header has a different mechanical configuration which will typically change the actual range of motion. The possible range of header motion is bounded by the interval between the feeder house fully lowered and feeder house fully raised positions. There are two distinct position points for calibration with header 202 attached: upper limit of header motion and nominal header position on ground. As previously discussed the nominal header position on ground is used to define the transition point for mode switching (resume) to floatation control. Once header 202 is installed on harvester 200, the calibration sequence is initiated by the operator. The automatically assisted calibration sequence moves header 202 through its range of motion, from ground position to a fully raised position, and records the end points discussed above to calibrate transducer 234.

Preferably, valve assembly 100 includes a relief valve, so that at the upper limit of header motion, the relief function of the raise valve occurs. Then the hydraulic control system does not increase the applied pressure. The nominal header position on ground is the point at which the header is approximately counterbalanced, and exerts zero force on the ground.

Alternatively, the calibration sequence may be performed under manual control. For instance, the AHCS 216 is directed by the operator to enter calibration mode, and AHCS 216 queries the operator to demonstrate the two points. The operator manually raises header 202 to the upper limit of header motion (which may or may not coincide with the relief function) and then actuates a "learn" or "teach" or "record" switch. The controller 216 records the potentiometer 234 voltage corresponding the this point. Similarly, the operator can position header 202 so it just makes contact with the ground and identify this position as nominal header position on ground to the AHCS.

HEADER HEIGHT CONTROL

Referring again to FIGS. 1A and 2A, for some crops, header height control is often preferred. Using header height control function 254, control system 216 actively controls the position of header 202 relative to the ground, at a lower height (e.g., less than 30 centimeters) than that for which stubble height control is used. This control strategy enables header 202 to follow the contour of the ground at a fixed offset distance as the harvester moves over the field. Header height is maintained at an adjustable fixed distance relative to the average ground height. Because the cutting bar 242 is fixed to the header, use of header height control allows the operator to set the effective cutting height of harvester 200 at relatively small distances from the ground. Header height control maximizes the yield for low lying crops (such as soybeans).

The small distance between header 202 and the ground in the header height control mode permits the use of a variety of sensors for measuring header height, one of the least expensive types being the contact sensor 236, as shown in FIG. 1A.

Figure 10:
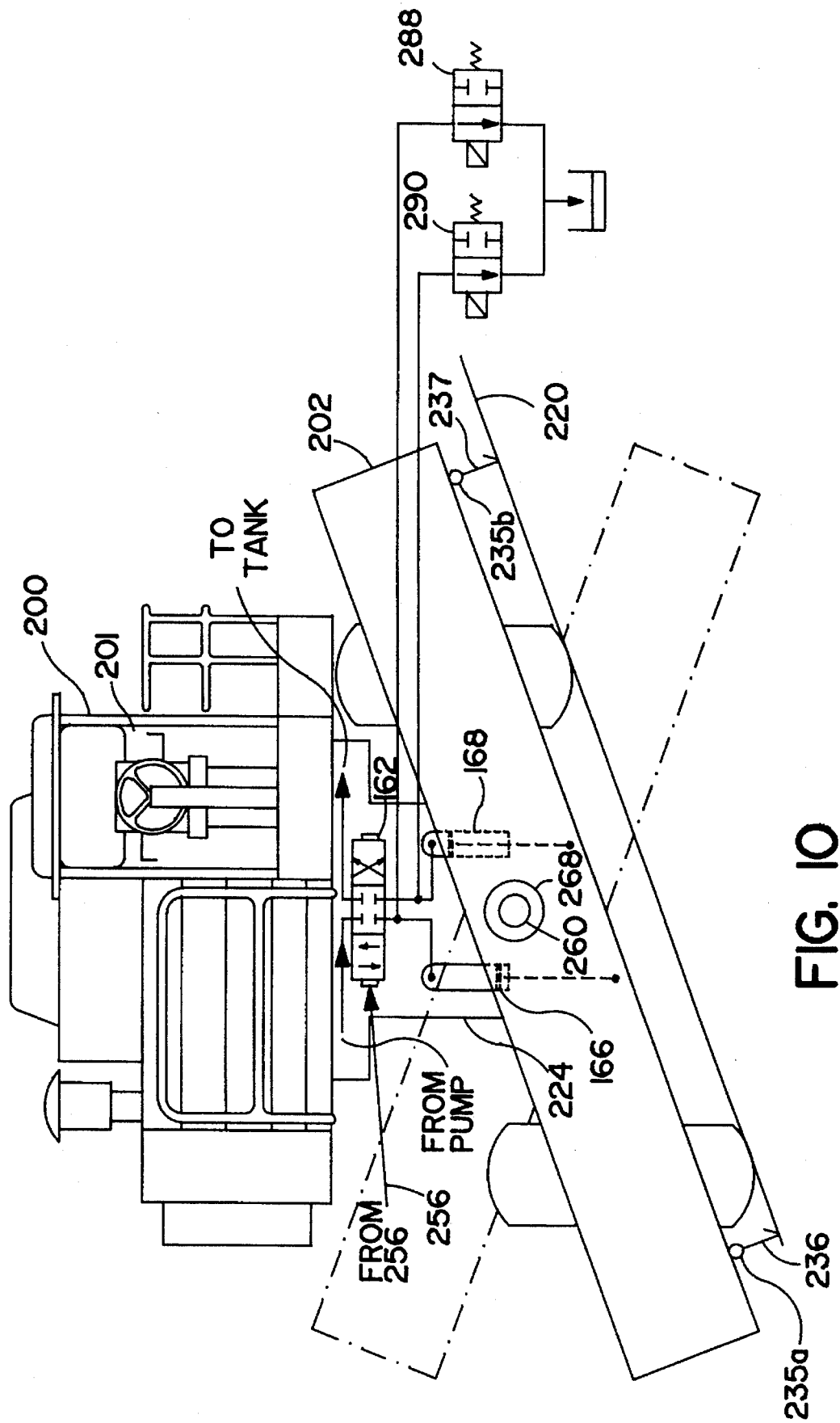
FIG. 10 is a front elevation view of the harvester shown in FIG. 2A, with header height and lateral tilt functions operating.

Referring to FIG. 10, header height control may be combined with a secondary control function, lateral tilt 256. Typically two hydraulic cylinders 166 and 168 are utilized to provide the force needed to rotate the header. As described above with reference to FIG. 9, lateral tilt, when operated in a passive mode, allows flow of fluid between two actuating cylinders 166 and 168 and tank. When combined with header height control, lateral tilt 256 operates in an active mode. Valve 162 applies pressure to one of the cylinders 166 (or 168), and couples the other of the two cylinders 168 (or 166) to tank, to rotate header 202 in the transverse direction. Once header 202 is rotated to the desired position, valve 162 is returned to its neutral (center) position, to maintain the header's rotational position.

In this active tilt control mode, as shown in FIG. 10, both of the floatation valves 288 and 290 are closed at all times, so that they do not provide a fluid path between either cylinder 166 or 168 and the tank. In the exemplary embodiment, floatation valves 288 and 290 are controlled electrically by AHCS 216. Control valve 162 is controlled by two separate proportional pilot valves 280 and 282 (shown in FIG. 17), which are in turn controlled by AHCS 216. There are no control pressure fluid couplings between valve 162 and either of valves 288 and 290; i.e., closing valve 288 and/or 290 does not provide a pilot pressure to actuate valve 162 from the neutral position to an open position.

In the third position, neither cylinder side 166 or 168 is coupled to pressure or tank, a neutral position. In the neutral position, the tilt angle of header 202 is substantially locked. This is useful when the header is manually raised (e.g., at the end of the row), so that the header does not pivot while being raised, and while using the resume function to return to active control.

Lateral tilt of the header may be used on both level-land combines and hillside combines. As shown in FIG. 10, harvester 200 is a hillside combine, in which the cab remains vertical, while the axles of the vehicle is oriented parallel to the ground. The application to hillside combines may be more useful in that the hillside combine is arranged so that the separator (not shown), grain tank (not shown) and operator cab 201 stay level while hydraulic cylinders (not shown) pivot the axles of the wheels. Due to this arrangement, it becomes preferable to pivot the header so that it can follow the slope of the ground.

Alternatively, lateral tilt with level-land combines allows the header to adapt to uneven ground. Generally this maximizes crop yield. For example, the length of the header may be on the order of 30 feet. The flatness of the ground at the wheels of the combine and that under the header's cutting bar may differ. The ground under the header may not be flat and may actually have a small slope or may drop off on one end. Lateral tilt allows the header to adapt to the angle that keeps each extreme end of the header at the same distance from the ground.

By using control signals from ground contact sensors 236 and 237 as shown in FIG. 10 (also called field tracker sensors), located on opposite ends of the header, the header is rotated to equalize the error signal from the left and right side sensors. This allows the header to both align itself with transverse variations in the ground and still maintain the appropriate cutting height. By using proportional electrohydraulic valves for both header height and optional lateral tilt, true closed loop PID control is achieved.

Sensors 236 and 237 include hoops connected to respective potentiometers 235a and 235b (shown in FIG. 10). This type of sensor only provides information when contacting the ground and at both the extreme points of contact does not provide any further usable signal. That is, when the header is fully on the ground, the contact sensor provides the same signal regardless of the counterbalancing force exerted on header 202 by cylinder 206. One skilled in the art understands that non contact (such as ultrasonic sensors etc.) may also be used in place of the contact sensors 236 and 237, but these may be more expensive.

Referring again to FIG. 2B, a header height function 254 within closed loop control system 216 is used in conjunction with the header's proportional raise/lower valves 118 and 120 to maintain the position of header 202 (or cutter bar 242) fixed relative to the average surface of the ground 220. Ground tracking sensors 236 sample the height. The ground tracking sensors are located on opposite ends of the header.

For using header height control 254 without lateral tilt 256, a single degree of freedom (i.e. raising/lowering of header 202) is used. The control input signals 104 and 106 are based on an average ground signal obtained by the two contact sensors. Signals 104 and 106 are used to raise and lower the header to the height value set by the combine operator.

Referring again to FIG. 10, with lateral tilt 256 active, rotation about the pivot point 260 is also controlled. In the exemplary embodiment, the header height function 254 and the header tilt function 256 work independently of one another, but use the same sensors 236. Tilt control 256 is used so that the value of the signals from the left header ground sensor 237 and right header ground sensor 236 are equalized. Thus, if the height of the left sensor 237 is greater than that of the right sensor 236, a control signal 307c (shown in FIG. 2B) is generated that causes header 202 to rotate left sensor 237 towards the ground and thereby reduce the height of left sensor 237. The controlled header height as defined by the average of the left and right sensors 237 and 236 is used to control the vertical motion of the header.

Some advantages of using proportional hydraulic valves in the exemplary embodiments of the present invention are:

1) The use of proportional electrohydraulic valves for header height and lateral tilt provide finer control resolution than achieved in the prior art. This makes the present invention more responsive, minimizes wasted power and eliminates inherent vibrations that were caused by the rapid turn-on and turn-off of conventional on/off electrohydraulic valves used in the prior art.

2) Due to the closed loop nature of the system, use of header height control 254 minimizes height variations due to inertial loading as the combine moves over rough terrain. As compared to the prior art or a non proportional valve implementation, header height control 254 immediately detects and compensates for variations in header height relative to the ground due to both changes in ground elevation and reactive forces encountered as the combine moves across the field. An optional accumulator 207 (shown in FIG. 16) can still provides the spike suppressing function, but the naturally resulting motion of header 202 is suppressed.

3) The use of proportional valves to perform the lateral tilt function 256 also compensates for inertial loading effects, for the same reason described in paragraph (2) above.

4) Additionally the use of proportional valves allows the position versus time profile of header 202 to be accurately controlled while returning the header to cutting height, thus minimizing vibration and shock to the entire harvester 200.

Figure 11:
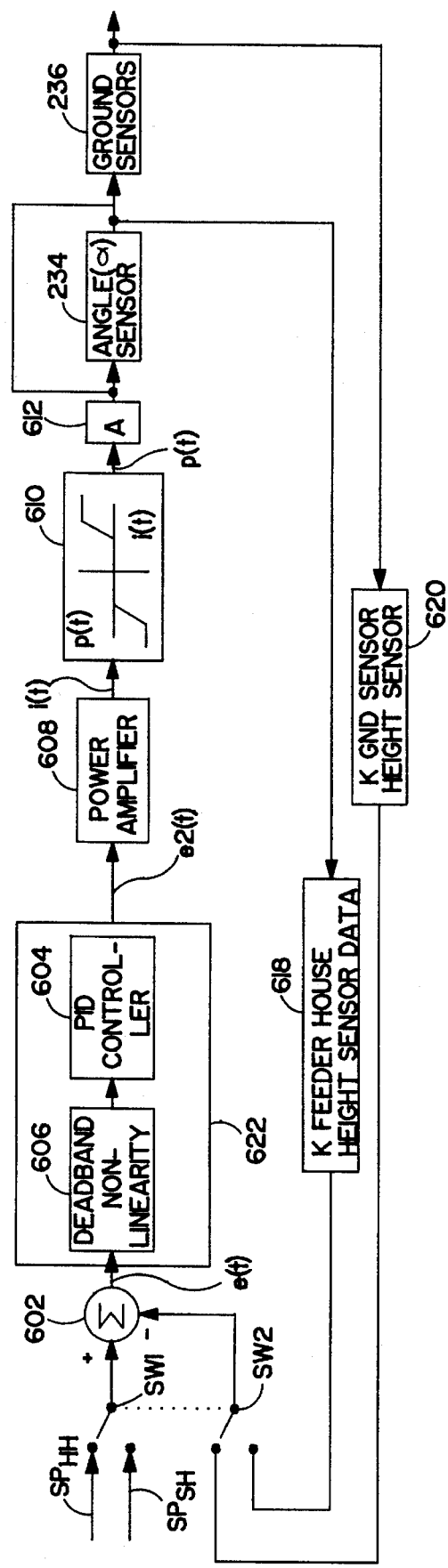
FIG. 11 is a block diagram of the header height control function shown in FIG. 2A.
Figure 12:
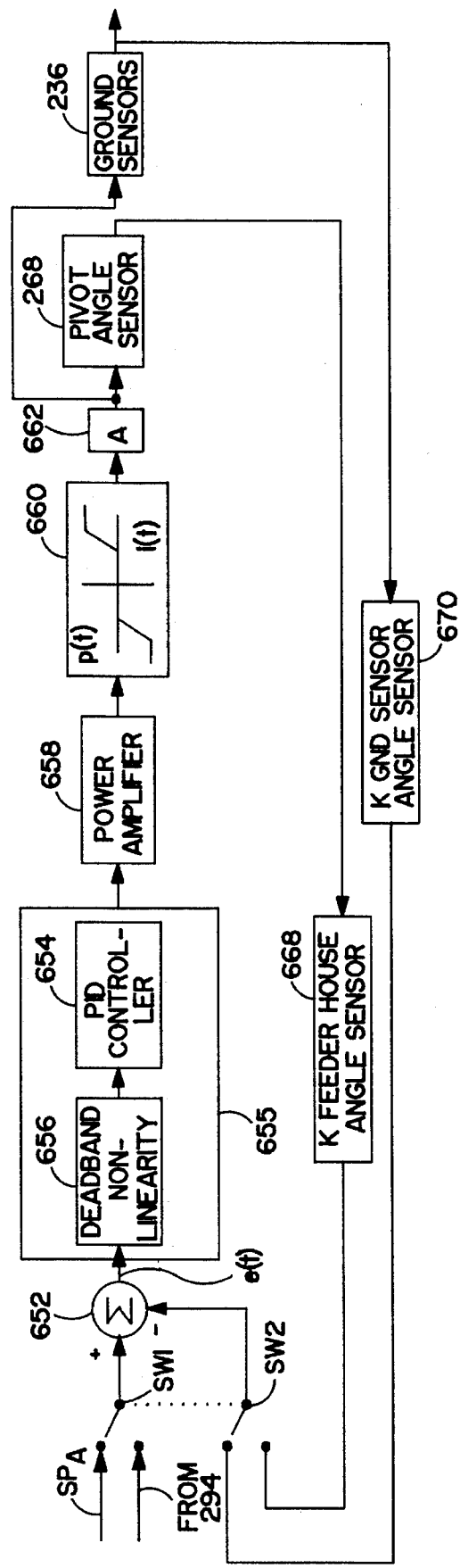
FIG. 12 is a block diagram of the lateral tilt control function shown in FIG. 2A.

FIGS. 11 and 12 show the respective feedback control loops that perform both the header height function 254 and lateral tilt function 256. These two loops exercise independent control of the vertical and rotational positioning of the header. They may be considered independent except that both obtain their feedback (with appropriate processing) from the left and right sensors 237 and 236 beneath header 202.

Figure 19:
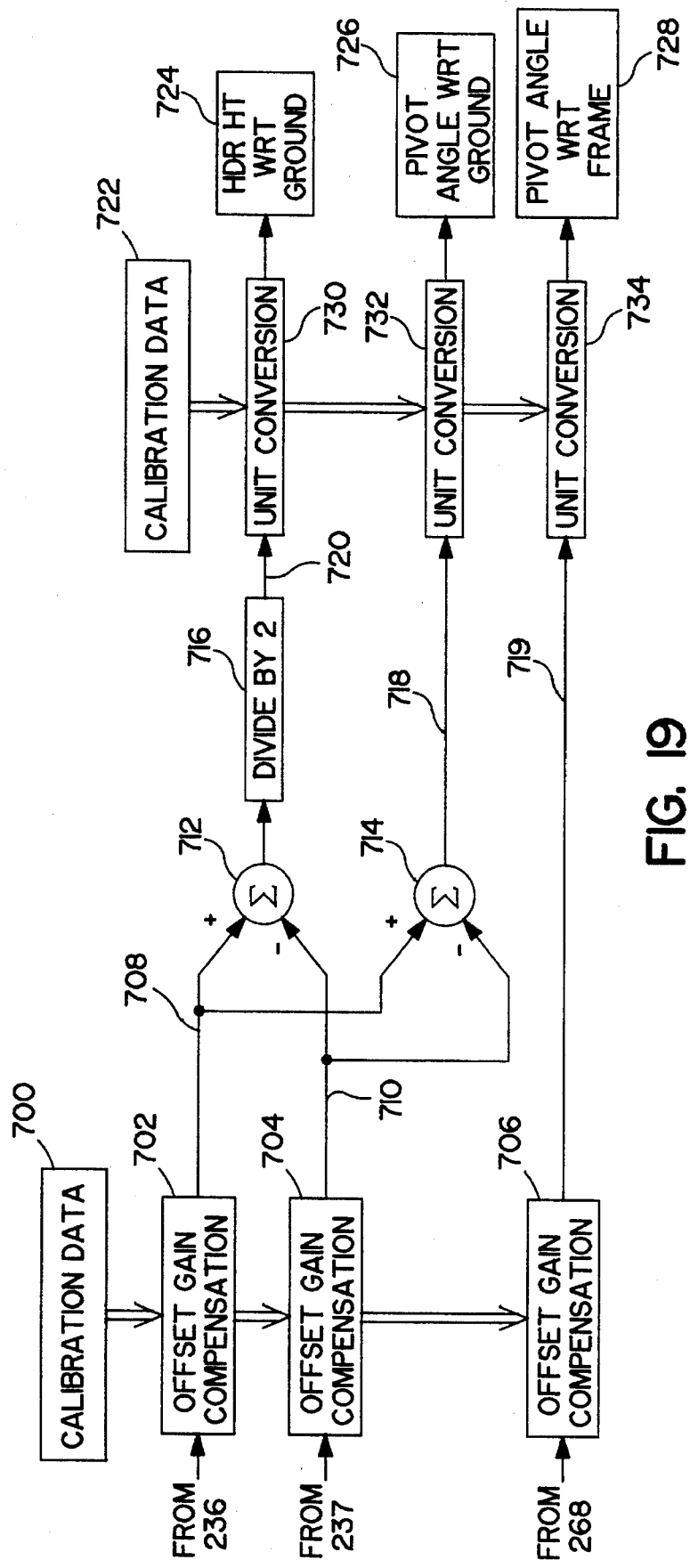
FIG. 19 is a block diagram of processing performed using header height control with lateral tilt.

FIG. 19 shows computations performed in processor 262 for header height with lateral tilt. This processing generates the derived inputs header height with respect to ground and measured header angle with respect to ground contour. These signals are used as the feedback signals for the vertical and rotary positioning loops, respectively. As shown calibration data 700 and 722 are used both to change the gain and offset 702 and 704 of the raw sensor signals, producing processed left and right sensor data 708 and 710, respectively. The average 720 of the left and right data 708 and 710 defines the header height and the difference 718 between the left and right data 708 and 710 defines the pivot angle in sensor coordinates. Unit conversion 730 converts the output measure 718 from sensor coordinates to linear header height 724. Unit conversion 732 converts the output measure 718 to the pivot angle 726 with respect to the ground.

Also shown in FIG. 19 is the signal processing and calibration interface for a rotary position transducer 268 that measures the angle of header 202 with respect to the frame 224 of the combine. This signal from sensor 268 is used if the field trackers 236 and 237 fail to contact the ground and as part of the mode control functions.

The control functions shown in FIGS. 11 and 12 are similar to those shown in FIGS. 3 and 6 for floatation control and stubble height control 252. As shown in FIG. 11, the PID control function 604 and the deadband function 606 may be a performed by a combined PID and deadband controller 622. Functions 618 (668) and 620 (670) are feedback gains which may be used to alter system bandwidth. Note that summing junction 602 is only switched to receive feedback from one of the two feedback signals 618 and 620 at a time, depending on the type of sensor used. This function could be used to switch between stubble height control and header height control. It is understood by those skilled in the art that a single set of software instructions may be used with respectively different inputs and outputs to implement the PID control function. Thus a single PID controller may be used for the functions 264 (FIG. 2B), 494 and 482 (FIG. 6) 622 (FIG. 11), and 655 (FIG. 12).

FIG. 12 shows the control functions for implementing tilt control function 256 (shown in FIG. 2A). It is similar to FIG. 11 with the following exceptions: angle sensor 268 (which may be a potentiometer) measures the pivot angle of header 202 with respect to frame 224, as opposed to the feeder house angle 251 that is measured by sensor 234 and used to define stubble height (shown in FIG. 11). Summing junction 652 can receive header angle feedback from one of the two feedback loops at a time. Feedback 668 from the angle sensor 268 provides the angle with respect to frame 224, whereas feedback 670 from sensors 236 and 237 measures the angle with respect to the ground contour. The feedback from pivot angle sensor 268 may be the only one available if the ground sensors 236 and 237 fail to contact the ground due to variations in the ground contour.

When header height with lateral tilt is operational, the ganged setpoint and feedback switches of each loop (SW1 and SW2 shown in FIG. 11) are in the upper position. Setpoint data to the vertical positioning loop ($SP_{HH}$ for header height and $SP_{SH}$ for stubble height) is defined by the operator in terms of average height from the ground. As shown in FIG. 12, Setpoint data $S_{PA}$ to the rotational loop is set to zero for a level land combine. For the case of a hillside machine, the nominal combine angle or an operator supplied value is used as the rotational loop's setpoint. The setpoint and feedback switches are automatically placed in the lower position during certain mode changes. This specifically occurs when the overall controller needs to automatically control the tilt and height during the resume function.

There is an inherent coupling between the header height function shown in FIG. 11 and the tilt function shown in FIG. 12. This coupling is due to the method in which the feedback signals are derived and the mechanical nature of the system. The height control loop in FIG. 11 positions the pivot point 260 (shown in FIG. 10) of header 202 at a distance from the ground defined by the average value of ground sensors 236 and 237. The lateral tilt loop in FIG. 12 rotates header 202 to be substantially parallel to a line between the two sensor points of contact with ground 220. Both loops (FIGS. 11 and 12) are active when header 202 is maintained parallel to the ground at a constant header height due to the mechanical system. The response times of the two loops may vary. This may cause undesirable vibrating motion (either vertical or rotary) of the header. One simple method to reduce this vibration is to select a precedence for operation of the two loops.

The position data from each sample of the left and right sensors 237 and 236 may vary. The variation from left to right may, in some cases, be quite high. When the sensor returns vary (on rough terrain) maintaining the height at the average value will not maximize the harvest, because the cutter bar 242 tends to cut the crop at an angle. With lateral tilt 256 enabled and operating at a faster rate than height control 254, the yield is enhanced. For example, the feedback loop shown in FIG. 8 may execute every 50 milliseconds for the tilt control, and every 200 milliseconds for header height control.

In an alternative method for establishing precedence, the header height and lateral tilt functions (loops) may be executed with the same frequency. In this alternative method, the values of the PID constants Kp, Ki and Kd may be modified to vary the response of each loop, so that the tilt is faster in responding than header height, or vice versa.

Alternatively, the elevation seen by the left and right sensors may be substantially constant (with small variations), while the path has gradual height variations (rising and falling). In this case, maintaining the average height maximizes crop yield, because the cutting bar is positioned at the desired height. Lateral tilt 256 in this case is only of secondary importance. To apply precedence in this case, the feedback loop shown in FIG. 8 may execute every 50 milliseconds for header height control, and every 200 milliseconds for tilt control.

Based on these two extreme scenarios, certain conditions may warrant precedence of tilt control 256 while others warrant precedence of height control 254. As described above, a predefined precedence can reduce coupling between the rotational and height control loops 256 and 254, thereby reducing or eliminating vibrations. A supervisory controller provides the operator with a choice for precedence.

Precedence is accomplished by modifying the response time of either or both of the header height function 254 and the tilt function 256. Additionally, the response times of each loop 254 and 256 are modified as a function of ground speed. Thus a gain scheduling approach or an algorithmic adaptation approach may be used to modify PID gains (for each loop), similar to the method discussed above for the floatation function (FIG. 4) and the stubble height function 252 (FIG. 7). Finally a self learning approach can be used in which variations of both height and tilt are accumulated during the operation of the combine and the precedence or timing is modified to optimize operation with respect to minimizing parallel error to the ground surface.

Referring again to FIG. 7, the control sequence for header height is similar to that used for stubble height control, except that (1) in header height control, feedback is provided by a different sensor; (2) gain schedule (step 512) and moving the header from a raised position to an operating position (step 528) involve the header tilt (pivot) angle as well as header height; and (3) the mode is set to header height with lateral tilt (step 542). In particular, the header height function 254 and lateral tilt function 256 include a resume function similar to that shown in steps 526, 528, 530, 532, 534, 536, 538 and 540 of FIG. 7. In this case, the purpose of the resume function is to automatically return header 202 to the last height and pivot angle in which it was positioned before being raised, when harvester 200 reaches the start of a new row. Header height control 254 and lateral tilt control 256 are then reactivated.

Mode transition into header height Control occurs as described below. Once the operator depresses the resume switch (step 508), at steps 526, 528 and 530, the controller 622 uses a position feedback loop (steps 532, 534, 536 and 538) around the feeder house position transducer 234 to lower header 202 with a predefined velocity profile until at step 532 a transition point defined by the value of the feeder house position transducer 234 corresponding to the maximum working height of the field tracker sensors 236 and 237 is reached. At this point, at step 542 the header height control function 252 is enabled. The closed loop position system then switches from controlling the header via the transducer 234 to control by the field tracker sensors 236 and 237. Control of further lowering of header 202 is accomplished by the error signal, from the desired setpoint and the processed signals header height with respect to ground 724, from sensor 236 and 237, as shown in FIG. 19.

Referring again to FIG. 8, the same steps are executed for header height control as described above for stubble height control, except that for header height control, the ground sensors 236 and 237 provide the actual position 724 (see FIG. 19) at step 554 instead of the angle sensor 234. Furthermore, the same steps are executed for lateral tilt control, except that the tilt is computed from the processed data provided by ground sensors 236 and 237, as pivot angle 726 (as shown in FIG. 19).

Like Ground Tracking/floatation 249 and stubble height control 252, header height 254 with lateral tilt control 256 may be implemented via analog hardware or a combination of analog and digital hardware, or using a microprocessor 262 or computer with the appropriate interface circuitry. Furthermore, processing and process control equipment may be shared by the five control functions 249, 250, 252, 254 and 256.

SYSTEM CALIBRATION FOR HEADER HEIGHT AND LATERAL TILT

Because agricultural equipment such as harvesters may use different headers to accommodate different crops, it is important to provide a simple method of providing the control system 216 with the operating ranges of the sensors 236, 237, and 268. Contact sensors 236 and 237 are attached to header 202 and their alignment may vary between headers. Additionally, normal use can bend the sensing arm of sensors 236 and 237 and actually change the output signal values even though the sensors are still functional. Thus the sensors should be re-calibrated at the beginning of each shift or day in order to ensure that the sensory signals are correct. Left and right sensors 237 and 236 may have different output signal ranges and may provide different signals for the same height measurement.

It is also important to determine the relationship between the value of the feeder house sensor 234 and the point where the ground sensors 236 and 237 begin to operate. This provides a transition point for the resume function to change modes from lowering the header via closed loop control about the feeder house position sensor 234 to vertical height control from the ground sensors 236 and 237.

The ground contact sensors 236 and 237 begin to provide a signal once the header is raised off the ground and will continue to provide a signal until they are fully out of contact with the ground. The nominal position of the header on the ground may change based on the contour of the ground with respect to frame 224 and the location of header 202. The ground contact sensors 236 and 237 measure the absolute distance of the header from the ground.

Before calibrating ground sensors 236 and 237, the feeder house sensor 234 is calibrated, as described above with reference to the calibration of the stubble height sensor. The calibration sequence collects values from each sensor 236 and 237 for maximum working height and minimum working height, which are the extreme ranges of their sensing capabilities. For example, the maximum working height is the point at which the sensor begins to provide data (i.e., the value of its output signal begins to change in response to a change in header position).

The values obtained for the above heights are in the sensor coordinates or domain. For example, if potentiometers (not shown) are used within the sensors 236 and 237, and their extreme theoretical range is from 0 to 10 volts, then it is possible that the nominal minimum height of the left sensor may cause a signal of 2.6 volts and the nominal maximum height for the same sensor causes a signal of 9.5 volts. This variation in ranges may be due to mechanical linkages which may restrict the full range of sensor potentiometer rotation. Additionally, the minimum and maximum working heights are bounded by the nominal maximum and minimum ranges and differ for the left and right sensors. Because the sensor coordinate signals provided by the left and right sensors 237 and 236 may vary, based on physical alignment of the parts or tolerances, control system 216 also accommodates these variations.

For calibration, header 202 is attached to feeder house 204. Header 202 is rotated to be parallel to the ground and harvester 200 should sit on relatively level ground.

When the calibration sequence is initiated, header 202 is raised so that sensors 236 and 237 are fully extended by the weight of gravity. The value associated with each transducer signal defines the left and right sensors' nominal maximum heights. These values are automatically stored by AHCS 216. Header 202 is slowly lowered while monitoring the value of the transducer 234 and each contact sensor 236 and 237. The point where the signal of either left transducer 237 or right transducer 236 changes (i.e., reduces in value) from the nominal maximum height defines the upper limit of the respective sensor. This is the point where the sensor 236 or 237 makes contact with the ground. Processor 262 stores this point as the maximum working height along with the value from transducer 234. AHCS 216 continues lowering header 202 until a change in the value associated with the nominal maximum height of the other sensor (right or left) is obtained. This value is stored as the maximum working height along with the value from transducer 234.

Once these maximum height values are established, the lower end values corresponding to "just making ground contact" are established. Header 202 is lowered to a few inches (about 10 cm) above the nominal header position on ground as established by transducer 234. Next, AHCS 216 slowly lowers header 202 while monitoring the value of each contact sensor 236 and 237. The point where the signal reaches its minimum and no longer changes for small motion of header 202 defines the minimum working height for each contact sensor 236 and 237. AHCS 216 stores each of these points as the minimum working height of the respective sensor along with the value from transducer 234. The signals from transducer 234 are cross correlated with the signals for contact sensors 236 and 237.

Typically, the harvester operator adjusts the setpoint for the desired cut and does not care about the absolute height. Alternatively, one may cross calibrate the ground contact sensor values with absolute height. The physical vertical range of each sensor may be measured (or the nominal value used) and related to the operational range in sensor voltage coordinates. This provides a reasonable approximation relating sensor coordinates to linear measurement. Alternatively, absolute position transducers (e.g., ultrasonic) could be used in place of transducer 234.

ELECTROHYDRAULIC CONTROL VALVE ASSEMBLY

Figure 16:
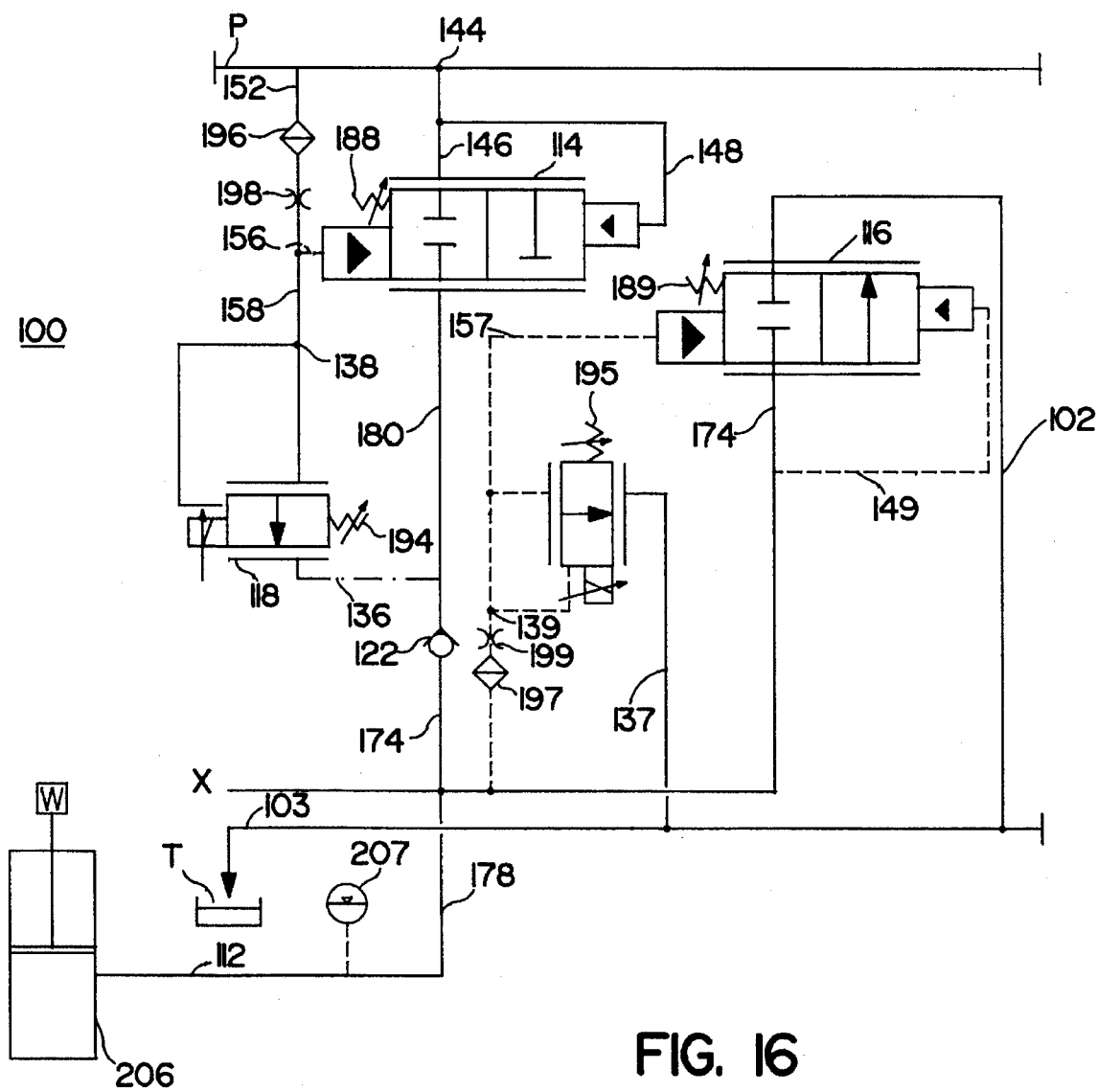
FIG. 16 is a schematic diagram of the valve assembly shown in FIG. 13.
Figure 17:
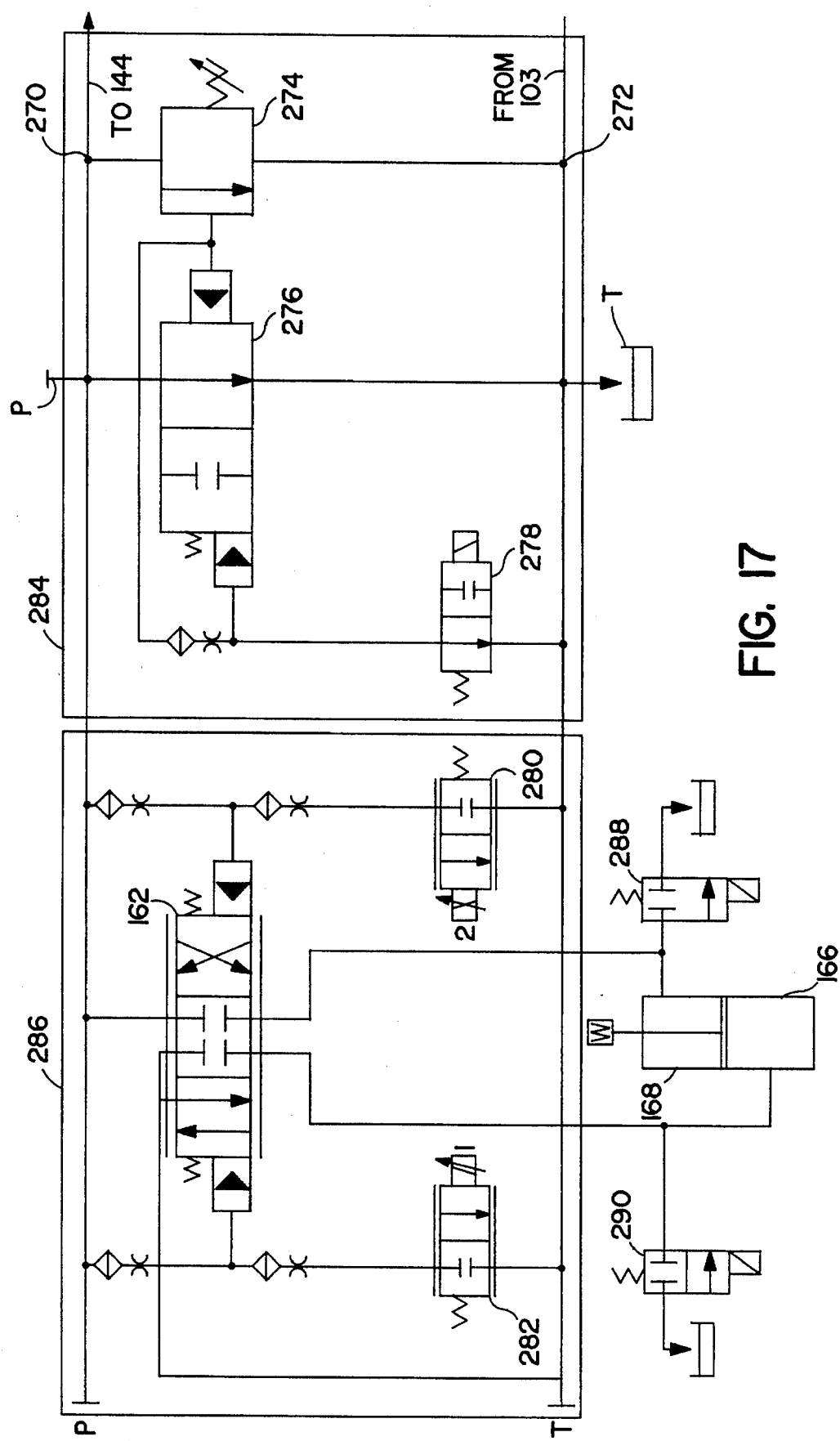
FIG. 17 is a schematic diagram of the valve assembly and passive floatation system shown in FIGS. 9 and 10.

FIGS. 16 and 17 are schematic diagrams of two portions of the valve stack 100 of harvester 200. FIG. 16 shows the raise and lower valve assemblies used for header control. FIG. 17 shows the unload valve 284 and the three position four-way spool valve assembly 286 used for lateral tilt. U.S. patent application Ser. No. 08/012,002, filed Feb. 1, 1993, by Zeuner et al., entitled "PROPORTIONAL HEADER HYDRAULIC SYSTEM AND CONTROL METHOD" is hereby incorporated by reference for its teachings on the construction of a hydraulic system providing accurate control of both flow and cylinder pressure.

A three position, four way pilot operated spool valve assembly 286 (shown in FIG. 17) is also coupled to the pressure line 270, for controlling the lateral tilt of header 202, as shown in FIGS. 10. The system as shown is an open center system. In an open center system the pump P (see FIG. 1) is always operating and furnishing pressure and flow to the pressure galley 144 of FIG. 16 and 270 of FIG. 17. An unload module 284 provides a path to tank for the hydraulic fluid. When either the raise valve 118 or the spool valve 162 needs to be activated, the unload valve 284 is activated, thus closing the path to tank so that fluid and pressure can go to either the raise valve 118 or spool valve 162. As soon as either the raise valve 118 or spool valve 162 is de-energized, the unload must again be de-energized.

Figure 13:
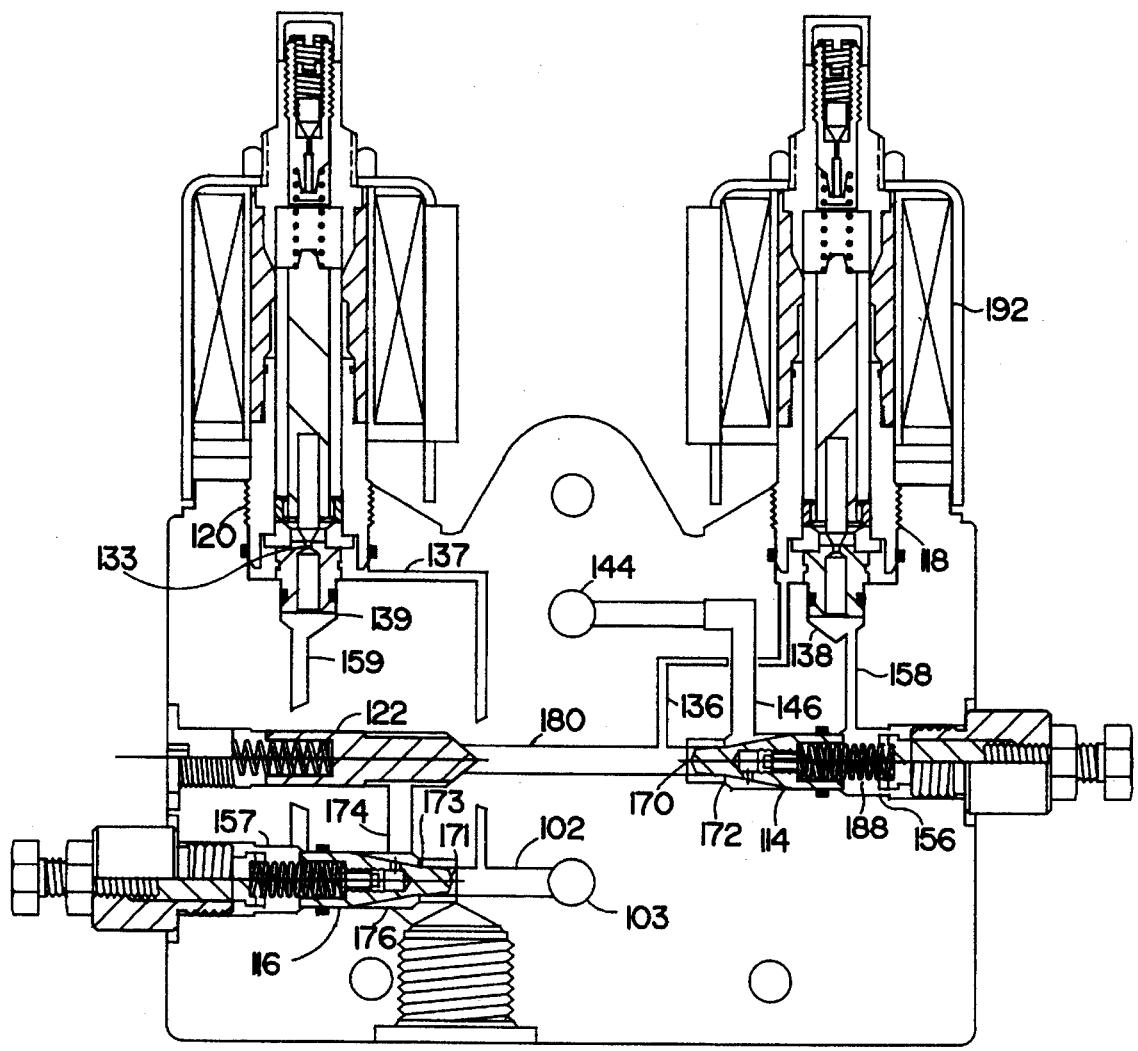
FIG. 13 is a cross sectional view of the valve assembly shown in FIG. 1A.

FIG. 13 shows the proportional valve assembly 100 for use in the exemplary embodiment. Valve assembly 100 includes a first two stage valve assembly 114 and 118 for raising header 202 and a second two stage valve assembly 116 and 120 for lowering header 202. Each of the second stages 114 and 116 of respective raise and lower valve assemblies has a poppet with a parabolic contour which is dimensioned with orifice parameters to provide a substantially linear flow rate change when the second stage popper moves, to provide substantially zero flow jerk. Construction of a second stage popper having these characteristics is taught by U.S. Pat. No. 3,980,002 to Jarman et al., which is hereby incorporated by reference for its teachings on programmed variation of the unbalanced programmed valves. Also incorporated by reference is U.S. Pat. No. 4,202,250 to Zeuner et al. for its teachings on the application of programmed poppet valves to construction of valve systems having raise and lower valve assemblies.

In accordance with the present invention the, the first stage 118 and 120 of each valve assembly is a proportional solenoid valve. U.S. Pat. No. 4,651,118 is hereby incorporated by reference for its teachings on the construction of solenoids having a high degree of proportionality. Variations in control input signals 104 and 106 define the time of shift of the second stage popper systems. By varying the input signals 104 and 106, the fraction of the maximum flow rate that is admitted through pilot valves 118 and 120 is varied.

Any desired profile of pilot valve input pressure over time may be used by varying the input signal. For any given input current applied to pilot valve 118 or 120, the respective second stage valve 114 or 116 opens at a predetermined rate in accordance with the second stage valve configuration.

The proportional solenoid valves 118 and 120 are proportional pressure relieving valves. That is, valves 118 and 120 open when the sum of the electromotive force from the solenoid 192 plus the pressure force below poppet 160 (in orifice seat 132) exceed the bias force of spring 194. The stroke of popper 160 is short, so that the force from spring 194 is substantially constant whether poppet 160 is open or closed. Therefore, the pressure force in orifice seat 132 varies as a function of the current input to the solenoid 192. The inherent characteristics of the second stage valve substantially eliminates jerk as the valve moves between closed and open positions. By combining the proportional pilot with the programmed second stage valve, the reduction in jerk is enhanced even further, regardless of the actual header position verses time profile.

Although the input pressure of pilot valve 118 may be controlled by applying a constant current corresponding to the desired relief value, in the exemplary embodiment, the input signal is pulse width modulated with less than 100% duty cycle. PWM causes the relief pressure of popper 160 to alternate between high and low values at 122 Hz, so that poppet 160 cycles between opening and closing. The inventors have determined that this technique reduces the energy required to relieve the input pressure to valve 118.

The second stage poppet can be tailored so that the valve is either an optimal pressure or flow control device. This is a characteristic of the valve alone and is independent of the closed loop control.

For applications where the primary operation is floatation, the second stage popper nose should be optimized for pressure control functionality (e.g., a blunt contour). Both flow rate and pressure are controlled by the input current, and the pressure is a linear function of the input current. The use of closed loop control also allows the valve to operate for header height or stubble height control.

For applications in which the primary operation is header height or stubble height control, the second stage poppet nose should be optimized for flow control functionality (e.g, a more pointed contour). Both flow and pressure are controlled by the input current, and the flow rate is a linear function of the input current. The use of closed loop control also allows the valve to operate in a pressure control mode for floatation control.

The exemplary valve has both characteristics of pressure and flow control. The use of closed loop control allows either functionality. Optimization for flow or pressure (whichever is used most often) minimizes error signals in the closed loop configuration.

An important aspect of the invention is the ability of the valve assembly 100 to remove the control of the second stage spools 114 and 116 from the fixed mechanical aspects of the valves 114 and 116. Instead, control of the second stage is accomplished through electrical control of the relief pressure of first stage proportional pilots 118 and 120. This makes valve assembly 100 more versatile and eliminates the need (as in prior art programmed valves) to tailor the popper profile of the programmed second stage valves 114 and 116 uniquely for each application. Another important aspect of the present invention is the method in which the pilot (first) stages 118 and 120 of the valve assembly are supplied fluid pressure and the method used to control fluid pressure, as explained below.

A combine header system is an unbalanced gravity load which is preferably operated with constant header acceleration and deceleration for proper control. The constant acceleration and deceleration of the mass eliminates potential shock loading of the system due to instantaneous acceleration of the fluid when the header is above the ground. The header of the combine is not touching any surface and all weight is counterbalanced by the hydraulic pressure in the cylinder 206 controlled by valve assembly 100. The exemplary valve assembly 100 can (1) control pressure by way of the proportional pilot assembly 118 and 120; (2) flow by the contour of the second stage valves 114 and 116, as well as by the pressure control behind the second stage popper as defined by the current supplied to the first stage; and (3) jerk by the effective area produced by the second stage popper 170 (171) and the popper seat 172 (173), as well as by the pressure control behind the second stage popper as defined by the current supplied to the first stage. The exemplary valve substantially eliminates any impulses in the jerk function. The acceleration function is continuous and has a continuous derivative.

"Jerk" is defined as the time derivative of acceleration of the header system. Jerk is produced when a significant change in acceleration of the mass is observed, so that the acceleration is not continuous. Jerk creates shock loading to the frame of the harvester 200 which is detrimental to the substructures and the performance of harvester 200.

Figure 14:
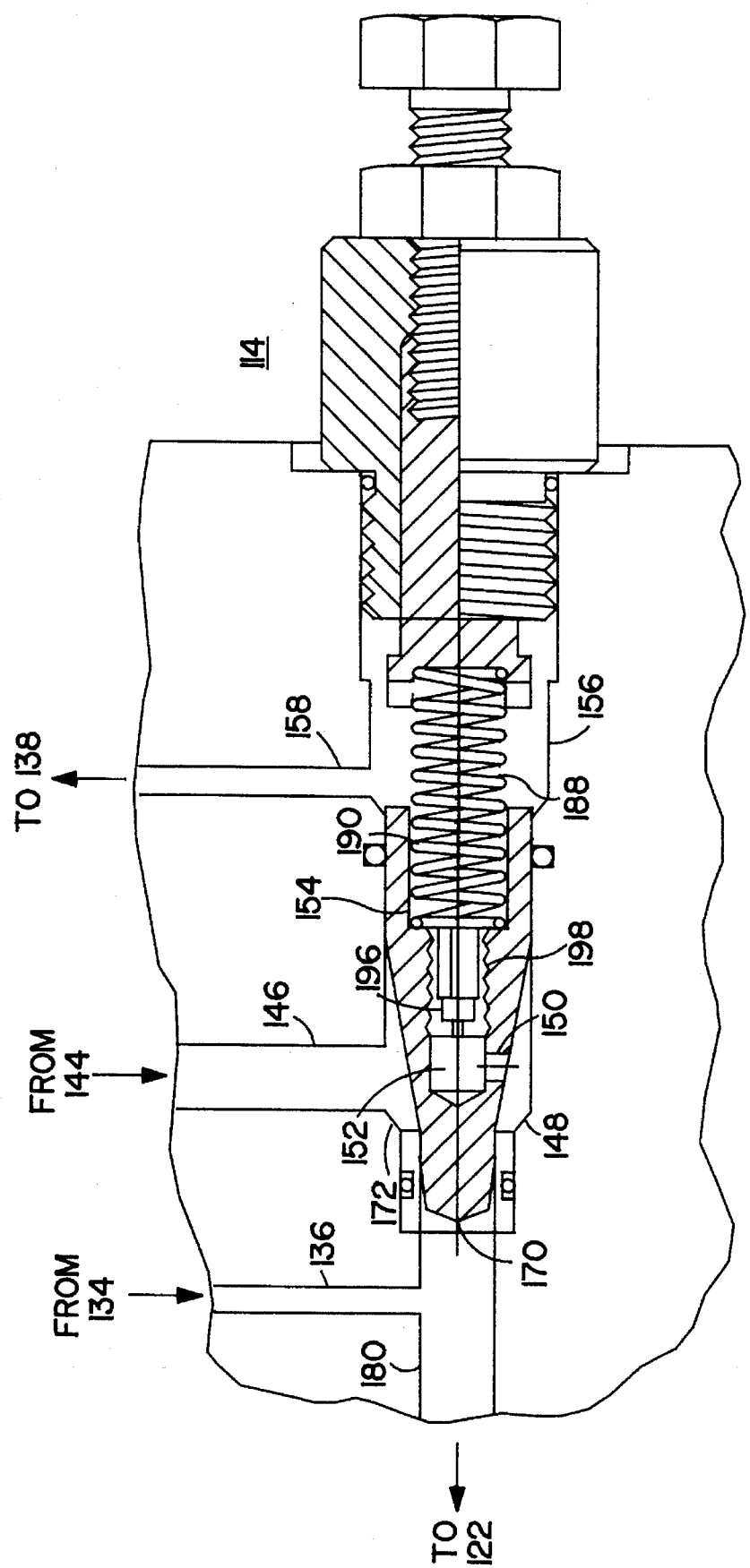
FIG. 14 is an enlarged cross sectional view of the raise second valve stage shown in FIG. 13.
Figure 15:
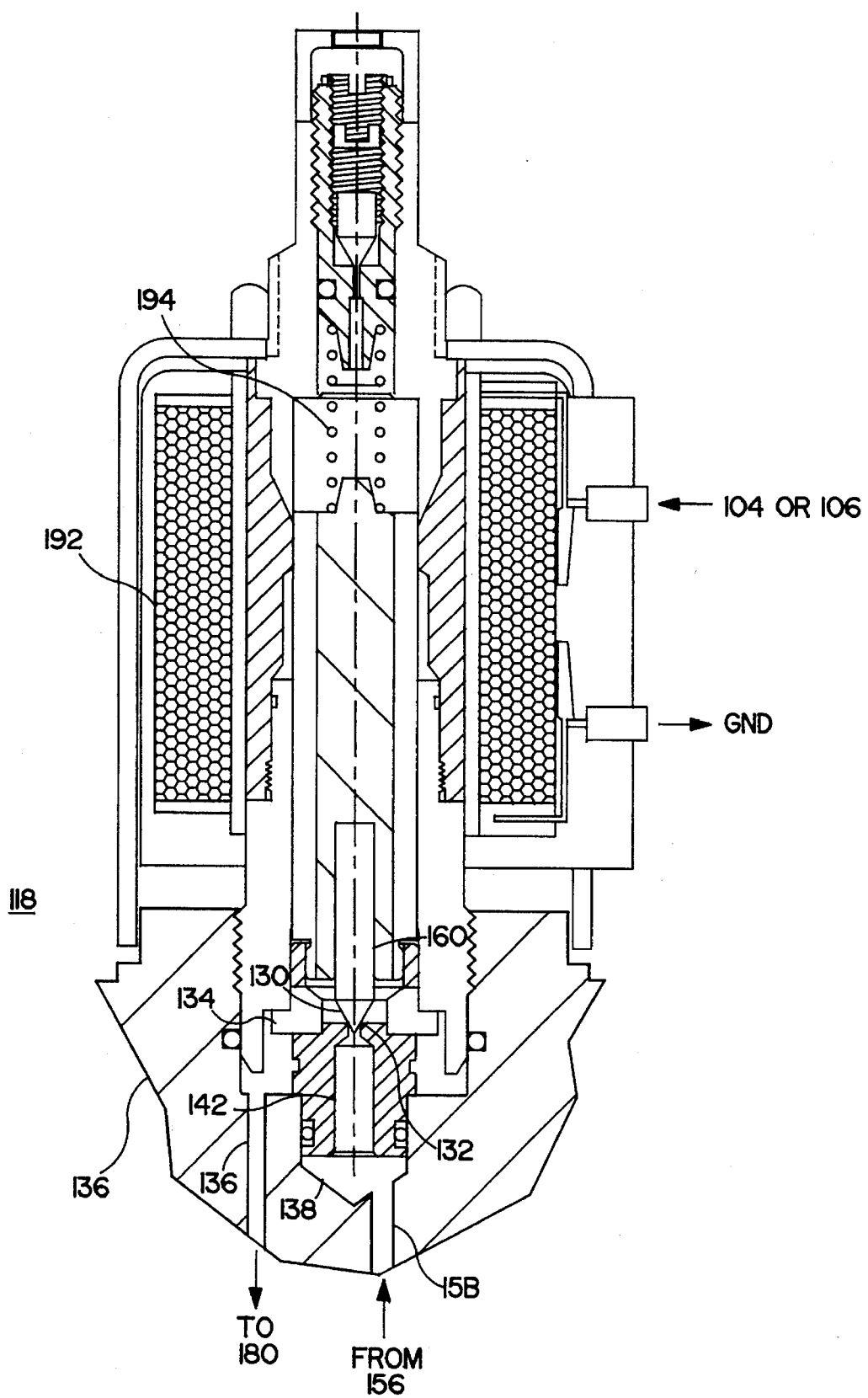
FIG. 15 is an enlarged cross sectional view of the raise pilot valve stage shown in FIG. 13.

Referring now to FIGS. 14 and 15, FIG. 14 is an enlarged cross sectional view of the raise second valve stage 114. FIG. 15 is an enlarged cross sectional view of the raise pilot valve stage 118. Fluid under pressure enters the valve assembly 100 through a fluid inlet 144. The fluid flows through a passage 146 to a chamber 148 that surrounds a portion of the second stage popper 170. Chamber 148 is adjacent to the orifice 172 in which poppet 170 seats. Poppet 170 includes a central passage 152 fluidly coupled to chamber 148 by a passage 150. Passage 150 extends across the length of poppet 170, joining with an enlarged passage 154 in poppet 170 through orifice 198. Passage 154 opens into a chamber 156 that is fluidly coupled by a passage 158 to a chamber 138 of pilot valve 118. Thus the pressure in cavity 138 of valve 118 is maintained at the static pressure at fluid inlet 144 when there is no flow.

The first stage pilot valve 118, receives fluid pressure at its orifice 132, under the nose 130 of the poppet 160, which allows the first stage poppet 160 to act as a proportional direct acting relief valve. That is, popper 160 opens when the pressure beneath it at orifice 132 plus the magnetic force produced when current is applied to the coil 192 of valve 118 equal the force of the bias spring 194 (as shown in FIG. 15). By varying the current, the relief pressure is varied.

Hydraulic fluid under pressure is delivered to orifice 132 in popper 160 of valve 118. When popper 160 is closed (plug 130 seated in orifice seat 132), passage 142 beneath orifice seat 132 is isolated from chamber 134. The isolation of orifice seat 142 creates a pressure rise which creates a greater force in chamber 156 than the pressure force applied in chamber 148. The force imbalance of poppet 170 causes a closing action (if poppet 170 is open) until poppet 170 is seated in orifice seat 172. When popper 160 is in its open position (plug 130 not seated in orifice 132), fluid is passed through chamber 134 to passage 136. The fluid in chamber 134 and passage 136 is at a lower pressure (the load pressure) than the inlet pressure at fluid inlet 144.

With no current applied, both first stage poppet 160 and second stage popper 114 are normally seated in respective orifice seats 132 and 172. When a current is applied to the coil 192 of the pilot stage valve 118, popper 160 opens to reduce the pilot relief pressure by an amount that varies with the applied current. Fluid is admitted into chamber 134 and passages 136 and 180. The pressure in cavity 156 falls and the pressure in chamber 148 remains the same (the inlet pressure). When the effective force on poppet 170 due to the pressure in chamber 148 is greater than the effective force on the spring 188 side of poppet 170 due to pressure in chamber 156 and spring force on poppet 170, the poppet 170 shifts open, allowing pressure in passage 146 to pass through the effective opening between orifice seat 172 and poppet 170 to chamber 180. The shift of poppet 170 is controlled by the change in pressure in chamber 156. The pressure is controlled by relieving the bias force produced by spring 194. The bias force is relieved by electrical current through coil 192.

Referring again to FIG. 13, passage 180 communicates with one-way check valve 122, which allows flow from passage 180 to passage 174 (but not from passage 174 to passage 180). Passage 180 opens into chamber 176 of lower second stage valve 116. Chamber 176 is connected directly to valve outlet 178, which is coupled to cylinder 206.

When current to pilot 118 stops, the relief pressure returns to its original value, and pilot stage popper 160 closes. The pressure in chamber 156 returns to the inlet pressure, overcoming the pressure in chamber 148 and closing second stage poppet 170 against orifice 172. Check valve 122 prevents backflow from the valve outlet into passage 180, maintaining header 202 (shown in FIG. 1A) at its current height.

The operation of the lower valve assembly 116 and 120 is similar, as is understood by those skilled in the art. The orifice 133 of valve 120 is fluidly coupled to passage 174 so that the pressure is the same (the load pressure) at the orifice 174 and passage 174. The same load pressure is applied against popper 171 in cavity 157 to hold valve 116 closed. When the lower pilot valve 120 is opened, fluid is allowed to flow from orifice 133, through passage 137, to tank, by way of tank port 103. The pressure at orifice 133, chamber 139, passage 159 and cavity 157 all fall when valve 120 opens, while the pressure in chamber 176 remains constant, pushing popper 171 away from its seat 173, directly coupling valve outlet 178 to tank port 103.

The exemplary embodiment features the pressure under popper proportional direct acting relief technique. This allows the valve 118 to have a much greater control over the shift of the spool 114. The reason is that the pressure in passage 180, exerted against poppet 114, is not a fixed percentage of the fluid inlet 144 pressure as in the prior art. The present invention allows electronic control of the pressure in passage 180 against poppet 114, thereby allowing control of the stroke of second stage poppet 114.

The inventors have determined that, for the configuration described above, the opening time for the second stage poppet 114 is a function in which the only variable parameter is the current applied by input signal 104 to coil 192 of pilot valve 118.

The exemplary control valve assembly 100, coupled with the correct control structure discussed above with reference to FIGS. 3–12 ensures that the acceleration of header 202 is a continuous function so that there is no impulse in jerk. The electrohydraulic control structure detects any change in acceleration and compensates immediately. The ability to control pressure, flow and impulses in the system are unique.

The exemplary valve assembly 100 (shown in FIG. 13) includes the following advantageous aspects. Valve assembly 100 provides the ability to electronically control and vary the maximum pressure in the header cylinder 206. Second, valve assembly 100 provides the ability to control the change in acceleration when raising and lowering header 202, through use of the second stage popper 170 machined shape and pressure control of the first stage valve 118. This prevents transmission of any impulses in the hydraulic or mechanical systems to the frame of harvester 200. Third, valve assembly 100 provides the capability to control flow as a function of the shape of second stage poppet 170 and the pressure behind poppet 170. This third capability allows the operator to control flow or pressure depending on the control aspect desired. Finally, valve assembly 100 provides the capability to control cylinder 206 port pressure proportional to an electrical signal 104. This capability is used for pressure control 250 described above with reference to FIG. 1A.

It is understood by one skilled in the art that the valve assembly 100 is only exemplary in nature, and that the invention may be practiced using different valve assemblies which include a proportional raise valve and a proportional lower valve. For example, these may be of the spool type, rotary type or poppet type, operated in an open center or closed center load sense configuration. The use of proportional valves is important to provide the degree of control over the fluid flow that is desired for accurate PID control.

Referring again to FIG. 17, the unload valve assembly 284 is shown schematically. Valve assembly 284 includes a two position, two-way, normally open solenoid operated popper valve 276, a solenoid operated pilot valve 278, and a relief valve 274. All pump flow is directed to tank whenever solenoid 278 is not energized. The integral relief valve 274 limits the maximum available system pressure that enters main valve assembly 100 through fluid inlet 144 (shown in FIG. 16). An exemplary commercially available unload valve assembly 284 in accordance with FIG. 17 is the MCUNR valve, manufactured by Control Concepts of Newtown, Pa. The MCUNR valve has the advantage of being convertible in the field between open and closed center, if the other elements of the harvester (e.g., the pump) are changed to be compatible with closed center valve assemblies. In the exemplary embodiment, the unload valve assembly 284 is the system inlet, and is connected to the system pump P.

Valve assembly 286 is a solenoid operated, closed center, directional control, three position four way spool valve. The spool is hydraulically pilot operated by solenoid valves 280 and 282.

A commercially available alternative valve that may be used in place of valves 162, 280 and 282 in valve assembly 286 is the MC34X, a 3 position, 4 way pilot operated spool valve with pilot operated checks, also manufactured by Control Concepts of Newtown, Pa. The MC34X valve has two active control positions in which one cylinder side 166 (or 168) is coupled to pressure, and the other cylinder side 168 (or 166) is coupled to tank. In the third valve position, both pivot cylinder sides 166 and 168 are blocked and the cylinder holds its position. This aspect of the valve is used for active lateral tilt. The addition of two electrically operated pilot valves 288 and 290 allows both ports of cylinder 166 to couple through the tank line. With both valves activated, the cylinder is in hydraulic float mode, allowing passive lateral tilt with floatation control.

Although the exemplary valve assemblies have been described in terms of open center valve systems, it is understood by those skilled in the art that the invention may be practiced using closed center hydraulic systems, and pressure compensated systems with load sense control for the system pump.

CONTROL SIGNAL SWITCHING AND AMPLIFICATION

Figure 18:
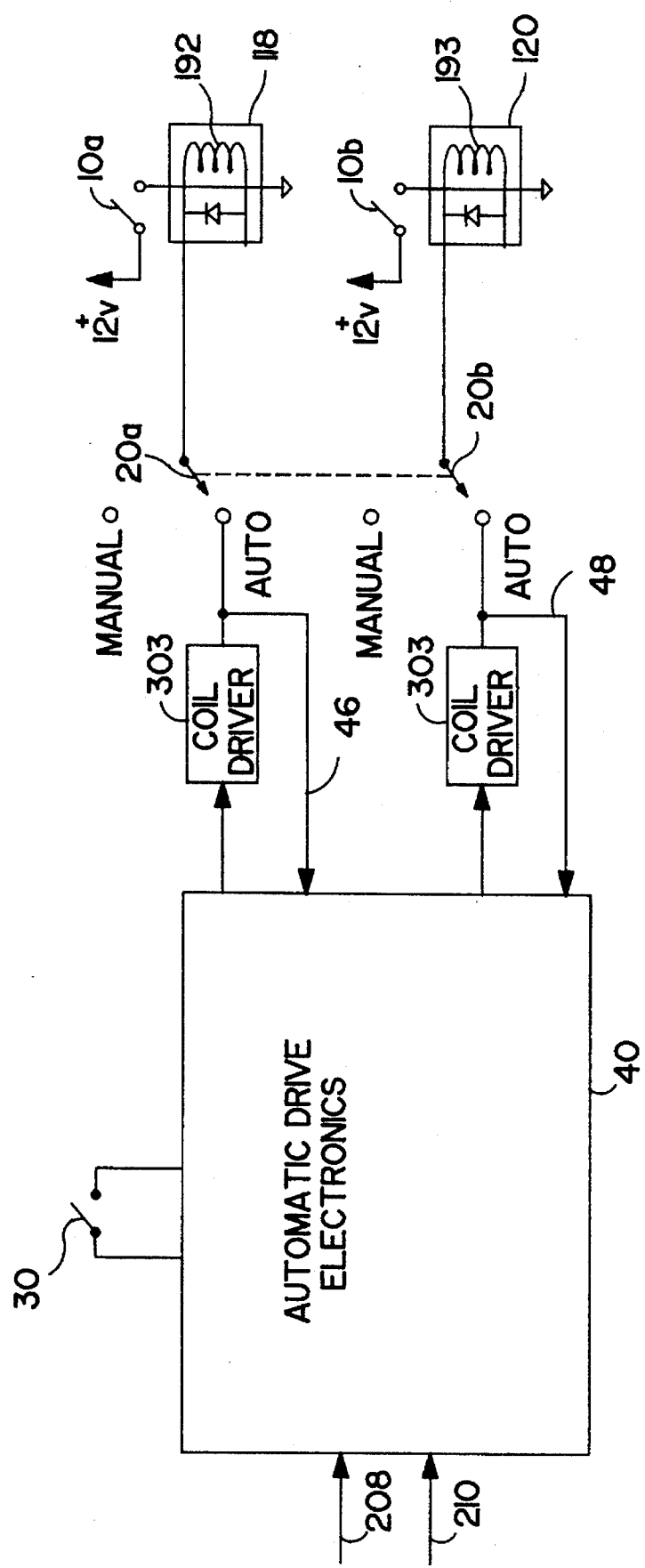
FIG. 18 is a block diagram of a switching function used in the control system shown in FIG. 1A.

FIG. 18 is a block diagram of the fail-safe control implementation. Switch 10a (10b) always allows the solenoid coil 192 (or 193) of the raise (or lower) valve to be actuated. With Switch 20a and 20b (ganged rotary switch) in manual mode, the control electronics are completely disconnected. With Switch 20a and 20b in the automatic mode, the automatic drive electronics 40 and coil driver circuitry 42 and 44 are connected. Switches 20a and 20b may also be implemented as relays.

In the automatic mode, the drive electronics 40 supplies signals to the coil drivers 303. A voltage/current sense line 46 (48) returns from the coil driver 303 to the drive electronics 40 to monitor the operation of the coil 192 (193). In the event that the operator depresses switch 10 (manual operation), the additional voltage is sensed and the automatic drive electronics 40 removes the signal to the coil driver 303 until the resume switch, switch 30 is manually activated by the operator. In this way, if the operator uses any of the manual controls during any automatic operation (floatation, resume, or calibration) the process is immediately aborted and the operator has full manual control. Additionally, a second safeguard exists in that the operator can move switch 20 to the manual mode and physically remove the automatic drive electronics 40 from the system.

Figure 20:
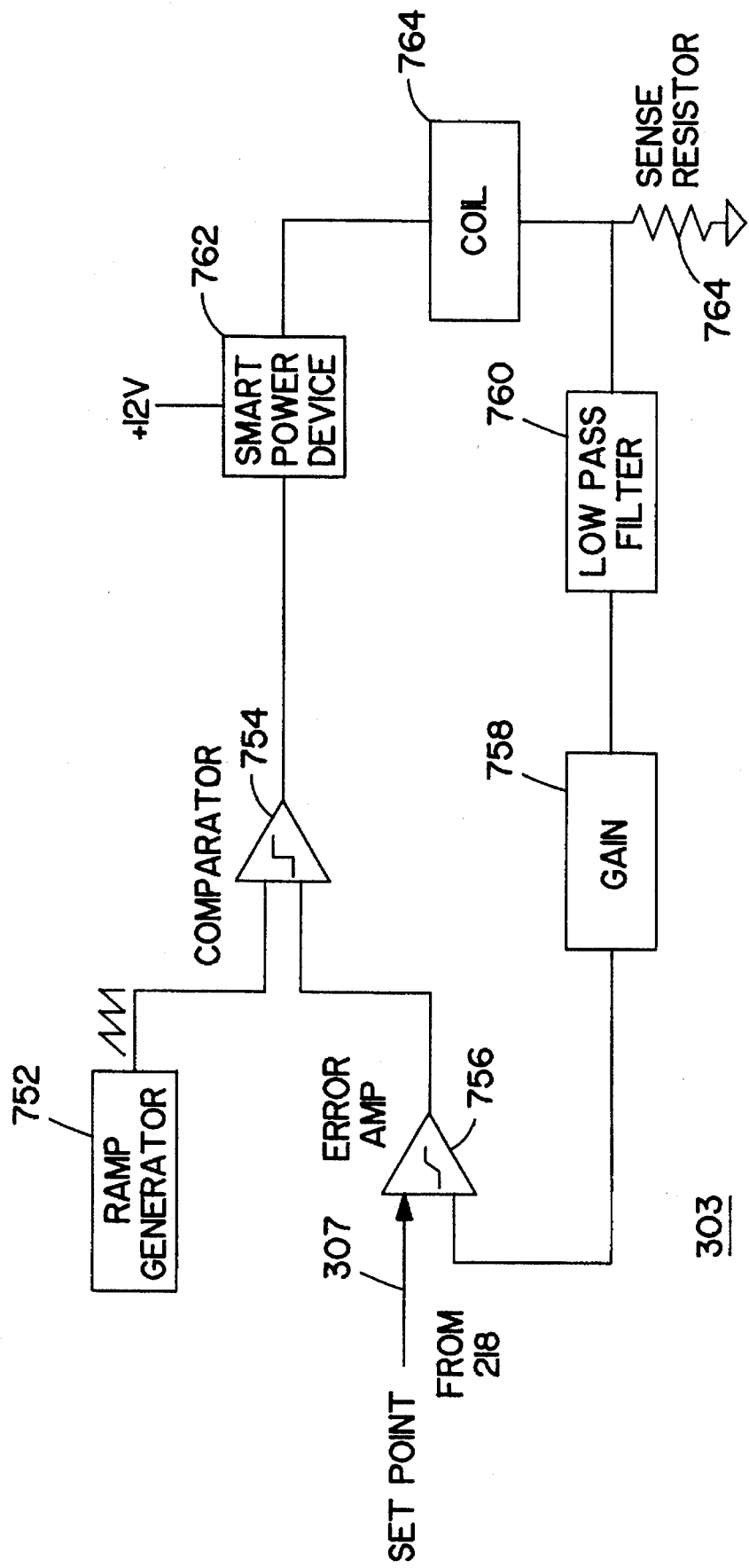
FIG. 20 is a block diagram of the power amplifier shown in FIG. 3.

FIG. 20 is a block diagram of the power amplifier 303 (coil driver) shown in FIG. 3. The power amplifier 303 drives the coil 192 (193) of the proportional pilot 118 (120). The power amplifier 303 receives a 0 to 5 Volt signal at the setpoint 307. There is a linear relationship between the set point 307 and the percentage of full scale coil current; 5 Volts is 100% full scale. The error amplifier 756 compares the average current in coil 192 to the set point voltage 307. The output signal of the error amplifier 756 increases when the current in coil 192 is less than that of the set point 307. The output signal of the error amplifier 756 is compared in comparator 754 to the saw tooth ramp signal from the ramp generator circuit 752. The output signal from the comparator 754 is a pulse width modulated signal that drives a smart power device 762. The smart power device is a low drop high current driver that is commercially available, such as model No. VN02 from the SGS-Thomson company. Smart power device 762 is used to drive the coil 192. The sense resistor 764 is used to measure the pulsed current of the coil 192. The sensed current is then averaged by the low pass filter 760 and amplified by the gain device 758. The output of the gain device 758 is the averaged current in coil 192 that is compared to the set point 307.

Preferably, a single amplifier as shown in FIG. 20 is used to perform the function of amplifier 303, amplifier 484 (shown in FIG. 6), amplifier 608 (shown in FIG. 11) and amplifier 658 (shown in FIG. 12). Alternatively, each power amplifier 303, 484, 608 and 658 could be implemented as a separate device.

Figure 25:
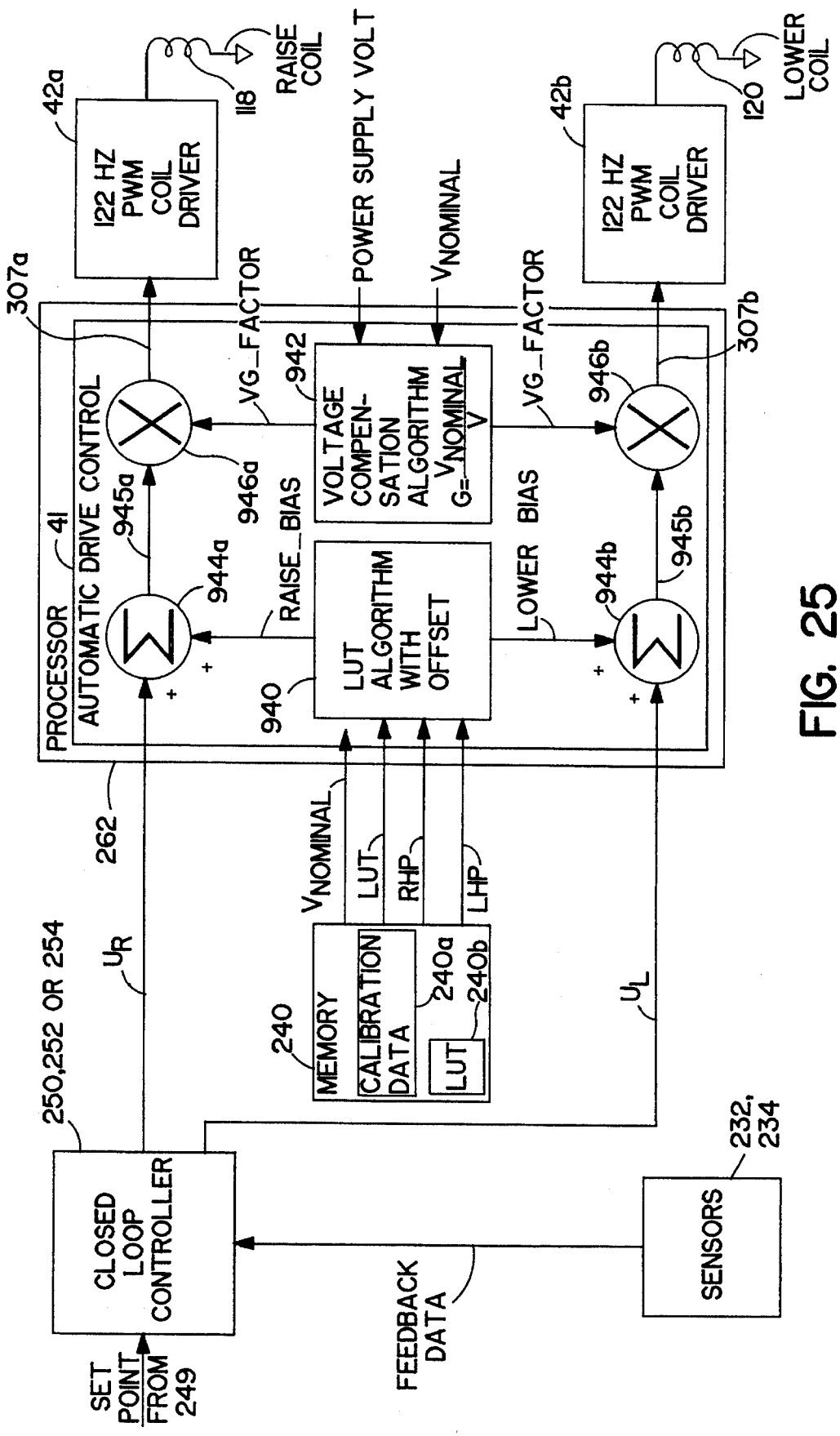
FIG. 25 is a block diagram of an alternative implementation of the drive control shown in FIG. 18.

FIG. 25 shows an alternate embodiment for the valve control assembly shown in FIGS. 18 and 20. FIG. 25 shows how the control signal UR (or UL) is combined with the RAISE_BIAS (or LOWER_BIAS) and then multiplied by the voltage compensation factor, VG_FACTOR to form the input to the PWM control register 42a, 42b for the Raise (or Lower) valve.

In FIG. 25, instead of regulating the coil current (as shown in FIG. 20), the input signal to valves 118 and 120 is regulated using pulse width modulation (PWM). A pair of 122 Hz PWM coil drivers 42a. 42b are provided. A drive control function 41 provides a respective drive value 307a, 307b to each respective driver 42a, 42b. Drive control function 41 is implemented in software in the exemplary embodiment, but one skilled in the art of circuit design could readily design dedicated circuitry to perform the same functions. Respective drivers 42a and 42b adjust the duty cycles of respective input signals 104 and 106 applied to respective valves 118 and 120. The duty cycles are varied to: (1) adjust the pressure applied to the cylinder 206, and (2) compensate for voltage variations in the power supply that is used to power valves 118 and 120.

In the exemplary embodiment, drive value 307a is a ten bit digital data value, corresponding to number between 0 and 1023. Driver 42a includes a respective counter (not shown) that is set by value 307a and counts down from value 307a. While the counter counts down, the voltage is applied to valve 118 by driver 42a. After the counter counts down to zero, the voltage is not applied for the remainder of the duty cycle (i.e., until a total of 1024 counts have passed). Then the counter is reset and the voltage is again applied. It is understood that driver 42b actuates valve 120 in the same manner.

An operating point biasing function 940 sets the minimum values of input signals 104 and 106 (which are applied to respective valves 118 and 120) just below the points at which the system reacts, RHP and LHP, respectively. This minimizes the required control dynamic range (1024 values are used), maximizes the sensitivity, and linearizes the system about the pressure set point. That is, the input signal to each valve 118, 120 is limited to a range near the respective set point (RHP for valve 118 and LHP for valve 120), within which range the change in pressure for a unit change in the input signal is substantially constant. This approach is important for position control (header or stubble height), because it allows the integrator to respond to dynamics as opposed to saturating at a voltage level that produces insufficient pressure to maintain the cylinder 206 in a desired position.

Figure 26:
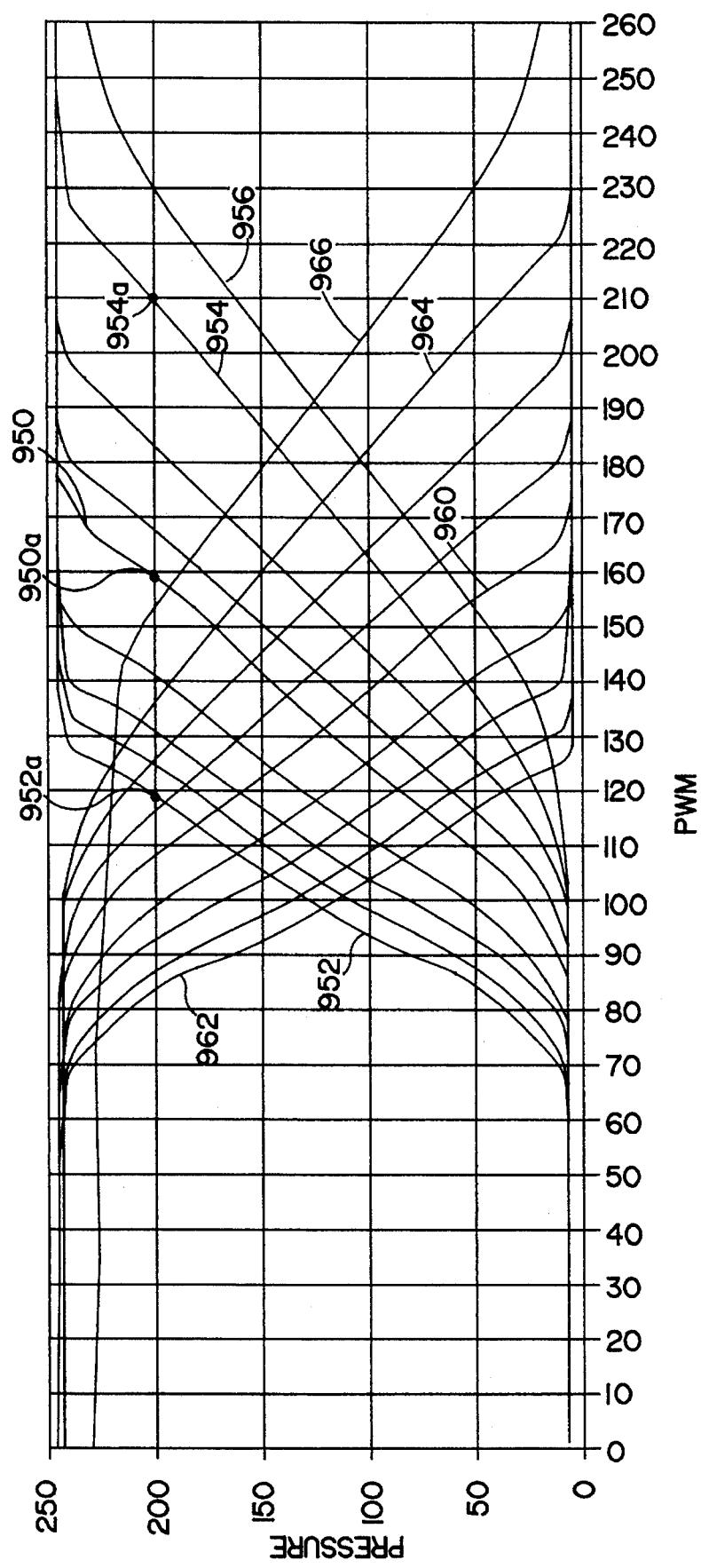
FIG. 26 is a plot of pressure versus pulse width modulation (duty cycle) for the cylinder shown in FIG. 1A driven by the valve assembly of FIG. 13.

Bias points are taken from a look-up table (LUT) 240b that relates pressure in cylinder 206 to PWM duty cycle for raise and lower valves 118, 120. That is, for each PWM value, there is a unique cylinder pressure. FIG. 26 shows an exemplary graph of LUT 240*b*. Curve 950 in FIG. 26 relates the pressure and PWM for exemplary raise valve 118 at a nominal supply voltage of 12 Volts. Both pressure and PWM are scaled to a range from 0 to 255. Thus a PWM value of 127 in LUT 240*b* corresponds to a 50% duty cycle. A pressure value of 63 indicates one fourth of the pressure range. LUT 240*b* includes pressure and PWM values corresponding to one nominal supply voltage. In the exemplary embodiment, a single LUT 240*b* is used for each respective valve 118 and 120.

LUT algorithm 940 receives the LUT 240*b* values, and the values of RHP and LHP. The RAISE_BIAS and LOWER_BIAS values are set slightly below RHP and LHP respectively. RAISE_BIAS is added to the correction signal $U_R$ provided by the closed loop control functions 250, 252 and 254, in adder 944*a*. Similarly, LOWER_BIAS is added to $U_L$ in adder 944*b*.

Voltage compensation is applied to the drive signal in order to maintain a constant current in the actuating coils of valves 118 and 120 with varying supply voltage. The inventors have determined that proper voltage compensation is achieved by multiplying the duty cycle (i.e., the PWM) defined by the drive signal by a scaling factor, not by addition of an offset.

In the exemplary embodiment, the outputs from adders 944*a* and 944*b* are multiplied by a voltage compensation factor G (provided by block 942) in respective multipliers 946*a* and 946*b*. The factor G is the ratio of the nominal supply voltage to the actual supply voltage. Voltage values 945*a*, 945*b* are multiplied by G to form values 307*a*, 307*b*. The PWM values corresponding to values 307*a*, 307*b* are then used to drive valves 118, 120.

For example, point 950*a* corresponds to a desired pressure of 200 and PWM value of 158, with a nominal supply voltage of 12 Volts. Should the actual supply voltage drop to 9, then G=12/9=1.333. The PWM value of 158 is multiplied by 1.333 and a PWM of 211 is used to drive the coil. The resulting point 954*a* in FIG. 26 shows this value. Similarly, should the actual supply voltage increase to 16, G=0.75, and a PWM value of 119 is used, as shown at point 952*a*.

Using the above method and apparatus, LUT 240*b* need only include pressure versus PWM data for a single nominal supply voltage. It is understood that LUT 240*b* may provide data for a nominal supply voltage other than 12 Volts. For example, curves 952, 954 and 956 show alternative pressure and PWM values for 16, 9 and 8 Volts nominal supply voltage for valve 118. Curves 960, 962, 964 and 966 show pressure verses PWM for 12, 16, 9 and 8 volts respectively, for lower valve 120.

It is understood that the automatic drive control apparatus shown in FIG. 25 may be used for closed loop pressure control or for position control (i.e., Header Height and Stubble Height). Look-up strategies used for controlling the pressure of cylinder 206 may differ from those used for position control (e.g., stubble height 252 or header height 254).

PSEUDO CODE AND SOURCE CODE

The microfiche appendix includes PSEUDO CODE defining the implementation of the automatic calibration system. As described the system covers Ground Tracking/Floatation, Stubble Height and Header Height.

Prior to calibration, the Feeder House Position Transducer 234 is installed as described above. If Header Height mode is to be used, the left and right Field Tracking Sensors 236 and 237 are installed. The pressure transducer 232 associated with flotation is installed and available for use.

A logical variable: HEADER_HEIGHT indicates the absence or presence of the field tracker sensors 236 and 237 and controls the execution of appropriate code in the auto calibration routine.

Calibration may be performed whenever the operator desires to do so, typically in the event of a header change or if a major obstruction has potentially bent the field tracking sensors 236 and 237. Calibration should also be performed after any maintenance or repair that can effect any of the closed loop systems.

The operator invokes auto_cal by means of controls on the control panel 218, either by a dedicated switch, or via a menu entry. The system asks the operator to verify that the header is installed and that he wishes to perform the calibration routine. Upon verification, the auto_cal routine is executed.

The following appendix also includes C language source code for the closed loop header control system, including: Ground Tracking/Floatation, voltage compensation, bias compensation, stubble height control, resume functions for Ground Tracking/Floatation and Stubble Height control, and calibration. One skilled in the art could readily construct the code for header height control and lateral tilt.

While the invention has been described with reference to exemplary embodiments, it is not limited thereto. Rather, the appended claims should be construed to include other variants and embodiments of the invention which may be made by those skilled in the art without departing from the true spirit and scope of the present invention.

What is claimed:

1. In an agricultural harvester having a cut crop receiving header having a weight and coupled by a linkage to a hydraulic cylinder, a method for causing the header to track the ground, comprising the steps of:
   a) positioning the header on the ground as the harvester moves with respect to the ground;
   b) providing first signals to control application of fluid to the cylinder at an electrical setpoint value representing fluid pressure applied to counterbalance a portion of the weight of the header;
   c) detecting pressure in the cylinder as a measure of a force the header applies against the ground and producing a feedback signal therefrom for adjusting the first signals;
   d) providing second signals to adjust the electrical setpoint value to a first value representing a first pressure value and maintaining the cylinder pressure at the first value while the header moves over increasingly lower ground; and
   e) providing third signals to increase the electrical setpoint value to a second value representing a second pressure value and maintaining the cylinder pressure at the second value while the header moves over increasingly higher ground, thereby to overcome mechanical deadband in the cylinder and the linkage while the header tracks the ground.

2. A method according to claim 1, further comprising providing second signals to adjust the electrical setpoint value to the first value and maintaining the cylinder pressure at the first value while the header moves over level ground.

3. A method according to claim 1, wherein the first value is a pressure at which the header begins to fall minus an adjustable setback factor.

4. A method according to claim 1, wherein the second value is just below a pressure at which the header begins to rise minus an adjustable setback factor.

5. A method according to claim 1, wherein steps (d) and (e) include:

generating respective first, second and third signal components that are proportional to the difference between the pressure and the setpoint, the integral of the difference with respect to time and the derivative of the difference with respect to time, and combining the first signal component and at least one of the second and third signal components to form lower and raise input signals to respective lower and raise control valve means to maintain the pressure at the setpoint.

6. A method according to claim 1, wherein steps (f) and (g) include:

generating respective first, second and third signal components that are proportional to the difference between the pressure and the setpoint, the integral of the difference with respect to time and the derivative of the difference with respect to time, and combining the first signal component and at least one of the second and third signal components to form lower and raise input signals to respective lower and raise control valve means to adjust the pressure towards the setpoint.

7. A method according to claim 1, further comprising:

detecting a bottom of a hill by sensing a decrease in pressure below a lower threshold value, between steps (d) and (e).

8. A method according to claim 1, further comprising:

f) providing signals to electrically decrease the setpoint to a third value representing a third pressure value below the first value when the header travels from increasingly higher ground to increasingly lower ground and loses contact with the ground; and g) providing signals to electrically increase the setpoint to a fourth value representing a fourth pressure value greater than the first value when the header regains contact with the ground.

9. A method according to claim 8, further comprising:

h) reducing the pressure to the first value; and i) repeating steps (d) through (g).

10. A method according to claim 8, further comprising:

detecting a top of a hill by sensing an increase in pressure above an upper threshold value, between steps (e) and (f).

11. A method according to claim 8, further comprising:

detecting leakage of fluid from the cylinder by sensing a decrease in pressure below a lower threshold value while the vehicle is not moving with respect to the ground; and bypassing step (f) when said leakage is detected.

12. A method according to claim 8, further comprising:

detecting ground contact by sensing a decrease in pressure below a lower threshold value, between steps (f) and (g).

* * * * *